United States Patent [19]

Schmidt

[11] 4,275,464
[45] Jun. 23, 1981

[54] UNIVERSAL SELF-DIAGNOSING APPLIANCE CONTROL

[75] Inventor: David J. Schmidt, Holland, Mich.

[73] Assignee: Robertshaw Controls Company, Richmond, Va.

[21] Appl. No.: 12,744

[22] Filed: Feb. 16, 1979

[51] Int. Cl.³ .................... G06F 11/22; G06F 11/32
[52] U.S. Cl. ................................. 371/15; 364/107; 364/477; 371/24; 371/29
[58] Field of Search ............... 235/304.1, 304; 364/107, 477; 371/15, 24, 29

[56] References Cited

U.S. PATENT DOCUMENTS

| | | | |
|---|---|---|---|
| 3,710,350 | 1/1973 | Yoshitake et al. | 235/304 X |
| 4,158,431 | 6/1979 | Bavel et al. | 235/304.1 |
| 4,158,432 | 6/1979 | Bavel | 235/304.1 |

OTHER PUBLICATIONS

Bell et al., "Single-Chip Microprocessor Rules the Roast", *Electronics*, Dec. 9, 1976, pp. 105–110.

*Primary Examiner*—David H. Malzahn
*Attorney, Agent, or Firm*—Fulwider, Patton, Rieber, Lee & Utecht

[57] ABSTRACT

A microprocessor based household appliance electronic control device is equipped with self-diagnosing cacapability and with selected option capabilities. The control includes input and output lines from an integrated circuit structure through a plug connection to external circuitry. The input/output line appearances from the microprocessor in the plug connection may be decoupled from external circuitry and cross connected to each other by means of a dummy plug. Connection to the dummy plug automatically establishes a test mode of operation for the microprocessor to cycle through a testing sequence to diagnosis internal and external failures. Error codes are provided in a visual display indicative of different types of failures. The controller is also equipped with function altering circuits which are selectively connected or bypassed with strapping diodes. Customized control features are thereby achieved in a universal electronic controller.

27 Claims, 5 Drawing Figures

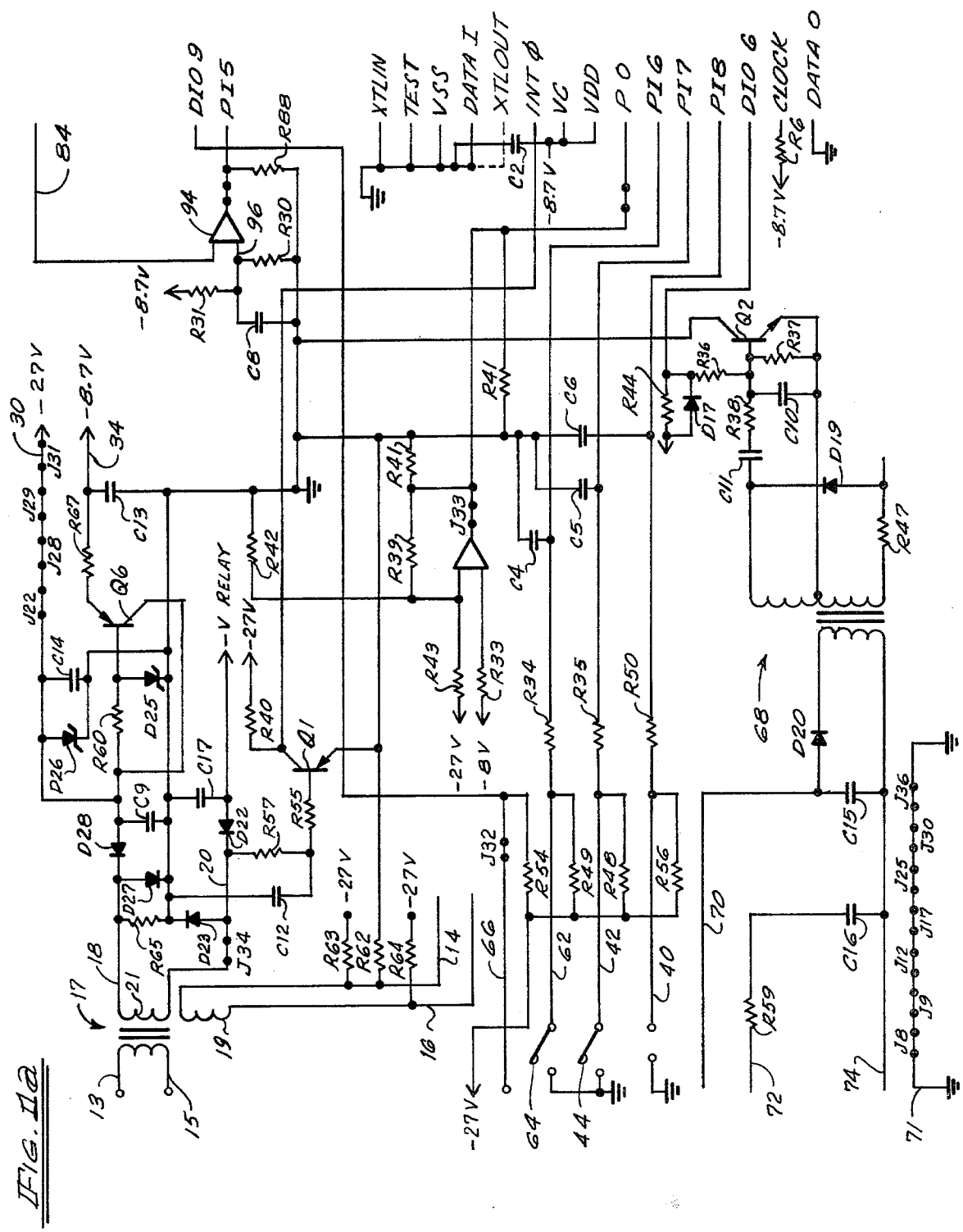

FIG 4

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | DEFD  DEFROST REGISTER | DEFC | DEFB | DEFA | PLC  PWR LVL CNTR | MD4  MOD 4 CNTR | MD56  MOD5/6 CNTR | MD10  MOD 10 CNTR | ST1  1.CK1 2.CK2 3.CK3 4.CK4 | ST2  1.PRB | DPT  1.DISPLAY 2.POINTER 3.CODED>7 4.KPP | FLG1  1.KD 2.KBC | FLG2  1.STRT 2.HOLD 3.KYLK 4.PIO | FLG3  1.EROR 2.BKDS 3.DYST 4.CLNO | SEG1  SEGMENT REGISTER | SEG2 |
| 1 | DTHR  DELAY START | DUHR | DTMN | DUMN | PLSL  PWRLVL SEL | CH1  CHAN SEL REG | SWCR  SLEW CNTR | MHG3  3 SEC MAG DLY | ST1R  1.CK1R 2.CK2R 3.CK3R 4.CK4R | ST2R  1.PRBR | | JMP3  1.PRI+ 2.ZERO 3.HOBY 4.BRWN | JMP2  1.DPO+ 2.DEFR 3.STSP 4.BEP | JMP1  1.TBO1 2.TB15 3.DEGC 4.ANTB | LPKC  PEAK VOLTAGE COUNTER | MPKC |
| 2 | CTHR  CLOCK REGISTER | CUHR | CTMN | CUMN | CTSC  CLOCK REGISTER | CUSC | CTFR | CUFR | | | | | | | | FLG4  1.CKEN 2.TERR |
| 3 | DISD  SAVE REGISTER | DISC | DISB | DISA | APL  ACTV PWRLVL | | | KEY3  3 SEC RECALL | | | | | | SCRT  SCRTCH REG | LPKV  PEAK VOLTAGE VALUE | MPKV |
| 4 | CK1D  COOK1 REGISTER | CK1C | CK1B | CK1A | PL1  CK1 PWR | PLIX  TEMP CK1 | | | | | DUT1  1 SEC DEFR REG | DUT2 | I2HA  12 HOUR COUNTER | I2HB | I2HC | I2HD |
| 5 | CK2D  COOK 2 REGISTER | CK2C | CK2B | CK2A | PL2  CK2 PWR | | | | | | | | | | | |
| 6 | CK3D  COOK 3 REGISTER | CK3C | CK3B | CK3A | PL3  CK3 PWR | | | | | | | | | | | |
| 7 | CK4D  COOK 4 REGISTER | CK4C | CK4B | CK4A | PL4  CK4 PWR | | | | | | | | | | | |

UNIVERSAL SELF-DIAGNOSING APPLIANCE CONTROL

BACKGROUND OF THE INVENTION

1. Field of the Invention

The present invention relates to microprocessor base electronic control circuitry for household appliances. The fundamental principals of a universal self-diagnosing controller are applicable to a variety of household appliances, such as dishwashers, washing machines, television sets and other devices. The implementation of the invention described is in a microwave oven.

2. Description of the Prior Art

In the past, appliance controllers have become increasing sophisticated, largely as a result of the versatility and capability of microprocessor technology. However, the high degree of sophistication achieved in initial construction of such control devices is not matched by the servicing and malfunction diagnostic techniques available for the location of troubles and repair of household appliances. Service technicians in analyzing troubles in household appliance devices typically resort to a "trouble shooting" technique. This technique is to trace back the manifestation of problems or errors in household appliance function, step by step, to isolate the source of origin of such errors and malfunctions. While this technique was previously applicable in diagnostic servicing of controllers having identifiable and separated components, it has been impractical with microprocessor based controllers.

Previously appliance controls employed components dedicated to the performance of particular functions. This is not the case with microprocessor based controls. Rather, a microprocessor performs a multitude of functions with integrated circuit components which cannot be isolated for diagnostic testing with the tools available to household appliance repair personnel. As a result, diagnostic testing of microprocessor devices has heretofore required on site replacement of an integrated circuit board, with a trial and error approach to the location of troubles if the installation of a new printed circuit board does not solve the problem. In addition, the integrated circuit controller is normally returned to a servicing center. As a result, a large inventory of field replacement controls has been necessary, since in service testing of such controls has been impractical.

A further problem that has existed with microprocessor based appliance controllers is the large capital expenditure which has heretofore been necessary to reprogram particular devices in order to achieve relatively simple options. Because even slight changes to a microprocessor subroutine can only be performed with a complete knowledge and analysis of the function and operation of the entire control system, the customized provision of optional features to suit the product lines of different appliance manufacturers has been obtainable only at great expense and with a long engineering and testing interval. This has been true even though relatively few alternatives as to each of a number of different optional features exist. When taken in the aggragate, however, the number of option combinations has heretofore necessitated custom engineering of electronic controllers for each appliance manufacturer. Furthermore, some manufacturers require several option packages to fulfill the requirements of their entire product lines.

SUMMARY OF THE INVENTION

Self Diagnostic Testing

The present invention is an electronic microprocessor based household appliance control which can be operated in a self-diagnostic mode. Operation in the self-diagnostic mode is advantageous both during manufacture of the controller, and also later as a field servicing tool.

When used as a testing tool in production, the programmed controller will internally check the electrical conductivity integrity of its internal circuitry. The controller employs a perceptable indicator, usually a visual display. This indicator normally provides the appliance user with information useful in operating the appliance when it is functioning properly. For example, a visual display in a microwave oven allows the user to visually check programmed temperatures, power levels, cooking times and other data. When the appliance is operated in the diagnostic mode according to the present invention, on the other hand, the visual display performs the additional function of providing the results of internally programmed diagnostic tests.

When used as a self diagnostic testing tool during production, the microprocessor of the controller determines if there is any discrepancy in data computation or recordation. The controller will determine the suspected point of failure and display a unique code in association therewith in the visual display. This code can be interpreted to determine the exact circuit that failed and to eliminate much of the time consumption random trouble shooting of controls entails.

In field servicing microprocessor controllers, the electronic controller can be forced into the diagnostic mode through the use of a diagnostic activator dummy plug. The dummy plug provides cross connections for the data input and output lines to and from the controller. These output lines are normally plug connected at a common plug interlock to external equipment, such as magnetron relays, fan relays, browner relays, keyboard input lines and other external devices. The plug from the controller is removed from its connection to the common interlock leading to these devices and is inserted into the dummy plug. The connections to the dummy plug set a control bit in the microprocessor indicative of a command to perform the diagnostic testing routine. When actuated to perform the diagnostic testing routine, the microprocessor checks its major internal and input and output circuits for proper computation. If the program senses a discrepancy in the computation or recordation of data, a code corresponding to the error detected appears in the visual display panel. This code denotes the location of the failure in the control circuitry.

Through the use of the self-diagnostic electronic controller, the system determines itself whether it is trouble free or not. It then becomes unnecessary for a service technican to change out a control board and substitute a replacement board to determine if the original control board is defective, unless the self diagnostic control determines that this should be done.

Flexibility of Application

The universal application of an electronic controller according to the invention provides the necessary flexiblity to adapt a single controller for a type of appliance to the requirements of most appliance manufacturers.

When utilized in microwave ovens, the optional strapping diodes which can be alternatively provided or bypassed, are used to change the duty cycle, establish polarity conventions, accomodate different oven features, and perform numerous other functions. A very simple change in an automatic component insertion machine in stuffing a printed circuit board allows a diode to either be inserted or omitted from a particular position on a printed circuit board. A single universal, appliance control board can thereby be easily modified to meet the requirements of all items in a manufacturing line of different appliance manufacturers.

The invention may be illustrated with greater clarity and particularly by reference to the accompanying drawings which illustrates one embodiment of a microwave oven controller constructed and programmed according to the present invention. The structure and operation of the embodiment of the drawings should be considered in accordance with the microprocessor program listing, attached hereto as Appendix A. It should be understood, in this regard, that the program of Appendix A covers all aspects of microwave oven operation, and not merely the self diagnostic and option adaptation features described herein.

DESCRIPTION OF THE DRAWINGS

FIGS. 1a and 1b illustrate in block from an electronic controller for a microwave oven according to the present invention.

FIG. 4 is a location map of information in the random access memory of the controller of the invention.

DESCRIPTION OF THE EMBODIMENT

Figure 11B:
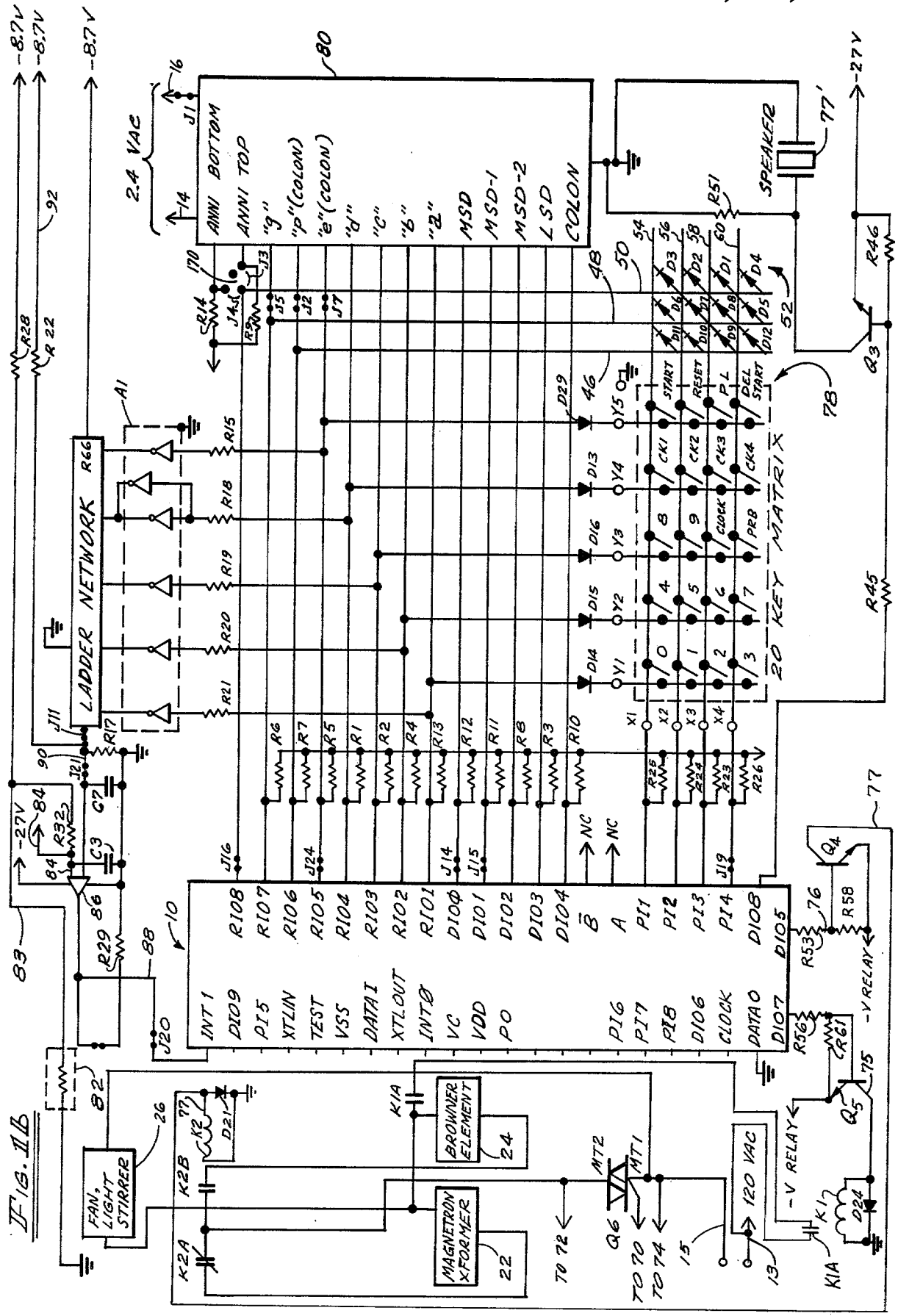

The microwave oven controller of FIGS. 1a and 1b utilizes a microprocessor 10, which preferably is a PPS-4/1 MM78 microcomputer manufactured by Rockwell International Corp., Microelectronic Device Division, located at 3310 Miraloma Avenue, Anaheim, Calif., and programmed according to the program listing of Appendix A.

Alternating current electrical power lines 13 and 15 supply 120 volt alternating current power at either 50 or 60 hertz to the microprocessor 10, depicted in FIG. 1b, through an a.c. transformer 17, depicted in FIG. 1a. One secondary winding 19 of the transformer 17 is connected to 2.4 volt a.c. supply lines 14 and 16. Lines 14 and 16 supply 2.4 volts of alternating current to the filament of a four digit vacuum fluorescent arabic numeral display 80, depicted in FIG. 1b. One such display is manufactured by Futauba Corporation as the 4-MT-03A vacuum flourescent display. Another secondary 21 of the transformer 17 supplies 21 volts a.c. to power input lines 18 and 20. Two capacitors, C9 and C17, are charged to minus 27 volts d.c. on alternate half cycles of the a.c. input on lines 18 and 20. Diodes D28 and D23 conduct to charge capacitor C9 when line 18 is negative relative to line 20. Diodes D27 and D22 conduct to charge capacator C17 when line 20 is negative relative to line 18. Capacitor C17 supplies power to relays K1 and K2 on the −V relay line to operate the magnetron transformer 22, the browner element 24, and the fan, light and stirrer indicated collectively at 26.

The power supply is divided in this fashion for two reasons. The relatively large load of relays K1 and K2 causes the voltage on capacitor C17 to drop as much as five volts when both of the relays K1 and K2 are on. The circuit supply voltage on capacitor C9 is almost unchanged when relays K1 and/or K2 are turned on. This eliminates the dimming of the fluorescent display 80 which would occur if the voltage on capacitor C9 was significantly reduced by the activation of relays K1 and/or K2. Also, the microprocessor 10 must sometimes be reset, causing all memory of time of day and the cooking program to be lost when the voltage on capacitor C9 goes below 15 volts. It is desirable not to lose processor memory during momentary a.c. line interruptions. The large relay load of the relays K1 and K2 is isolated from capacitor C9 so that the current drawn by the load does not drastically speed discharge of capacitor C9. This prevents the microprocessor 10 from being reset during short electrical power line interruptions.

The diode zener D26 clamps the −27 volt supply in the event of momentary extreme overvoltage on the a.c. lines 13 and 15 which supply the unit. Resistor R60 supplies a zener diode D25 to establish a −9.1 volt reference on line 32. An emitter follower transistor Q6 amplifies the reference to establish the regulated −8.7 volt supply on line 34 for the microprocessor and probe circuits. Resistor R67 protects the circuit from momentary shorts. Capacitor C13 is a ceramic bypass capacitor.

TIMING

Timing is derived from a shaped line frequency squarewave output of transistor Q1. This output is derived from the line frequency of either 50 or 60 hertz and is applied to the INT input of the microprocessor 10. Resistor R65 couples the A.C. transformer voltage to the shaping network composed of resistors R40, R55, and R57, capacitor C12 and transistor Q1. To signal the microprocessor as to whether a 50 hertz or 60 hertz time based frequency is employed, line 40 leading to the PI8 input of microprocessor 10 is either grounded or open. Line 40 is strapped to ground during manufacture when the controller is to be operated from a 50 hertz input. Line 40 is left open when the controller is to be operated from a 60 hertz input.

The microprocessor 10 uses the shaped squarewave at input INTφ for timing and to determine the line phase so that the magnetron transformer can be turned on at the crest of the A.C. line cycle and so that the browner element 24 can be turned on at the zero crossing.

DIODE OPTION CONTROLS

One of the principal features of the invention is the provision of electrical input lines 54, 56, 58 and 60 and output lines RI06-RI08 which are selectively interconnected to alter functions of the mircrowave oven through function alteration circuitry formed by the presence and absence of diodes D1-D12 in the diode matrix 52. Particular functions and function conventions, hereinafter to be described in detail, are controlled by the presence or absence of strapping diodes D1 through D12 in a diode matrix 52, indicated in FIG. 1b. Each one of these diodes D1 through D12 may be connected by strapping into position as indicated in the diode matrix 52 or omitted. The presence or absence of each of these diodes controls the system to operate the microprocessor with or without a particular function, such as a thermister probe, for example, or according to a particular bit convention. Input output lines RI06, RI07, and RI08 from the microprocessor 10 are cross connected by lines 46, 48 and 50 to the strapping diode matrix 52. The input output lines RI06-RI08 are time multiplexed to provide signals to lines 54,56, 58 and 60 which in turn are respectively connected to inputs PI1, PI2, PI3 and PI4 of the microprocessor 10. The specific oven functions involved, and the manner in which the information is utilized from the presence or absence of diodes D1 through D12 is explained later in the specification.

The system is also equipped to recognize the bit convention employed in signalling whether the microwave oven door is open or not.

MAGNETRON CONTROL

A pulse transformer circuit is indicated generally at 68' in FIG. 1a. This circuit is of the type described in U.S. patent application Ser. No. 931,201, filed Aug. 4, 1978. The pulse transformer circuit 68' isolates the main triac gating line 70, and the main traic connection lines 72 and 74 from the low voltage circuitry of the microprocessor 10 and analog connections thereto. When the microprocessor output pin DI06 is off (open) the blocking oscillator pulse transformer circuit 68' remains off. When DI06 is on, when it is switched to ground, the blocking oscillator circuit 68' supplies a 12 kilohertz pulse train between lines 70 and 74. This pulse train turns the main traic Q6 on. Triac Q6 controls the oven magnetron through the magnetron transformer 22 and the browner oven browner through the element 24 both depicted in FIG. 1b.

The resistors R48, R49, R54 and R56 are pull down resistors. Resistors R34, R35 and R50 isolate the microprocessor 10 from electrical interference and voltage spikes on their associated lines 40,42 and 62. Capacitors C4, C5 and C6 are optionally provided for additional filtering of the inputs on lines 62, 42 and 40 respectively.

Magnetron and Browner Relay Control

The processor output pin DI07 is turned on when it is internally switched to ground. When turned on, processor output pin DI07 supplies base current to transistor Q5 through resistor R56 depicted in FIG. 1b. This turns on the transistor Q5 to energize the external fan relay K1. Resistor R61 prevents leakage currents from turning on transistor Q5. Diode D24 absorbs the current pulse from the fan relay K1 when transistor Q5 is turned off. Contacts KIA also disconnect power from the traic Q6 when the oven is not in use.

The circuit associated with the output from pin DI05 operates in an identical manner. Relay K1 is energized to turn on the fan current, stirrer and light, indicated collected at 26, and the magnetron element transformer 22. Relay K2 is energized to de-energize the magnetron by opening series contact K2A and to allow the browner to be energized by closing contact K2B.

The main triac Q6 is turned off when the gating lead 70 is not pulsed until relay K1 is on and relay K2 is switched to the desired state. Triac Q6 is used to control the duty cycle interval of and to turn on the magnetron at 90° or browner at the zero crossing of the A.C. cycle.

Audible Speaker

A ceramic audio speaker or beeper 77' is provided to supply an audible output. The speaker 77' is gated from output DI08 of the microprocessor 10. When DI08 is turned on by an internal switch to ground, and off by removal of the internal ground to open the line 79, the speaker sounds a tone at a 2.5 kilohertz rate. The output DI08 is turned off when the speaker 77' is not sounding. Resistor R46 absorbs leakage currents. The speaker is energized through resistor R51 and discharged through transistor Q3 when transistor Q3 is turned on by current supplied from microprocessor pin DI08 through resistor R45.

Temperature Probe Circuit

An R-2R ladder network, indicated generally at R66, is driven by the outputs of hex inverter A1. This may be a hexinverter model CD 4069, manufactured by RCA corporation. The hex inverter A1 is controlled by the microprocessor output lines RI01 through RI05. The outputs at RI01 through RI05 are used at other times to strobe the keyboard lines in the keyboard matrix depicted at 78, and to control segments in the vacuum flourscent display indicated at 80. Resistors R15, R18, R19, R20 and R21 permit the voltage levels at leads RI01 through RI05 to drop below the −8.7 volt negative supply voltage of the hex inverter A1.

The thermistor temperature probe indicated at 82 is in series with resistor R28 forming a half bridge between ground and the −8.7 volt supply. The thermister circuit output voltage is sensed at input 84 of a comparator amplifier 86 and compared with a signal from ladder network R66. Comparator 86 compares the output of the digital to analog ladder network R66 with the temperature sensor output from the probe 82. The output line 88 of the comparator 86 is connected to input INTI of the microprocessor 10. This input is pulled high by pullup resistor R29 when the temperature of the probe 82 is above the corresponding output of the ladder network R66. Comparator output 88 is low when the temperature of probe 82 is below the corresponding output of the ladder network. Resistor R17 and resistor R22 bias the ladder network so that the voltage on line 90 matches the output of the temperature sensing half bridge. Resistors R17 and R22 are selected for the degrees Centigrade or degrees Farenheit mode, and the microprocessor 10 utilizes appropriate output codes on lines RI01 and RI05 depending upon the selected temperature scale. When the microprocessor 10 is to operate on the basis of the Centrigrade scale, resistor R22 is connected to the −8.7 volt supply. Where operation is to be on the Farenheit scale, line 92 is not connected to the −8.7 volt supply, but rather is left open.

Since the probe 82 and the ladder network R66 have a common voltage supply, the voltage level does not effect the temperature conversion accuracy. The microprocessor 10 utilizes the ladder network R66 in the probe 82 in the following manner. A binary code corresponding to the lowest selectable temperature is first applied to lines RI01 through RI05 from the microprocessor 10. The comparator output on line 88 is read at input INT1 to the microprocessor 10. If it is low, the temperature of the probe 82 is below the lowest usable set point temperature. The microprocessor 10 than increments the binary value on lines RI01 through RI05 and monitors the comparator input at INT1 until the signal on line 88 switches to the high state. At that point the temperature equivalent of the output on lines R01 through R05 to the ladder network is taken as the temperature measured by probe 82. This value is used by the microprocessor 10 to display the temperature in the display 80 and to compare against the desired set point temperature. The cook cycle is terminated when the set point temperature is reached.

Another comparator 94, depicted in FIG. 1a compares the output of the probe 82 against a voltage determined by resistors R30 and R31. The voltage on the input line 96 corresponds to an oven temperature which is lower than should be encountered in normal cooking. A negative output from the differential amplifier 94 is sensed on the microprocessor input line PI5 and causes termination of the cooking cycle, since the occurrence of this condition may well have resulted from an open probe.

Vacuum Fluorescent Display

The display 80 has an A.C. power supply input from lines 14 and 16 which are connected to 2.4 volt transformer winding 19 in the transformer 17. Resistors R62, R63 and R64 establish a reasonable balance between the a.c. voltage on lines 14 and 16 and bias the filament about 3 volts above the negative supply to assure complete turn off of unlighted segments. A low "1" of the processor outputs DI00 through DI03 selects the corresponding digit. The segment is lighted when both the corresponding segments (RI01-RI07) and the digit drives (DI0φ-DI03) are low. The colon is lighted when line DIO4 of the microprocessor 10 is low. The DIO0 through DIO4 output lines are cyclically enabled in time multiplexed fashion.

Keyboard

The keyboard 78 is a conventional crosspoint matrix driven by positive signals applied to each of the lines RIO1 through RIO5 in succession. Since the RIO1 through RIO5 lines are also utilized to activate segments in the display 80, the signals provided on these lines are provided in a timed sequenced multiplexing arrangement. Keyboard inputs are sensed on lines PI1 through PI4 from the microprocessor 10. Diodes D13, D14, D15, D16 and D29 prevent multiple key depressions from shorting the RIO lines together.

Microprocessor Organization

Figure 2:
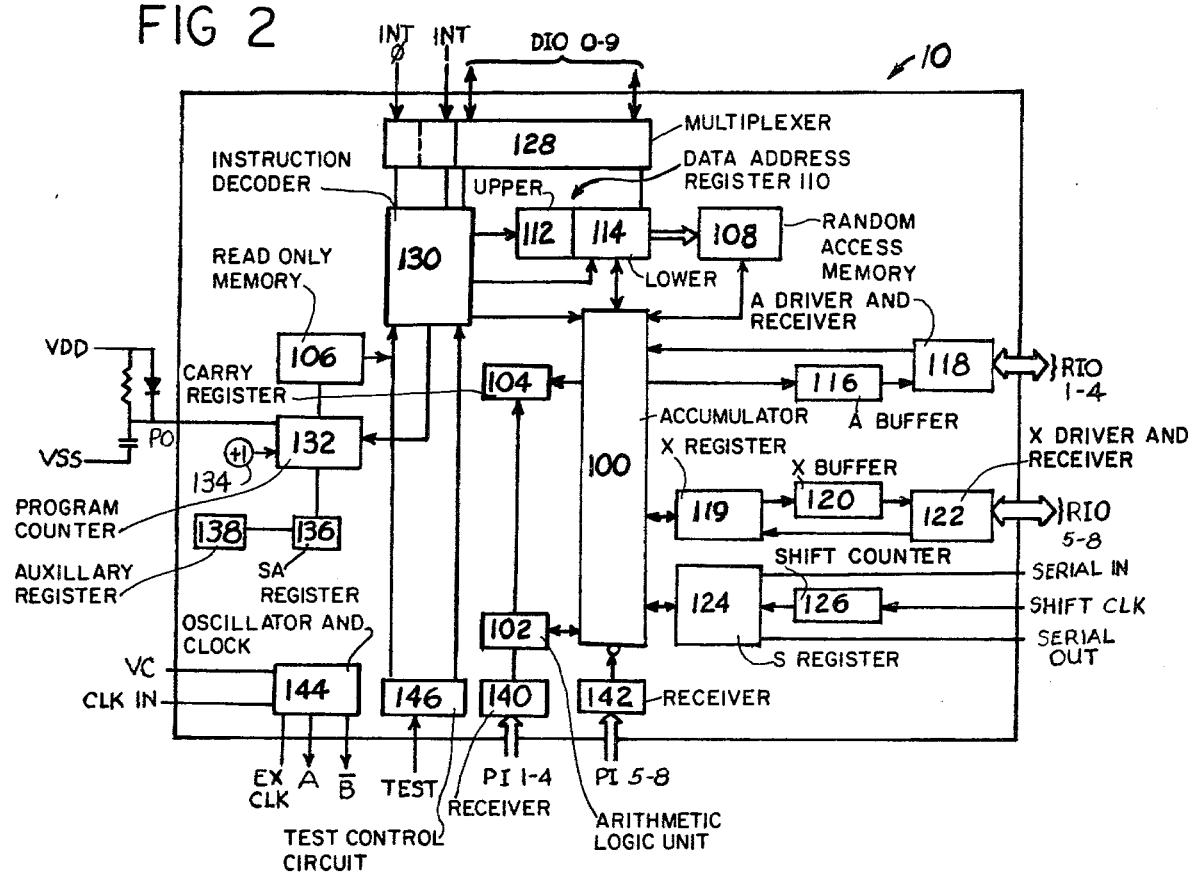
FIG. 2 is a block diagram of the microprocessor of the embodiment of FIG. 1.

The internal organization of the microprocessor 10 is depicted in FIG. 2. The primary working register is the accumulator 100 which ties with an arithmetic logic unit 102 and a carry register 104, which is a flip flop circuit, to perform either binary or decimal arithmetic. Constants may be loaded into the accumulator 100 from a read only memory 106. Variable data may be loaded from or exchanged with the random access memory 108 under the control of the data address register 110. The storage locations for data in RAM 108 are graphically depicted in FIG. 4. The accumulator 100 is also the primary path for four bit parallel or serial input or output data.

The data address register, or B register 110 is six bits in length and is made up of a two bit upper section 112 and a four bit lower section 114. Data memory locations RAM 108 are addressed by all six bits. Discrete input output ports are addressed by the four bits in the lower section 114. The combination of these ports define columns in FIG. 4. Similarly, the upper section 112 of the B register 110. These combinations are depicted as rows in the map of RAM 108 depicted in FIG. 4.

A four bit A buffer 116 is connected to the accumulator 100. The A buffer 116 holds the data for output until new data is received from the accumulator 100. The A buffer 116 is connected to a A driver and receiver section 118. The A driver and receiver section 118 has input output flip flops which receive data from the A buffer 116 and transmit data directly to the accumulator 100.

The X buffer 120 functions in much the same fashion as the A buffer 116. Likewise, the X driver and receiver section 122 corresponds to the A driver and receiver section 118. The bit outputs of the driver and receiver section 118 are connected to the leads RIO1 through RIO4 while the bit outputs of X driver and receiver section 122 are connected to leads RIO5 through RIO8.

A system S register 124 is also provided. The S register is a four bit serial in/serial out, parallel exchange register, which is used as an auxiliary storage register or buffer. The S register 124, for purposes of the present invention is frequently used as a buffer for test error code prefixes during diagnostic testing. A shift counter 126 controls the data shift rate to and form the S register 124.

A multiplexer driver and receiver section 128 is provided to control inputs and outputs from the lines DIO0 through DIO9. There is a buffer flip flop associated with each of these channels which is selected by the least significant four bits of the lower section 114 of the data address register 110. Interrupt lines INT0 and INT1 are connected to another section of the multiplexer driver and receiver 128, in addition to the input output lines DIO0 through DIO9. The interrupt portion of the multiplexer driver and receiver section 128 is connected to an instruction decoder 130. The instruction decoder 130 includes circuits that issue control signals to all appropriate portions of the microprocessor 10 to perform the desired operations.

A ten bit program counter 132 is set to a specific initial value when power is applied to the microprocessor 10. The contents of the program counter 132 address the read only memory 106 to identify the specific instruction to be executed. Unless an instruction is a transfer instruction, the contents of the program counter are incremented so that the next instruction may then be selected. Incrementation is through an incrementing circuit 134. When a subroutine call is executed by one of the transfer and mark instructions, the program counter 132 replaces the contents of an SA register 136 by the incremented value of the program counter 132. When a return instruction is executed, the contents of the SA register are reloaded into the program counter 132. An auxiliary register 138 allows the SA register 136 to perform the same function during performance of a subroutine following a transfer instruction.

A pair of receivers 140 and 142 are provided and are connected to the arithmetic logic unit 102 and the accumulator 100 respectively. The receivers 140 and 142 are TTL compatible and are synchronized so that asynchronous input signals may be used.

An oscillator and clock 144 provides internal timing signals to the microprocessor 10, but the appearance leads A and B are not connected in the embodiment of the invention contemplated (FIG. 16). A test control circuit 146 is likewise, available, not utilized for the embodiment of the invention contemplated.

The microprocessor 10 is programmed according to the program listing of Appendix A. All of the instructions utilized in Appendix A are set forth in a Product Description and data sheet for the MM78 microcomputer, as published by the Microelectric Device Division of Rockwell International Corporation.

Diagnostic Testing

A principal feature of the invention is the ability for the device to perform self-diagnostic testing to locate troubles in either the internal circuitry or the external equipment and input and output devices connected thereto.

It is contemplated that the input and output leads of FIG. 1a will normally be plug connected to the external circuitry with which they are associated. These leads have previously been described in connection with the external circuitry with reference to FIGS. 1a and b. It is contemplated that certain of these leads will be proximately located to each other at their sleeve coupled connections, in the manner depicted diagrammatically in FIG. 3. As a consequence, it is possible for all of the leads 40, 42, 62, 66, 70, 71, 72, 74, 75, 76 and 83 to be physically mounted within a single plug connector. A corresponding mating plug connector then carries the continuations of the electrical leads to the external circuitry described in connection with FIGS. 1a and b.

To perform self-diagnostic testing, however, it is necessary for certain of the leads to some of the external circuits to be altered by removal from the external circuits with which they are associated and cross connected so that a self-diagnostic testing sequence can proceed. This is achieved by disconnecting the plug 67 from the corresponding plug having leads to the external circuits described in conjunction with FIGS. 1a and b and to connect the plug 67 instead to a dummy plug 68, depicted in FIG. 3.

Figure 3:
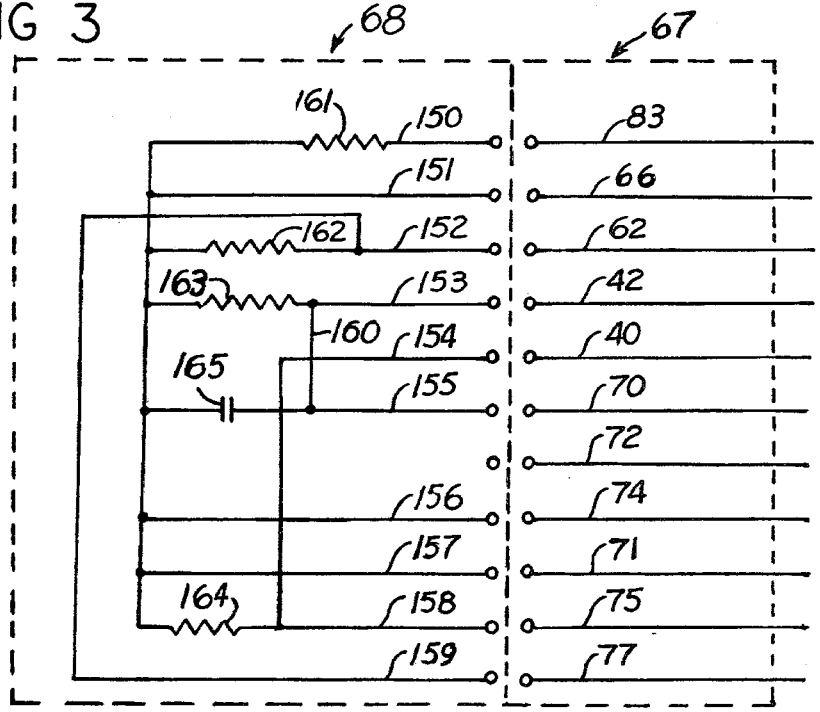
FIG. 3 illustrates dummy plug cross connections for use with the embodiment of FIG. 1.

The dummy plug 68 contains the cross connecting leads, resistors and capacitors 150–165, interconnected in the manner depicted in FIG. 3. Once the dummy plug 68 is in position to interengage the leads therein with the corresponding leads of the plug 67, as indicated in FIG. 3, the microprocessor 10 will perform a self-diagnostic testing sequence. The dummy plug 68 can be a testing tool carried by an appliance service repair person, but preferably is provided as a part of the appliance, although it is not normally connected. Rather, the dummy plug 68 is a self-contained unit that hangs unconnected from a flexible hanger in the appliance in the proximity of the plug 67.

When it is desired to perform self-diagnosis, the plug containing leads to the external equipment, normally engaged with the plug 67, is removed therefrom. It is replaced with the plug 68 which establishes the connections indicated in FIG. 3.

When power is first provided to the microprocessor 10, the microprocessor determines whether or not the test mode has been selected. Line 66, depicted in FIG. 1a, is a test sequence designation line. When line 66 is grounded, the microprocessor 10 is informed that it should be performing self-diagnostic testing. Line 66 is grounded by means of a dummy plug 68, depicted diagrammatically in FIG. 3. The microprocessor 10 examines the DIO9 input, which is connected to line 66. If DIO9 is at ground potential, which will occur when line 66 is connected to line 151 in the dummy plug 68 of FIG. 3, the microprocessor 10 will branch to the self-diagnostic testing mode. If input DIO9 is at a negative voltage, and is not pulled to ground, the microprocessor 10 will proceed with its normal cooking control program. The microprocessor 10 during the course of its normal cooking control program will not re-examine the status of DIO9. As a consequence, diagnostic testing can only be initiated by powering up from a power off condition. With reference to Appendix A, the inquiry as to whether power is on appears at instruction address $\phi 3C\phi$ of Appendix A. From the power on inquiry, the status of input DIO9 is examined at instruction address $\phi 356$, designated TMSX in Appendix A.

Diagnosis of RAM Integrity

The first self-diagnostic test which the microprocessor 10 performs is to examine the integrity of its random access memory, which is indicated at 108 in FIG. 2. A detailed map of the random access memory 108 appears in FIG. 4. The RAM 108 is divided into columns 0–9 and A-F, and into rows labelled 0–7. Specific information is stored at the matrix intersections of the various rows and columns, each of which is addressed through the B register 110.

As previously noted, the household appliance employing the microprocessor 10 includes electrical input and output conductors, including those conductors appearing in the plug 67 of FIG. 3. The functional units of the microprocessor 10, depicted in FIG. 2, are responsive to alteration of the electrical interconnection of at least some of the conductors to internally check electrical conductivity and integrity and to generate an indication in the display 80 indicative of a satisfactory check of internal electrical integrity. The alteration of the electrical interconnection of the conductors appearing in the plug 67 is achieved by means of the dummy plug 68 of FIG. 3, as has previously been described.

The row and column intersections of the random access memory 108 depicted in FIG. 4 are discrete addressable storage locations. There are a total of 128 of these locations of 4 bits each. To check the integrity of the RAM 108, the microprocessor 10 loads different counts into each location and checks the contents of the location against the count which should have been loaded therein to verify proper functioning of the RAM 108. The microprocessor first loads a count of 0 into a location, it checks to see that a 0 was loaded into the RAM 108 at this location. The microprocessor 10 then loads a count of 1 into the location and checks it. This process proceeds at each location until the count of 15 has been loaded and checked in binary at a storage location in the RAM 108. The microprocessor 10 then moves on to another location in the RAM 108.

If there is an inexact comparison, an error code appears in the display 80 and flashes as an indication of an inexact comparison. If the error is in the electrical integrity of the RAM 108, an error code of 100 appears. As noted in Appendix A, this error code signals an instruction or RAM error. This would normally indicate a defective microprocessor 10, although an improper voltage supplied to the VDD input of the microprocessor 10 could also be the source of the problem.

In checking the electrical integrity of the RAM 108, the microprocessor verifies that all bits can be entered and complemented at each four bit addressable RAM storage location at the intersection of the rows and columns depicted in FIG. 4. The RAM is addressed through the data address B register 110 depicted in FIG. 2. The lower section 114 is a four bit portion of the address, the bit combinations of which define the column of the address location in FIG. 4. That is, the four bits in the lower section 114 define which of the columns 0–9 and A-F is to be addressed. The upper section 112 of the data address B register 110 is a three bit portion of the address which defines the particular row to be addressed. The rows within the RAM 108 are vertically aligned and designated by the numbers 0-7 in FIG. 4.

Initialization

Once the microprocessor 10 is turned on, it proceeds through an instruction routine to clear all of the rows of the memory of the RAM 108, whether or not it is in the self diagnostic testing mode. This sequence is initiated by the instruction $\phi3D\phi$ which clears the clock register, which is row 2 of the RAM 108. This instruction appears in Appendix A. Instruction $\phi3C4$ marks the program location and transfers to a subroutine for clearing row 2 of the RAM 108. This subroutine includes the four steps $\phi7E5$ through $\phi7FC$, appearing in Appendix A. The clock register, row 2 of the RAM 108, is cleared by loading the accumulator 100 with zero at row 2, column 1, bit position 1, and thereafter incrementing the address by 1 bit position. The four bit positions of column 1 are cleared by this instruction sequence and through the transfer step $\phi7F9$ the system places zeroes in all of the bit positions of row 2 of the RAM 108. Since the first seven columns of row 2 of ram 108 are dedicated to the storage of the clock register information, this clears the clock register. Once a zero has been loaded into the final position of the F column of row 2 of the RAM 108, the microprocessor 10 automatically skips step $\phi7F9$ and goes to step $\phi7FC$, of Appendix A. This returns the microprocessor 10 from the subroutine to instruction $\phi3C2$ of Appendix A. This instruction resets the carry bit register 104, depicted in FIG. 2.

The microprocessor 10 is then transferred to address $\phi3D8$ of Appendix A which loads the upper section 112 of the data address B register 110 with the contents of the test location. It can be seen from Appendix A that the test location is a number 9 indicating a diagnostic test mode input. The number 9 serves as a pointer to designate the input DIO9 to the Microprocessor 10, depicted in FIG. 1. This DIO line is designated through the multiplexer driver and receiver section 128 in FIG. 2. The next instruction $\phi3CC$ directs the system to switch DIO9 to the high impedance state. That is, it turns DIO9 off. This is merely the first step in resetting all of the DIO lines. The next step, $\phi3C6$ of Appendix A, decrements the data address B register 110 so that the contents of the B lower section 114 is now 8. The microprocessor 10 then shifts from pointing to DIO9 and instead points to DIO8. The next operative instruction $\phi3D1$ transfers the system in a loop to again turn off the DIO line designated by the B register. Since the B register is at this time pointing to DIO8, it is DIO8 that is turned off. This loop continues until the contents of the B register reach zero and further decrementing would load the B register with 15, or the column address F as it is depicted in FIG. 4. This condition directs the system to skip the next instruction $\phi3D1$, and instead to proceed to instruction $\phi3E8$ of Exhibit A.

Beginning at instruction $\phi3E8$, the microprocessor 10 is directed to turn all of the segment lines RIO1 through RIO8 off. Lines RIO1 through RIO8 are connected to the display 80 in the manner previously described and depicted in FIG. 1. Instruction $\phi3E8$ transfers the system to a subroutine OTAB, which appears at instruction address $\phi7C\phi$ of Appendix A. This instruction loads the accumulator 100 in FIG. 2 with the number 15. That is, the four bit accumulator 100 is loaded with all ones. The next instruction $\phi7E0$ loads the contents of the accumulator 100 into the X register 119. At this point, both the accumulator 100 and the X register 119 are loaded with all ones. The X register 119 serves as a buffer storage means. The next instruction $\phi7D0$ loads the contents of the X register 119 into the X driver and receiver section 122. This drives the lines RIO5-RIO8 to the high impedance state, thus turning them off. This pulls the lines RIO5-RIO8 to a negative voltage, the value of which is determined by the value of resistors R5,R6,R7 and R9.

The next microprocessor instruction at $\phi7C8$ of Appendix A, exchanges the contents of the accumulator 100, which is all ones, with the contents of the A buffer 116. The contents transferred from the A buffer 116 is not important. Since the A buffer 116 is at this time loaded with all ones, the A driver and receiver section 118 forces the lines RIO1-RIO4 to the high impedance state. Unlike the X driver and receiver section 122, there is no register through which the contents of the A buffer 116 must pass. Again, the values of resistors R1, R2, R4 and R13 determine the negative voltage appearing at lines RIO1-RIO4. This completes the subroutine for turning off all of the output lines RIO1-RIO8.

Once the segments have been turned off, instruction $\phi7C4$ of Appendix A returns the system to instruction $\phi3D4$ of Appendix A. The system is then ready to clear all of the rows of the RAM 108 of FIG. 4, with the exception of row 2 which was previously cleared. In this regard it is advantageous to clear row 2 separately since depression of the reset button in the key matrix 78 causes rows 0 and 1 and 3-7 of the RAM 108 to be cleared. It is not desirable for depression of the reset button to clear row 2 since row 2 contains the clock register information, and the clock should not have to be manually reset with each depression of the reset button.

Beginning with instruction $\phi3D4$ of Appendix A, and ending with instruction $\phi3DC$, the system clears the remaining rows of the RAM 108. Instruction $\phi3D4$ loads the B upper section 112 with the contents of DEFD, which is set to zero as indicated in Appendix A. The following instruction $\phi3CA$ transfer the system to the RAM row clearing sequence CLRG, which appears at page 40 of Appendix A between instructions $\phi7E5$ and $\phi7FC$. This subroutine was previously described in connection with the clearing of row 2 of the RAM 108.

Following clearance of all of the rows of the RAM, with the exception of row 2, the system returns to instruction $\phi3E5$ of the Appendix A. This instruction exclusively ORs together the contents of the immediate field, designated as 1 by the instruction, with the contents of the upper section 112. From the previous steps, the contents of the upper section 112 is 0. The bit produced by the exclusive OR-ing operation, in this case the bit 1, is loaded into the upper section 112 of the B register 110. Instruction $\phi3F2$ then clears row 1 of the RAM 108. Upon return, an exclusive OR operation is performed between the contents of the B upper section 112 and the number 2 to advance the system through the row clearing operation. This function is continued until row 7 of the RAM 108 has been cleared following the instruction $\phi3F8$.

Once the rows of the ram have been cleared, it is necessary to load the RAM 108 with function option information from the diode matrix 52. The system advances to the next instruction which is $\phi3DC$, appearing in Appendix A. Instruction $\phi3DC$ loads the entire contents of the B register both the upper section 112 and the lower section 114, with the contents of JMP1. This appears in Appendix A and results in loading the upper section 112 of the B register 110 with the value of 1 and loading the lower section 114 with a value of D or 13 in decimal. The next instruction 03E7 loads the accumulator 100 with a binary number which is 13 in decimal. The next instruction φ3D3 transfers the system to location INPJ at instruction address φ23F of Appendix A. This instruction loads the contents of the accumulator 100 into the X register, the accumulator having previously been loaded with a count of 13 as previously described. The next instruction outputs the number 13 to the output lines RO5-8 through the X register 119. This provides an output code on these lines of 1011. In the convention of the embodiment depicted, a 1 is an off state while a 0 is an on state which is an open FET to ground.

In order to allow the RIO lines to stabilize, an artifical delay is introduced into the system by the next instruction φ2φF. This includes a transfer to location DEL2 at instruction address φ7EB of Appendix A. This instruction loads the accumulator 100 with 2. Due to the system configuration, any instruction immediately following a load accumulator instruction will be ignored, but the time which would otherwise be used in execution does elapse for performance of the next subsequent instruction. The instruction execution time in the system is about 10 microseconds. The next instruction is an add and skip instruction at location φ7EA. A binary 15 is added to the accumulator, and the system will skip the next instruction unless a bit is carried into the carry register 104. Since an addition of 15 will result in the carrying of a bit, instruction φ7F5 is not skipped, but instead the system is transferred to again re-execute the add and skip instruction at location φ7EA. This delay loop repeats itself until the accumulator no longer activates the carry register 104. At that time, instruction φ7F5 is skipped and instruction φ7FA returns the microprocessor 10 to execution at address location φ2φ7, appearing in Appendix A. In this way a stabilization delay means for effectuating a delay of about 80 or 90 microseconds is built into the system.

Instruction φ2φ7 transfers the system to an INP subroutine. The system next samples the diode matrix 52 to determine the jumper conditions of the strapping diodes D1 through D12 and thereby ascertain the various system options which have been selected by the utilization or omission of strapping diodes. The INP subroutine for performing this function begins at instruction location φ7DE, appearing in Appendix A. This instruction loads the accumulator 100 with 0 to clear the accumulator. The next instruction at location φ7EF inputs the signals on lines P11 through P14 through the receiver 140 to the arithmetic logic unit 102, illustrated in FIG. 2. The contents of arithmetic logic unit 102 are immediately read into the accumulator 100. This number is complemented to preserve the bit convention utilized in the microprocessor 10 and the system returns to instruction address location φ2φ3, appearing in Appendix A. Instruction φ2φ3 exchanges the contents of the accumulator 100 with the contents of the memory location in RAM 108 designated by the B register 110. The lower section 114 of the B register is also decremented by the same instruction, and the system is directed to skip the next instruction when lower section 114 reaches 0.

The result of this series of operations is to load the contents of the accumulator 100 into the JMP1 position of the RAM 108 at column D, row 1. That is, the ground on line 46 is signalled through the lines 54, 56, 58 and 60 to inputs to PI1 through PI4 to indicate the existence or nonexistence of strapping diodes D11, D10, D9, and D12, as indicated in the diode matrix 52 in FIG. 1. The microprocessor 10 continues this information loading procedure with respect to locations TMP2 and JMP3 in RAM 108. In this way the information as to the status of the jumpers or strapping diodes, is loaded into the RAM 108 at row 1, columns D, C, and B in that order, depicted in FIG. 4, in association with lines 46, 48 and 50 respectively of the diode matrix 52, depicted in FIG. 1.

After the system has stored the strapping diode conditions in the RAM 108, the microprocessor 10 returns to the instruction at φ3F6, appearing in Appendix A. Beginning with that instruction, the second bit position, which is a pointer, is set at column A, row 0 of the RAM 108. This bit is used to control the display of an error code in the display 80 when the system is operating in the self-testing mode. Upon receipt of an appropriate signal, the bit at the pointer bit position at column A, row 0 of the RAM 108 will point to the clock register in row 2 which is used in the testing mode to display the error codes listed in Appendix A.

Likewise, the KYLK bit at column C, row 0 of the RAM 108 is set to lock out the key matrix 78 so that the depression of keys therein cannot disrupt performance of the test routine during the self-diagnostic mode.

The system is then transferred to instruction TMSX at instruction location φ356 of Appendix A. This instruction initiates an inquiry to determine whether or not the test mode is selected. The system is transferred to TSSL to scan the test line input at DI09 to determine whether or not it is true. This instruction is executed at location φ7C3 of Appendix A, and generates a transfer to instruction address 0316 of Appendix A. Reference to TSSL rather than a direct transfer to instruction TSSX is for the propose of conserving memory. The TSSX instruction loads 9 into the B lower section 114 in FIG. 2. The multiplexer driver and receiver section 128 thereupon points to DI09, depicted in FIG. 1. The next instruction φ32B turns off DI09 to insure that it has not been accidentally actuated. Such an unintentional activation would otherwise falsely indicate operation in the testing mode, and would control the microprocessor 10 accordingly.

Having made sure that DI09 has not been accidentally grounded, the next instruction at address φ315 is a skip when the input select line is low. The microprocessor 10 checks the potential at the input line to which the data address register 110 is pointing, which is DI09. If DI09 is grounded, it is high and if not, low. Therefore, if the self diagnostic mode has been selected the system will not skip the next instruction.

In the normal operation of the microwave oven, the select line would be low and the system would skip to instruction φ335 to perform the various subroutines associated with normal oven control. When the test mode has been selected, however, by grounding line 66 with the dummy plug 68, the system will not skip but will instead proceed from instruction φ315 to instruction φ32A of Appendix A. This directs the system to return to instruction location φ36B of Appendix A. This directs the system to advance two address positions to address location φ36A this instruction loads the B lower section 114 of the B register 110 with the contents at column F, row 2 of the RAM 108, depicted in FIG. 4. Since the test error bit (TERR) in that address location has been set to 0, the system skips to instruction location φ34F. This loads the lower section 114 of the B register 110 with FLG1, found at column B, row 0 of the RAM 108. The KBC flag bit at that RAM location is set to clear the inputs from the keyboard matrix 78.

The instruction location $\phi343$ begins the test mode sequence by transferring the system to the start location at location $\phi\phi\phi\phi$ of Appendix A. The initial steps in the test mode sequence load an error code into the clock register in row 2 of the RAM 108. Of course in initially starting the testing sequence there is no error condition, so that the system proceeds through the diagnostic testing routine. Should an error condition be encountered during the diagnostic routine, the microprocessor 10 will cease further steps in the testing routine and instead the error code will be flashed on the display 80 to indicate the error condition that occur. Since it is desirable to abort further testing once an error condition has been detected, the testing sequence begins with a subroutine to detect the existence of an error.

Manual Input in the Diagnostic Mode

While a portion of the diagnostic program is devoted to automatic testing of the internal memory and registers of the microprocessor 10, another aspect of the diagnostic program causes the equipment to check the integrity of keys in the key matrix 78. Specifically, an operator can test the system, while in the diagnostic program, to determine whether or not key codes are properly received and transmitted to the display 80. The keyboard verification check description with reference to the X and Y co-ordinate key positions of FIG. 1b, appears in Appendix A. To illustrate, depression of the key 0 in the key matrix 78 will cause the display 80 to image $\phi\phi\phi\phi$ at the digit positions. Depression of the 1 key will cause the display 80 to image $\phi1\phi1$. Depression of the 2 key will create an image $\phi2\phi2$. Depression of the CK1 (Cook Cycle 1) key will cause a display of a specified code 1212. Depression of the other keys will produce the codes indicated. The operator visually checks the codes appearing in the visual display 80 against the table of codes given in Appendix A to determine that the depression of the particular key actuated has properly caused the generation and display of the appropriate code. This indicates integrity from the keyboard matrix 78 through the microprocessor 10 to the display 80. If there is a failure due to a shorted diode or some other malfunction, and improper code will appear in the display 80. Such a condition will result if a contact of the depressed key is bad or if one of the input lines to the key is improperly conditioned.

Following release of a key in the keyboard matrix 78 after depression, a further image will appear in the display 80. This image indicates the conditions of the optional diodes in the diode matrix 52. Specifically, a code is displayed in the display 80 which indicates the combinations of diodes D1 through D12 which have been strapped into position. Tables indicative of the code derivation are indicated in Appendix A. The digital code at the least significant bit position in the display 80 is associated with the line 46 to which diodes D11, D10, and D9 and D12 are connected. The next most significant digit position in the display 80 is associated with line 48 and the next most significant digit position is associated with the line 50. The diode conditions associated with each of the diodes connected to each of these lines are further indicated by the binary codes that appear on lines 54,56,58 and 60. Specifically, a four bit binary code is generated on lines 54, 56, 58 and 60 each time one of the lines 46, 48 and 50 is strobed. This binary code indicates which of the diodes, associated with the strobed line, is in position. A code of 1 indicates that the diode is strapped in position while a code of 0 indicates that it is not.

The tables for the generation and display of the codes indicative of the conditions of the diodes in the diode matrix 52 appear in Appendix A. For example, if diodes D11 and D10 are in position but diodes D9 and D12 are omitted, a binary code of 1100 will appear on lines 54,56,58 and 60. With reference to Appendix A, it can be seen that a code of L will appear in the least significant digit position in the display 80. The particular combination of diodes associated with the lines 48 and 50 which are strapped into position will determine the codes and corresponding symbols which will be displayed in the least significant digit plus 1 position and in the least significant digit plus 2 position in the display 80.

In the diagnostic testing sequence, the system approaches testing of the keyboard matrix 78 and the diode matrix 52 by first enabling all of the matrix switches. This occurs at instruction location $\phi469$ of Appendix A. The number 14 is first loaded into the accumulator 100. The microprocessor 10 then loads that count from the accumulator 100 into the X register 119 and outputs the contents of the X register 119 to output lines RI05-8. A count of 14 will turn on RI05 and will turn off RI06,7 and 8. The system next loads the accumulator 100 with a 0 at instruction location $\phi46D$ and transfers that count of 0 to the A buffer 116 and outputs that count on lines RI01-4. This turns on all of the lines RI01-4, so that all of the input lines RI0-1-RI05 to the key switch matrix 78 are on.

After a brief stabilization delay, initiated at instruction $\phi47B$, the microprocessor 10 scans the lines PI through PI4 to determine whether or not any of the keys have been depressed. If not, the microprocessor will proceed to the next instruction at $\phi477$ which will transfer the system to instruction location W1 at instruction address $\phi475$ of Appendix A. If any of the input lines PI1 through PI4 have been grounded by depression of a key in the keyboard matrix 78, a skip condition will exist when the instruction at $\phi46E$ is executed and the system will skip to location $\phi45B$, appearing in Appendix A. The system will proceed to instruction $\phi456$ to determine whether or not the test mode has been selected. If it has, the system will transfer to location TSSL which in turn transfers the system to the subroutine at TSSX appearing in Appendix A at instruction address $\phi316$. Processing through this subroutine has previously been described.

Upon return to instruction $\phi47A$ of Appendix A, the system transfers to location W2, since the test mode has been selected. Location W2 designates instruction address $\phi45F$ of Appendix A. The system then determines whether or not the entry error bit (EROR) has been set. Since the system should not have proceeded this far if it had, the answer to this inquiry will be no. At this point the error code is set in the clock register in row 2 of the RAM 108, but no error code is displayed.

The system will proceed through the program to instruction location $\phi12C$ which initiates a sequence that will set the system to flash an error code off and on in the display 80 whenever an error is subsequently received. The counter utilized is designated the SWCR counter, and is formed by the four bits at column 6 in row 1 of the RAM 108 depicted in FIG. 4. About every half second the SWCR counter overflows and changes the setting of the entry error bit (EROR) in the first bit position of column D, row 0 of the RAM 108. When the EROR bit is set, the error code will be displayed and when the EROR bit is not set, due to the overflow of the SWCR counter at column 6, row 1 of the RAM 108, the error code will not be displayed.

Once these preconditions have been set, the microprocessor 10 then again checks to see whether or not the test mode has been selected. This occurs by the execution of the instruction at address location of $\phi 4E8$ of Appendix A. The subroutine TSSL has previously been described. Upon return from that subroutine, the system transfers to another subroutine identified as STTX and initiated at address $\phi 54D$ of Appendix A. The microprocessor 10 checks to see if the test error (TERR) bit at bit position 2 of FIG. 4, located at column F, row 2 of the RAM 108 has been set. At this point it should not be set since the system has just entered the testing diagnostic mode of operation. Consequently, the system will not transfer to the START subroutine but will instead transfer to the STTS subroutine.

The STTS subroutine begins to check the X register 119, the S register 124, the A buffer 116, the data address B register 110, including both the upper section 112 and the lower section 114. In addition, some of the instructions will be checked to see that arithmetic operations are performed properly in the accumulator 100, the arithmetic logic unit 102 and the carry register 104. In addition, the integrity of the RAM 108 is also checked.

The instruction test begins at location $\phi 6C\phi$ in the microprocessor program, which appears in Appendix A. This instruction sets the carry register 104. The next instruction directs the system to skip if the carry register 104 is not set. Thus, the microprocessor 10 is able to determined whether or not the carry register 104 was properly set by the instruction at location $\phi 6C\phi$. If the carry bit is not set, the system will transfer to location ZE1, appearing at instruction location $\phi 6EB$ of Appendix A. This generates an instruction test error code which is provided to the display 80. If the carry bit was properly set, instruction $\phi 6D\phi$ of Appendix A will advance 2 instructions and reset the carry bit. The system then checks to see if the carry register 104 was properly reset. If not, an instruction test error signal is generated.

DIAGNOSTIC TESTING OF ARITHMETIC LOGIC REGISTERS

The next instruction sequence at $\phi 6F\phi$ at page 36 of Appendix A loads a count of 5 into the accumulator 100. The contents of the accumulator 100 are also loaded into the X register 119. At instruction $\phi 6C6$ the contents of the accumulator 100 and X register 119 are exchanged. The next instruction exchanges the contents of the accumulator 100 with the contents of the S register 124. The next instruction again exchanges the contents of the accumulator 100 and the S register 124 so that the count of 5 should be again returned to accumulator 100. Instruction $\phi 6E8$ loads the contents of the accumulator 100 into the lower section 114 of the B register 110. Instruction $\phi 6D4$ exchanges the contents of the lower section 114 of the B register 110 with the accumulator 100. At this time, a count of 5 should be in both the accumulator 100 and the lower section 114. The next instruction $\phi 6CA$ determines whether or not the carry register 104 is set. Since instruction $\phi 6C4$ performed a reset function on the carry register 104, the carry bit should not be set. Accordingly, the system should skip the next instruction and proceed to instruction $\phi 6F2$. This instruction commands the system to skip the next instruction if the accumulator is equal to 5. The accumulator should be equal to 5, absent some malfunction, so that the next instruction performed is located at $\phi 6DE$. If the accumulator 100 does not contain 5, instruction $\phi 6FC$ is performed which transfers the system to ZE1, located at instruction $\phi 6EB$ at page 37 of Appendix A. This generates an instruction test error signal. If the accumulator 100 did contain a code 5, the system will skip to instruction $\phi 6DE$ which directs a skip if the lower section 114 of the B register 110 is equal to 5. Again, it should be, and if it is no error code is generated.

The foregoing sequence of instructions performs the function of checking the electrical integrity of the accumulator 100, the X register 119, the S register 124, the lower section 114 of the B register 110 and the carry register 104 in manipulating a code of 5 where the carry register 104 is reset. Collectively the accumulator 100, the X register 119, the S register 124 and the lower section 114 of the B register 110 may be considered to be a plurality of arithmetic logic registers.

The next instruction sets the carry bit in the carry register 104. Thereafter, the system transfers to location $\phi 6D8$ where a count of 10 is loaded into the accumulator. The same sequence involving the accumulator 100, the X register 119, the S register 124 and the lower section 114 of the B register 110 is performed to check the electrical integrity of the circuits with the carry bit set in the carry register 104. By checking for both a count of 5 and 10, a malfunction is detected where a bit in one of the registers might be locked in a particular state.

At the termination of this sequence the lower section 114 of the B register is loaded with a count of 10. The microprocessor 10 performs instruction $\phi 6D3$ to load the accumulator 100 with a count of 5. The next instruction exchanges the contents of the accumulator with the addressable position in the RAM 108 at the column designated by the B register and at the row 0 designated by instruction $\phi 6C9$. This loads a count of 5 into the DPT position in the RAM at column A indicated in FIG. 4. The accumulator is then loaded with 9. The next instructions $\phi 6D2$ directs the system to skip if the memory location (column A, row 0 in RAM 108) is equal to the accumulator contents. It should not be, so that the system will advance to instruction $\phi 6DA$. If the memory and accumulator contents were the same, the system would transfer to the instruction test error generation routine. Assuming that no error occurs, the system proceeds to instruction $\phi 6DA$ where the contents of the accumulator are complimented in binary fashion. This generates a count of 6 in the accumulator. The next instruction $\phi 6ED$ adds 15 to the count in the accumulator 100. This causes a carry so that the accumulator is equal to a binary 5 and the carry bit in the carry register 104 is set. This instruction would also cause the system to skip if there were no carry. Since there is a carry, instruction $\phi 6F6$ is performed to determine whether or not the memory is equal to the accumulator. Since both the memory contents at column A, row 0 in RAM 108 and the contents of the accumulator 100 are equal to 5, no error code is generated, but rather the system skips to instruction $\phi 6DD$. At this point, several microcomputer instructions have been checked for electrical integrity. If electrical integrity did not exist, a transfer to ZE1 at page 37 of Appendix A would occur and an instruction test error code would be generated.

The carry bit, previously set in the carry register 104, is added to the accumulator by instruction $\phi$6DD. The system is ordered to skip if the accumulator is thereafter equal to 11. Since it should be equal to 11, there is no transfer to an error code generating subroutine, but rather bit 4 in the memory address of the RAM 108 is reset. The system then checks to see if bit 4 at column A, row 0 of the RAM 108 has been reset. If so, that same bit is set and checked to verify its integrity in the set position.

The foregoing sequence of instructions check the electrical integrity of accumulator 100, the X register 119, the S register 124, the lower section 114 of the B register 110 and the carry register 104. The system is next ready to proceed with checking the electrical integrity of the RAM 108.

DIAGNOSTIC TESTING OF THE RAM

The system next transfers to instruction location $\phi$3$\phi$6 at page 21 of Appendix A. The zero in the B register 110 is transferred to the accumulator 100 and is thereafter reproduced in the B register 110 again. The 0 in the B register 110 is then transferred into memory this looping procedure continues with the accumulator loading the number that is in the accumulator 100 into the address specified in RAM 108 by the incremented register 110. Once the contents of the lower section 114 of the B register equals 15, the system exits the loop and proceeds to compare to check the veracity of the information in the RAM 108. In exiting the loop, a zero is placed in the lower section 114 and is transferred into the accumulator 100.

Instruction $\phi$32F directs the system to skip if the memory is equal to the accumulator. This comparison function is performed by the arithmetic logic unit 102. The contents of memory and the accumulator should be equal, so that the system should skip instruction $\phi$317. If it does not, this instruction will transfer the system into the error code generation subroutine. If the system is performing satisfactorily however, it will proceed to instruction $\phi$3$\phi$B. This instruction exchanges the zeroes in the accumulator 100 and the addressed location in the RAM 108 and increments the RAM address in the lower section 114 of the B register 110 by 1. The system is then looped back to instruction $\phi$332. The cycle is continued until row 0 of the RAM 108 has been filled with the B value equal to its memory location. In the process, the electrical integrity of the 0 row of RAM 108 is checked by the comparison of the contents of the addressed RAM location and the accumulator 100. The system exits this loop after the comparison between the accumulator 100 and row 0 column F of the RAM 108, since the carry register 104 is set in the process.

The system then proceeds to fill each column location in row 0 of the RAM 108 with the complement of its prior contents. Once the address in the lower section 114 of the B register 110 returns to column 0, the system is returned from its subroutine to instruction location $\phi$6FF of Appendix A.

This instruction exclusive ORs the contents of B upper 112 in B register 110 of FIG. 2 with 1. This makes the B upper register 112 point to row 1 of RAM 108 in FIG. 2. Row 0 was previously checked. Now row 1 is checked in the same manner by transferring to location $\phi$3$\phi$6 of Appendix A. In the same manner all rows of RAM 108 are checked.

TESTING THE RI0 LINES

Once the system has completed the RAM test and progressed from instruction $\phi$6FE through $\phi$7$\phi$6, appearing in Appendix A, it begins the testing of the RI0 lines. To do so, it must first ground the DI0 lines. The microprocessor 10 first loads the most significant portion of the error code into the accumulator 100 and transfers it to the S register 124. This code is 2, which is the first digit of a three digit number that will indicate the precise nature of the error, as explained in Appendix A. The system then loads the lower section 114 of the B register 110 with the number 8 and then internally grounds DI08. The system loops back to decrement the lower section 114 of the B register to sequentially ground each of the lines DI08–DI00. Since DI09 is grounded by the dummy plug 68, all of the DI0 lines are at ground. This enables testing each of the RI0 lines sequentially to determine whether or not shorts exist.

The system next proceeds to pass signals on the RI0 lines in sequence to determine whether or not shorts to ground exist. The system proceeds through the RI01 testing by loading a count into a RAM memory location at column 2 row 2 labelled CTMN in FIG. 4 in the RAM 108. This counter is used as a pointer in the RI0 testing and is initially loaded with 0. Next, a count of 1 is loaded into the accumulator 100 and loaded into the next addressable location in the RAM 108, which is at column 3, row 2. This RAM location is also used as a counter and is labelled CUMN in FIG. 4. At this point a 1 is read back from CUMN into the accumulator 100. This number is complemented in the accumulator 100 and is directed out through the A buffer 116 to RI0 channels 1–4. This grounds RI01 and places RI02-4 at a negative voltage. The contents of the CTMN counter, which is 0, is then transferred to the B register 110. The accumulator 100 is loaded with zero, complemented, and the contents are directed out to lines RI05-8 through the X register 119.

At this time only RI01 is grounded, all of the rest of the RI0 lines being at a negative voltage. The system then executes a stabilization delay, previously described.

The signals on lines RI05-8 are then directed through the X register 119 into the accumulator 100 and complemented. The contents of the accumulator are then compared with the CTMN register. These contents should be equal if there is electrical integrity in the RI0 lines 5–8. If not, the system enters an error code generation routine. If there is equality, however, the B register is incremented to point to the CUMN location in RAM 108. The RI0 lines 1–4 are then read directly into the accumulator 100, and the contents of the accumulator 100 are complemented. A comparison is performed to determine whether or not the contents of the accumulator 100 equal the contents of location CUMN in the RAM 108. If electrical integrity exists in the lines RI01-4, equality should exist. The system then skips from instruction $\phi$72E to instruction $\phi$71B, avoiding the generation of an error code initiated at instruction 0737, all appearing in Appendix A.

The carry register 104 is reset and the accumulator 100 is loaded from the CUMN counter in RAM 108 with the number 1. The carry bit is added to the contents of the accumulator to increment the count in the accumulator 100 to the binary code for decimal 2. The contents of the accumulator 100 are then reloaded into CUMN to increment the count therein to 2. The B lower section 114 is decremented so that it then points to the CTMN counter in RAM 108. The 0 from counter CTMN is then loaded into the accumulator and added to the carry 104 which was reset before loading the accumulator 100 from the memory location CTMN. As a consequence, zero remains in the accumulator. The system proceeds to instruction $\phi 735$ of Appendix A where it is returned to instruction $\phi 7\phi 5$ of Appendix A, to again loop through the RIO testing procedure. The B lower section 114 begins by pointing to the CUMN counter which now contains a count of 2. This count is loaded into the accumulator, complemented and directed to lines RIO1-4 through the A buffer 116. Now, however, it is only RIO2 which is at ground, RIO1 and RIO3 and RIO4 all being at negative potential. The system then cycles through the RIO testing sequence, placing a ground sequentially on each one of the RIO lines, one at a time, in the manner previously described. All of the RIO lines are thereby tested for their ability to receive and return both of the alternative bit states 0 and 1. Any short circuit conditions in the RIO line will be detected by this subroutine.

Since the eight bit binary number being directed to the RIO lines 1–8 contains a single 1 and all zeroes, and the 1 is sequentially being shifted to a more significant bit position, a failure in any of the RIO lines will result in the code that failed to pass being included as part of the error code. If a short exists, the system will transfer to a routine for generating a test error signal. With reference to Appendix A, the X and Y digit positions of the RIO error code indicate the particular RIO line that failed. The table of correspondence in this regard appears in Appendix A.

DIAGNOSTIC TESTING FOR LINE FREQUENCY INTERRUPT ERROR

The next test performed in the diagnostic testing mode is to determine whether or not the line interrupt signal is properly received at pin INT0 of microprocessor 10. At that pin there is a flop-flop which is set on a particular edge of the squarewave pulse generated by transistor Q1. This test is performed beginning at instruction location $\phi 73A$ of Appendix A.

In performing the test, the lower section 114 of the B register 110 is set (in binary) to the code 11, (digital), in order to point through the multiplexer section 128 to pin INT$\phi$ of the microprocessor 10. The error code prefix 3 is loaded into the accumulator 100 and temporarily stored in the S register 124.

The next instruction $\phi 73F$ of Appendix A causes the system to skip if the selected pin (INT$\phi$) is low. The flip-flop at INT0 serves as an a.c. line signal detection means and will be reset by the incoming line frequency pulses, derived from the a.c. input lines 13 and 15 in FIG. 1a. Accordingly, a low condition will exist at the INT$\phi$ flip flop. If no triggering edge occurs either there is malfunction in the circuit input to INT$\phi$, or an internal malfunction in the connection of the multiplexer driver and receiver Section 128 to pin INT$\phi$. Alternatively, failure of this test will indicate an absence of line frequency.

Instruction $\phi 7\phi F$ of Appendix A sets the flip flop at pin INT0, thereby forcing it to an opposite bit condition from that to which it is brought by incoming a.c. line signal pulses. Incoming a.c. line frequency pulses will reset that flip flop it if they are occuring properly.

The status of the selected line (INT$\phi$) is thereafter sampled, or checked to see if an incoming pulse has reset the flip-flop INT0. Because of the possibility the test instruction may be performed concurrently with the arrival of an incoming pulse, the examination of the selected input line to INT$\phi$ is performed both at instruction $\phi 74\phi$ and at instruction $\phi 744$. If an incoming pulse has triggered the flip flop at INT$\phi$ and reset it, the system transfers to location DIO at instruction address $\phi 77\phi$ of Appendix A to begin testing the DIO lines. If the test fails, the system transfers to the error code generating routine.

DIAGNOSTIC TESTING OF THE DIO LINES

As previously noted, all of the lines DIO–DIO9 are grounded. The jumper plug 68 grounds DIO9 while DIO–D108 were grounded earlier in the test mode.

The first task in testing the DIO lines which the system must perform is to turn the segments of the display off. This is performed by the OTAB subroutine at location $\phi 7C\phi$ of Appendix A. This subroutine was previously described in connection with one of the initializing conditions of entering the self diagnostic mode. A count of 8 is therafter loaded into the lower section 114 of the B register 110 by instruction $\phi 758$ of Appendix A. This establishes a pointer to the line DIO8. The accumulator is then loaded with the number 4 which is transferred to the S register 124 as a prefix to an error code in the DIO lines. This error code explanation appears in Appendix A. The error code is a three digit code, which will appear in the display 80 if a DIO line error occurs. The first digit is 4, the second digit 0 and the final digit is 4, the second digit 0 and the final digit is the number of the number of the DIO lines that failed.

Instruction $\phi 763$ of Appendix A directs the system to skip if the selected input line is low. All the input lines should be high, which is ground, since they have previously been grounded. Accordingly, the system should not skip, but rather should transfer to location DIOR which is at instruction location $\phi 75E$. This instruction resets the selected DIO line. This reset state may be considered to be a data signal. After a stabilization delay the selected line is again tested. Having been reset, it should now be at a low condition. This low condition may be considered to be a control data signal. If the designated line is low, the system skips to instruction $\phi 745$ where the B register 110 is decremented. If the selected input line is set high, the system transfers to instruction $\phi 768$ of Appendix A, which initiates the error code generation subroutine.

When no error is detected, instruction $\phi 745$ decrements the B register 110 so that the multiplexer driver and receiver section 128 points to D107. The system then recycles to DIOC where instruction $\phi 763$ initiates the same DIO line test with respect to line DIO7. The system loops through until the B register 110 reaches 0. When this occurs, instruction $\phi 745$ causes the microprocessor 10 to skip the next instruction and proceed to instruction $\phi 778$.

FEEDBACK TEST

The feedback test checks the electrical integrity of the fan relay connection to line 75, the browner relay connection to line 77 and the main triac circuits to lines 70, and 74, all depicted in FIGS. 1a and b. All of these circuits are fed back through resistances in the dummy plug 68, as indicated in FIG. 3. The feedback test provides signals on the output lines 70, 74, 75 and 76 to determine whether whether signals on these lines produce appropriate responses in the microprocessor 10. This test can be used to locate faulty transistors and other electrical components in the circuitry external to the microprocessor 10.

At location φ778, appearing in Appendix A, the number 5 is loaded into the accumulator 100 and transferred to the S register 124 as the first digit in a three digit error code. An explanation of the error codes for the feedback test appears in Appendix A. Next, lines DIO5, DIO6 and DIO7 are turned on through separate subroutines. These lines are associated with the browner relay, the main triac, and the fan relay respectively. The system then proceeds to check feedback with all three of these DIO lines on. With the dummy plug in position, the lines DIO 5, 6 and 7 are disconnected from the oven components to which they are normally connected, and instead are connected to respective ones of the PI lines.

The first instruction in testing lines 70, 74, 75 and 76 is at location φ3φE of Appendix A where the accumulator is loaded with 0. Since the system will not perform two consecutive instructions calling for loading of the accumulator, the next step performed is to transfer the contents of the accumulator 100 to the X register 119. The contents of the lower section 114 of the register 110 are preserved by loading in the accumulator 100. This number is equal to 7, since the last line set was DIO7. After a delay to charge the capacitor 165 in the dummy plug 68 of FIG. 3, the number 7 is returned to the lower section 114 of the B register 110 from the accumulator 100. Next the lines PI,5, 6,7, and 8 are read into the microprocessor 10, and the line values are stored in the MDIO counter in the RAM 108 at column 7, row 0. The first bit stored in that location is masked with a 1, since it is only PI6,7 and 8 which are of interest.

Zero is loaded into the accumulator from the X register 119. Since the lines PI 6, 7 and 8 were connected through the dummy plug 68 to the lines DIO6,7, and 8, and the DIO lines were grounded, the memory contents at column 7 row 0 of the RAM 108 should be equal to 0. This comparison is made at instruction φ337 of Appendix A. If the contents are not all equal to 0, the system does not skip, but proceeds to the instruction φ31B which directs the system to an error code generating routine. In this test, the DIO lines perform as output lines to carry control signals, and the lines PI 6,7 and 8 are input lines which are tested for the appearance of these control signals from the corresponding output lines to which they are connected.

If the MD 10 counter in the RAM 108 does contain zeroes, however, the microprocessor 10 will skip to instruction φ333 where it brings the line to which the lower section 114 of the B counter 110 is pointing to a negative voltage. Section 114 is pointing to DIO7 since that was the number preserved in it. The next instruction decrements the count in lower section 114 to 6 and returns the system to location φ752, of Appendix A. The system is next directed to location FD2 where instruction φ327 of Appendix A which checks feedback DIO7 reset. A code of 8 is loaded in the accumulator which is 1000 in binary. This is the code which is to be compared with the input line condition in which DIO7 is turned off and DIO6, and 5 are turned on. The system proceeds through the loop sequentially turning off the lines DIO5–7 and checking these codes and their compliments. If at any time an error is detected, the system branches to an error code generating routine.

PROBE TEST

If no error is detected in the PI0–DIO feedback test, the microprocessor 10 proceeds to instruction φ77B, appearing at page 39 of Appendix A to begin the probe test. The first step is to load the accumulator 100 with an error code prefix of 6 and store it in the S register. The various probe error codes and descriptions thereof appear in Appendix A.

In the self-diagnostic mode, the microprocessor 10 determines whether or not the microwave oven probe 82 is open. As indicated in FIG. 1b, the probe 82 includes a thermistor which is coupled by line 83 through a resistor R32 to differential amplifier 94 by line 84. Differential amplifier 94, depicted in FIG. 1a, compares the input on the probe line 84 with an input on line 96 connected to ground through a 330K resistor R30. The differential amplifier output is directed to input P15 of the microprocessor 10. By comparing the resistance in the probe line with the resistance of R30, an open circuit condition can be detected. Normally, the resistance of the probe would be only about 100K ohms at the most, which is less than the resistance of resistor R30. When the probe is open, however, differential amplifier 94 will signal an open probe condition to the microprocessor 10.

In the test of the circuitry for an open probe condition, a voltage signal is carried on line 83 which is coupled through line 150 in the dummy plug 68 in FIG. 3 to a 12.3K resistor 161 which is connected to ground. The output of amplifier 94 will then be within a predetermined range of values if the open probe detection circuitry is operating properly. If the signal from amplifier 94 falls above or below the acceptable range, an error code is generated.

To conduct the open probe test, a one is first loaded into the lower section 114 of the B register 110. This causes the B register 110 to point to memory register DEFC in RAM 108, indicated in FIG. 4. Instruction φ777 of Appendix A reads in lines PI5-8 into the accumulator 100 through the receiver section 142. These inputs are then stored in memory register DEFC, column 1, row zero. The microprocessor 10 next determines whether or not the probe input at PI5 is open or not by checking the first bit in the memory location. This checks the relative concordance of the signal on line PI5 with the contents of the probe status location in memory register DEFC in RAM 108. If the bit is true, the probe is not open and if it is false probe is open. An open probe condition will transfer this system to an error routine following the execution of instruction φ773 of Appendix A. If the probe is not open, this instruction will be skipped.

If no error condition is detected, the microprocessor 10 will proceed to load a count of a 8 into the B register 110, the accumulator 100, and the X register 119. The accumulator is read out through the A buffer 116 to lines RIO1–4. Line RIO4 is off and lines RIO1,2 and 3 are on. This places a particular code on the ladder network R66. The system then executes a delay and returns to measure the input at INT1 of the microprocessor 10. This measurement first determines whether or not INT1 is low. If it is, this signals that the measured resistance is within one of the two limits. The microprocessor 10 next places a code of 5 on output lines RIO1–4, which again produces a particular output from the ladder network R66. A stabilization delay is again executed and input INT1 is reread to determine if it is still low. At this time it should not be low if the system is transmitting the resistance of resistor 161 in the dummy plug 68 within acceptable limits. If not, the system transfers to an error code generating routine. If no error is detected, the system transfers to location NOER which brings it to instruction address φ340 of Appendix A. NOER is a no error subroutine which loads all ones into the clock register counter CUMN at column 3, row 2 of the RAM 108. This prevents the display from being illuminated with the error code when the system performs the display subroutine.

ERROR CODE DISPLAY

If any of the foregoing diagnostic tests indicate an error, the system will perform a subroutine which will display an error code in the display 80. At location φ3φφ of Appendix A the lower section 114 of the B register is directed to the CUHR location in RAM 108 at column 1, row 2. The error code prefix from the S register 124 us stored at the CUHR location in RAM 108. The test error bit TERR at the FLG 4 location in RAM 108, at column F, row 2 is set so that when the diagnostic routine recycles it will not continue the various tests, but instead will flash the appropriate error code on the display 80 at a one second rate. The one second flash rate is determined by the state of a blank display bit BKDS at bit position 2 of the FLGS location in RAM 108 at column D, row 0. The system continually scans the error code, but only displays it during a "one" state of the blank code display bit (BKDS) which is cyclically being complemented.

KEYBOARD TESTING

If a key is pressed in the key matrix 78 of FIG. 1b, the microprocessor 10 will first establish a debouncing delay to allow time for the keyboard contacts to settle. The system then determines whether or not the test mode is selected beginning with execution of instruction φ358 of Appendix A. If the self-diagnostic test mode is selected, the test error bit (TERR) at the FLG4 location of RAM 108, at column F, row 2 is set. This prevents looping through the automatic testing sequence and enables the display of the key code in the display 80.

The key code which is received at inputs PI1-PI4 through receiver 140 in FIG. 2 is loaded into the CTHR location of the clock register section of RAM 108, at column 0, row 2. The subroutine for performing this function begins at location φ353 of Appendix A. From this location the code can be displayed in the display 80. As previously noted, the key codes, with reference to their X and Y coordinate positions in the key matrix 78 of Appendix A.

The entry error bit (EROR) and blank display bit (BKDS) at the FLG3 position of RAM 108 at column D, row 0 are reset to ensure that an image is allowed to appear in the display 80. Also, the system determines whether or not diode D5 has been strapped ino position in the diode matrix 52. If it has, this option select feature provides an audible tone with a depression of a key. Whether or not this option is selected is recorded at the fourth bit position of the JMP2 location in RAM 108 at column C, row 1.

The subroutine for sounding an audible tone begins with the execution of instruction φφ7D of Appendix A. The microprocessor 10 next proceeds to construct a binary code for the key pressed in the key matrix 78. This is achieved by strobing each of the lines RIO1-5 and examining lines PI-P4 after each strobe on the RIO lines. This subroutine appears in Appendix A and begins with the execution of instruction φ48φ. The construction of the binary code begins at instruction location φ4B4 of Appendix A. The key code is temporarily stored in the S register, and shifted into the clock register positions of row 2 of the RAM 108.

To display the jumper option codes described in Appendix A, the B register 110 is directed to the jumper storage location positions at columns B, C and D of row 1 of the RAM 108. The jumper bits are then read from locations JMP1,2 and JMP3 into the clock register locations in row 2 of the RAM 108. The code is then read out of the clock register locations and into the display 80 during the segment enablement subroutine.

JUMPER OPTIONS

The various functions of the different diode options in the diode matrix 52 will now be described.

PROBE HOLD OR NO-HOLD

Diode D1 is not strapped into position when it is desired for the probe 82 to hold the microwave oven at a preset temperature. If diode D1 is strapped into the diode matrix 52 in FIG. 1b, the fan and magnetron will be turned off and will go to the reset state once the preset temperature is reached. Inserting the temperature probe 82 in the oven sets the temperature mode of operation. Pressing the probe (PRB) switch in the keyboard matrix 78 turns on a probe light in the display 80 and causes the display to read 100. If a temperature other than 100 is needed, it can be entered via the numerical switches in the keyboard matrix 78. If a power level other 100 percent is needed, the power level (PL) switch is pressed. This brings "HI" into the display, indicating 100 percent power. A numbered key 0-9 in the key matrix 78 is then pressed which will change the display to "XO", where X is the number pressed. This indicates a percentage, in 10 percent increments, of maximum power. Pressing the START key will turn on the fan and control the magnetron triac at the power level selected. The display 80 shows the temperature of the probe 82 and will go up in five degree increments (Farenheit) or two degree increments (Centigrade) until the temperature reaches the set temperature entered through the key matrix 78. At this time the alarm will sound for three seconds and "HOLD" will be shown in the display. The control will regulate the temperature of the probe equal to what was set if diode D1 is not strapped in position, or to cease heating once the probe 82 reaches the preset temperature if diode D1 is strapped into position.

The status of diode D1 is stored at the HOBY bit position of the JMP3 location at column B, row 1 of the RAM 108, depicted in FIG. 4. The examination of this bit to initiate the hold subroutine is performed by instruction φ292 through φ2AD of Appendix A.

POWER ON SIGNAL

Upon power-on, the microprocessor 10 will either constantly display zeroes if diode D2 is strapped into position in the diode matrix 52, or flash the zeroes off and on if diode D2 is not strapped into position.

This informs the user that the time of day clock should be reset. This is important since it is possible to control the starting and stopping of cooking with the time of day clock. If the clock is erroneously set, the food will not be cooked at the time desired. The flashing zeroes option is not normally employed where there is no time of day clock. In such a situation static zeroes are displayed with power on. The system then must be reset by depression of the RESET button in the key matrix 78 and cooking times and temperatures can thereafter be entered.

The status of diode D2 is recorded at the zeroes bit position of the JMP3 location of RAM 108 at column B, row 1, illustrated in FIG. 4. If the static ZERO bit is not set, the entry error bit (EROR) must be set at the FLG3 location of RAM 108 at column D, row 0 and the KPP bit must be set at the DPT location at column A, row 0 or RAM 108. Any time the entry error bit EROR is set, the display 80 will flash, if actuated. The subroutine to set the entry error bit begins with instruction $\phi$3CD at page 24 of Appendix A. If the static zeroes bit is set, instruction $\phi$3D6 will transfer the microprocessor 10 to bypass setting of the entry error bit.

PROBE INTERLOCK CONVENTION

A probe detector input line 62 is also provided and is connected to pin PI6 of the microprocessor 10, as indicated in FIG. 1a. Line 62 is connected to a probe detection switch 64 located in the probe socket and leading to a ground connection. Output R108 of the microprocessor is connected to line 50 and a strapping diode D3 is either provided or omitted to establish a path to line 54 leading to input PI1 of the microprocessor 10. Together, at the proper time sequence in the time multiplexing arrangement of the microprocessor inputs, the lines 50 and 54 form a probe interlock convention input line to provide the microprocessor 10 with a bit convention signal. This bit convention signal informs the microprocessor 10 as to whether closure of the switch 64 means that a probe is in or is out of the probe socket wherein the switch 64 is located. When the diode D3 is straped into place, this signals the microprocessor 10 that closure of the switch 64 indicates insertion of the probe into the socket and opening of the switch 64 indicates the absence of a probe from the probe socket. Conversely, omission of the strapping diode D3 signals the microprocessor 10 that an open switch 64 indicates the presence of a probe in the probe socket, while closure of the switch 64 indicates absence of a probe from the socket.

The status of diode D3 is stored at the PRI+ location of the JMP3 location in RAM 108 at column B, row 1, as indicated in FIG. 4. The probe polarity convention bit PRI+ is checked, and complemented if necessary for use elsewhere in the microprocessor program by instructions $\phi$78D and $\phi$7A6 of Appendix A. This same subroutine is used to check the door interlock convention bit DR0+, stored at location JMP2 at column C, row 1 of RAM 108. In the one case transfer is from instruction address $\phi$7F$\phi$ and in the other case transfer is from instruction address $\phi$7C2 of Appendix A.

The probe polarity convention bit PRI+ is not the same as the PI0 bit, which indicates whether or not the probe is connected to the oven. If there is no probe, the PI0 bit at the FLG 2 location in RAM 108 at column C, row 0, will be reset to indicate that the probe is out, and will not be changed at any time during operation of the microprocessor 10. Instruction $\phi$7BA of Appendix A checks whether or not the probe is connected by checking line 62 at input PI6 to the microprocessor 10. Instruction $\phi$795 checks whether or not the oven door is open by checking the status of input PI7.

BROWNER OPTION

Another option of the system is the brown/cook 4 option provided by diode D4 in the diode matrix 52. The microwave oven contemplated in the embodiment depicted has four cooking cycles, cook 1, cook 2, cook 3 and cook 4. The corresponding keys for these memory cycles are labelled CK1, CK2, CK3 and CK4 in the keyboard matrix 78, and corresponding registers, similarly labelled, are located in columns 0-4 of rows 4-7 of the RAM 108, as depicted in FIG. 4.

The browner output line DIO5 controls the external relay K2 which is used to switch the browner element 24 in the circuit instead of the magnetron. The provision of diode D4, strapped in position is indicated in the diode matrix 52 in FIG. 1, or the absence of diode D4 selects whether or not the cook 4 memory level controls the browner or the magnetron. The cook 4 memory level is the last level in the four cooking sequences. When the diode D4 is in position, the power level control will not be active for any other power level except 100 percent. This is true only with respect to the cook 4 memory level. The absence of diode D4 changes the control so that the cook 4 level is merely an additional time and power level to the magnetron transformer 22.

The bit recording the status of diode D4 is stored at the JMP3 location of RAM 108 at column B, row 1. When from changing the power level when dealing with the cook 4 cycle. Instead, full power is applied. The subroutine for locking out an alteration to the power level setting, despite actuation of th PL key in the key matrix 78 while setting the cook 4 power level, is found in Appendix A beginning with instruction $\phi\phi$A9. In this subroutine, the accumulator 100 is loaded with 7. If the upper section 112 of the B register 110 has been set to row 7, the cook 4 sequence, the contents of the addressed RAM location and the accumulator 100 will be equal. The system then examines the BRWN bit in the JMP3 RAM location, and if that bit it set, the subroutine for adjusting the power level is bypassed.

AUDIBLE TONE OPTION

Another option which is sometimes sought is for a speaker or horn 77', indicated in FIG. 1, to emit a short audible tone, or "beep" when one of the keys in the key matrix 78 is depressed. If diode D5 is strapped into position, as indicated in the diode matrix 52, depression of a key will not generate a signal from output DIO8 to line 76 to cause the speaker 77' to emit a sound. If the diode D5 is omitted, however, each depression of an active key in the key matrix 78 will be accompanied by a sound or "beep" from the speaker 77'.

An active key is, in essence, a key which may be validly depressed at a particular time in order to enter information into the system. Keys which are depressed which would not enter valid information into the microprocessor 10 are ignored in any event, and their depression is not accompanied by a tone from the speaker 77' regardless of whether of not diode D5 is strapped into position. For example, if the numerical keys in the key matrix 78 are depressed without first depressing a control key, such as one of the cook cycles or the clock key, no information will be entered into the microprocessor 10 since the type of information sought to be entered has not been identified. Accordingly, no tone will accompany the depression of the numerical keys in the key matrix 78 under such conditions regardless of the presence or absence of diode D5.

The status of the diode D5 is stored at the BEP bit position at the JMP2 location in RAM 108 at column C, line 1. While this bit is tested at several locations in the microprocessor program, one subroutine in which the BEP effectuates control appears at location $\phi 58\phi$ of Appendix A. The B register 110 is directed to the JMP 2 location and instruction $\phi 59\phi$ is executed to skip if the BEP bit is false. If the bit is not set, a tone should be generated and instruction $\phi 588$ is skipped. If the BEP bit is set, instruction $\phi 588$ will increment the program counter 132 in FIG. 2 by 8, thereby skipping the subroutine for sounding a tone from speaker 77'.

OVEN DOOR INTERLOCK CONVENTION

The connection on line RIO7 on line 48 to line 54 establishes a door interlock convention input circuit in the form of a loop from one microprocessor output to another microprocessor input. A strapping diode D6 is alternatively connected or disconnected between lines 48 and 54 during manufacture. As previously noted, this is an extremely simple procedure. The presence of a diode D6 between lines 48 and 54 establishes a binary bit convention in which a ground on line 42 indicates that the oven door is open while an open signal on line 42 indicates that the oven door is closed. Alternatively, a diode D6 may be omitted. In this case, there is no connection from line 48 to line 54. The absence of a signal to microprocessor input PI1 during examination of the interlock convention input line, formed by lines 48 and 54, indicates to the microprocessor 10 that an opposite binary bit convention exists. That is, omission of the diode D6 causes the microprocessor to interpret a ground signal on line 42 as an indication that the oven door is closed. Conversely, an open signal on line 42 indicates to the microprocessor 10 that the oven door is open. The door convention is stored as the DRO+ bit at locations JMPZ at column C, row 1 of the RAM 108, indicated in FIG. 4.

DEFROST OPTION

Diode D7 in the diode matrix 52 selects whether a normal or special defrost cycle will be active during the cook 1 memory level. If defrost is selected by strapping the diode D7 into the matrix as indicated in FIG. 1b, the power level assumed will become 50 percent instead of 100 percent as for cook 1. Also, when this level reaches zero time when decrementing, the microprocessor 10 retrieves the original time entered for defrost and initiates another count down with the power level to the magnetron equal to 0. This is used as a stabilization or wait state in the defrost cycle. If diode D7 is omitted, a power level for cook 1 can be set, as with the other cook cycles, in the manner previously described. Also, as with the other cook sequences, a 100 percent power level will be assumed in the absence of the diode D7 unless some other power level is manually set through the key matrix 78.

The status of diode D7 is recorded at the DEFR bit at the JMP2 location in RAM 108 at column C, row 1, depicted in FIG. 4. Instruction $\phi 66F$ of Appendix A points to the JMP2 location. Thereafter, the microprocessor determines whether or not the defrost bit DEFR is set. If it is, a 50 percent power level will loaded into cook 1 power level register location PL1 at column 4, row 4 of RAM 108. A zero power level will be loaded into the temporary cook 1 power level register PL1X at column 5, row 4 of RAM 108. The same functions are performed beginning at instruction address $\phi 27B$ of Appendix A. The actual setting of the counts into the power level counter PLC and register is influenced by whether or not a one second duty cycle option has been selected. This option will be subsequently described.

When zero time remains in the cook 1 register in columns 0 through 3 of row 4 of the RAM 108, the original time to which the defrost register was set is transferred to the cook 1 register in columns 0 through 3 of row 4 of RAM 108. The system is returned from the defrost cycle to the normal cooking cycle. Since a 0 power level has been set into the PL1X register, the magnetron is not operated during the cook 1 cycle, but rather the cook 1 register is merely counted down with a power level to the magnetron equal to 0.

START-STOP

A further selectable feature of the invention is performed with the diode D8 in the diode matrix 52 in FIG. 1. If diode D8 is strapped into the position indicated, the START key in the key matrix 78 operates as both a start and a stop switch. With diode D8 in the system, the first depression of the START key in the key matrix 78 initiates a starting signal to the over on a cooking start input circuit formed by the connecting of line Y5 and 54 and by the microprocessor program. The next time that the same key is depressed, this system will stop as if the oven door has opened under the control of a cooking stop input circuit formed by the microprocessor program and by the STSP bit position of the JMP2 location at column C, row 1 of the RAM 108. In the absence of the diode D8, the START key will initiate a cooking sequence, but cannot be used to stop cooking. With this option selected and diode D8 in position in the diode matrix as indicated, cooking can be stopped and cooking times can be changed. Such a capability is not available if the diode D8 is omitted.

The status of diode D8 is stored at the STSP bit position of the JMP2 location at column C, row 1 of RAM 108. When the system is running following an intial depression of the START key, a second actuation of that same key will result in a check of the STSP bit. At instruction address $\phi 1A5$, appearing in Appendix A, the B register points to the FLG2 location in RAM 108, at column C, row 0. If the start (STRT) bit has been set, indicating an actuating of the START key in the key matrix 78, the system will transfer to location CKSS at instruction address $\phi 3A9$ of Appendix A. The microprocessor 10 then examines the STSP bit at the JMP2 RAM memory location to determine whether or not it is set. If it is, the system checks to determine if the audio tone BEP bit has been set. In either event, the system will shut off the magnetron as if the oven door had been opened.

TEMPERATURE SCALE SELECTION

Diode D9 in the diode matrix 52 is used to select whether the temperature probe 82 is set and read in degrees Centigrade or in degrees Fareheit. The temperature limit in degrees Farenheit ranges from 100 to 199, with the system responding to five degree Farenheit increment temperature rises. The temperature limit in degrees Centrigrade is from 40 to 89, and the system responds to 2 degree Centigrade increment temperature rises. If diode D9 is not strapped into position, the system will operate in the degree Farenheit mode. If diode D9 is strapped into position in the diode matrix 52 as indicated in FIG. 1b, the system will operate in degrees Centigrade.

In addition to diode D9, two resistor adjustments associated with the ladder network R66 are also required, amd are depicted in FIG. 1b. The resistor R22, having a value 150k ohms is provided only if the system is to operate in degrees centigrade. Resistor R22 is omitted if the system is to operate in degrees Farenheit. Also, resistor R17 has a value of 560K ohms if the system is to operate in Farenheit temperatures, and alternatively, 169K ohms if the system is to operate in degrees Centrigrade.

The bit indicative of the selection of either degrees Farenheit or degrees Centrigrade is stored as a bit DEGC at location JMP1 in RAM 108 at column D, row 1. The information as to which temperature scale has been selected is used in a number of locations in the program of Appendix A which operates the microprocessor 10. As an example, in a probe compare routine for determining probe temperature, the lower limit of allowable temperature ranges is first loaded into the ladder network R66, compared with the thermistor 82, and an output indication as to whether or not this temperature has been reached appears at line 88 and is directed to input INT1 in the microprocessor 10. If the temperature has been exceeded by the probe 82, the input to the ladder network R66 on lines R01 through R05 is incremented. A similar comparison is performed until the input at INT1 indicates that the probe is below the new temperature specified by the ladder network R66. The previous temperature is then recorded as the temperature of the probe 82.

In operating with a temperature probe, sequential cook cycles are not utilized. Accordingly, rows 4 through 7 of the RAM 108 are not associated with separate cook cycles. Instead, the desired probe temperature level is stored in the registers at columns 0 through 3 of row 4 of the RAM 108. The actual probe temperature is stored in column 0 through 3 of row 5 of the RAM 108. The count which is directed to the ladder network R66 on output lines R01 through R05 is maintained in a continuously running counter in RAM 108 at columns 0 through 3 of row 7. Also column 0 through 3 of row 6 is initially loaded with a digital 40, if the degree Centigrade option has been selected, or 100 if the degree Farenheit option has been selected. If the degrees Centrigrade option is selected, the count in the CK 3 registers in row 6 of RAM 108 is incremented by two, corresponding to the two degree increments of temperature testing. Conversely, if degrees Farenheit has been selected, the count in the CK 3 registers is increased by 5.

One routine in the program of Appendix A exemplary of use of the temperature scale information begins with instruction $\phi$5E7 of Appendix A. The B register 110 is pointed to the JMP 1 location and at the DEGC bit. If the bit is false, instruction $\phi$5C9 skips to instruction $\phi$5D2 where the system enters the routine for loading the cook 3 registers (CK3C, CK3B, and CK3A) with a count of 100 and incrementing it by counts of 5. If the DEGC bit is true, the system will not skip, but rather instruction $\phi$5E4 will transfer it to location CSEL where instruction $\phi$5D9, of Appendix A, loads the Centrigrade code into location CK3D at column 0, row 6 of the RAM 108. Thereafter, the cook 3 register is loaded with a count of 40 and incremented in two degree increments. For example, instruction $\phi$675 at Appendix A initiates an increment of a count of 2 while the next instruction, $\phi$67A, initiates an alternative increment of a count of 5.

DUTY CYCLE OPTIONS

Diodes D10 and D11 in the diode matrix 52 in FIG. 1 indicate the particular duty cycle selected. The absence of diode D10 from the position indicated in the diode matrix 52 specifies that either a 30 second duty cycle or a one second duty has been selected. If diode D10 is strapped into the position indicated, a 15 second duty cycle is selected and diode D11 must be omitted. If diode D11 is strapped into the position indicated in the diode matrix 52, a one second duty cycle is selected and diode D10 must be omitted. Diodes D10 and D11 cannot both be strapped into position or an invalid condition exists.

The duty cycle refers to the duty cycle of the magnetron transformer 22 of FIG. 1. Magnetrons that are commercially available predominantly operate at 1,15 or 30 second duty cycles. Accordingly, diodes 10 and 11 can be used to adapt the control system of the invention for operation at any one of these three duty cycles.

Bits TB01 and TB15 in the RAM 108 of FIG. 4 respectively indicate a duty cycle of one second and a duty cycle of 15 seconds. These bits appear at the JMP1 location in RAM 108 at column D, row 1. Three counters in the RAM 108 are also utilized in determining the duty cycle and in controlling the magnetron transformer 22. These counters are labelled MD4, MD56 and MD10, and appear are columns 5,6 and 7 respectively of row 0 of RAM 108.

A test to determine the duty cycle selected is performed approximately once every 100 milliseconds. At this time several comparisons are performed. The MD10 counter is examined only if the one second duty cycle has not been selected. That is, the MD10 counter is examined only if diode D11 has been omitted. The MD10 counter recycles to zero every 10 seconds. The MD56 counter also recycles to zero every 100 milliseconds. Whenever the MD56 counter contains a count of 1, the TB01 bit in RAM location JMP1 is examined to see if a one second duty cycle has been selected. This subrouting appears in Appendix A, beginning at location 0508. If the one second duty cycle is selected, the system enters a magnetron control routine. If not, it proceeds to examine the MD10 counter to see if its contents equal zero. This is performed at instruction $\phi$523 of Appendix A. If a one second duty cycle has been selected, the system will branch to a magnetron control routine. If not, the microprocessor 10 will count the MD10 and MD56 counters until 15 seconds have elapsed. At this point, it will examine the bit TB15 at the JMP1 location in RAM 108 to determine whether or not the 15 second duty cycle has been selected. If it has, it will proceed to the magnetron control routine. If not, it will switch to the 15 second control code and recycle, so that the next time through the same subroutine the microprocessor 10 will transfer to the magnetron control routine. This will be at the termination of two 15 second duty cycle intervals which is a 30 second duty cycle interval.

ANTIBACTERIA OPTION

The pressure or absence of diode D12 in the diode matrix 52 selects whether the temperature will be regulated for the whole range indicated by the selected Centrigrade or Farenheit scale, or just regulated for temperatures greater than a minimum level. This minimum level is preferably 140 degrees Farenheit and 60 degrees Centrigrade. It is known that bacteria growth is enhanced at temperatures of between about 90 degrees and 140 degrees F. (32 degrees and 60 degrees C). Accordingly, it is sometimes thought desirable to prevent a probe from maintaining a comestable at a temperature in this range. By providing diode D12 in the diode matrix 52 as indicated, the probe 82 will not hold a comestable at a temperature within this range, but rather will bring it to the selected temperature and then cease heating. If diode D12 is not strapped into position, the probe 82 will regulate comestable temperature as selected through inputs from the key matrix 78 at any valid selected temperature. Acceptable temperatures for this purpose are from 100–199 degrees F. and 40–89 degrees C.

The state of the diode D12 is recorded at the ANTB bit position of JMP1 at column D, row 1 of ram 108, indicated in FIG. 4. If this bit is true, indicating the presence of diode D12, a temperature probe hold routine will include an examination to determine whether or not the desired probe temperature has been set within the prohibited range. If it has, the microprocessor 10 will not load a power level of 10 into the active power level register (APL) in RAM 108, at column 4, row 3. Rather, it will load zero into this register.

The microprocessor 10 examines the state of the antibacteria (ANTB) bit beginning at location $\phi 578$ of Appendix A. The B register 10 is first directed to the JMP1 register of RAM 108. Instruction $\phi 54E$ will skip instruction $\phi 567$ if the antibacteria bit is not set. The lower section 114 of the B register is then loaded with a count of 10 which is transferred by the accumulator 100 into the active power level register APL at column 4, row 3 of RAM 108. If the antibacteria bit has been set, the system will transfer to perform the instruction at instruction location $\phi 574$. The system then determines whether or not the Centrigrade scale has been selected so that it is able to ascertain whether regulation should be prohibited below 140 degrees or below 60 degrees, depending, respectively, upon whether the Farenheit or Centrigrade scale has been selected. The determination in this regard required only an examination of the DEGC bit at the JMP1 location in RAM 108. A different constant is added to the accumulator 100, depending upon whether the system is dealing with Centrigrade or Farenheit temperatures. The B register 110 is then pointed to the CK1B register in RAM 108, which is but one digit of the desired temperature. The carry register 104 is cleared and the contents of the CK1B register are added to the contents of the accumulator and the system skips the next instruction if there is a carry out. This will occur only if the desired temperature is greater than 140 degrees F. or greater than 60 degrees C. In such a case the system will proceed to perform instruction 0553 to load the active power level register (APL) in RAM 108, at column 4, row 3, with a count of 10. If the desired temperature is below this threshold, the system will return from the subroutine and set a 0 in the APL register.

ANNUNCIATOR OPTION

One further alternative feature of the invention is not governed by the diodes in the diode matrix 52. An annunciator, or line may be placed above or below numbers or letters appearing side by side in the display 80. Depending upon the physical location of the display 80, the annunciator may be seen more easily from one vantage point or another, depending upon its position above or below the character positions of the display 80. Accordingly, a jumper 170 indicated as electrical straps J3 and J4 in FIG. 1*b* may be provided at the output of RIO8 to provide an input either to the BOTTOM lead of display 80 or to the TOP lead thereof. A connection to the BOTTOM lead will provide an underline at the character positions displayed. A connection to the TOP lead will provide an annuciator over the character positions in which a character is displayed.

With countertop microwave ovens, it is sometimes easier to see annunciators at the bottom of the characters, while with built in microwave ovens over stoves or in an upper oven compartment it is sometimes easier to see an annunciator at the top of a displayed character. While the jumper 170 has been indicated as an alternative selection, it should be appreciated that jumpers J3 or J4 could be connected to either, neither or both of the BOTTOM and TOP annunciator leads, depending upon the display option desired.

KEY OPTION

Further manufacture requirements may direct that certain of the key positions in the keyboard matrix 78 should not be connected for actuation. For example, in some microwave ovens the delayed start (DEL START) and CLOCK keys, and their associated strap or pad connections may be omitted entirely. The switches indicated in association therewith are then removed and there are no corresponding key appearance in the key matrix 78. The minimum key configuration required includes all of the number 0 through 9 and the cook 1 key (CK1) the START key and the RESET key. Without this minimum configuration, this system cannot operate properly.

While the controller of the invention has been depicted and explained in connection with an embodiment in a microwave oven, it should be understood that the same advantages and features can likewise be employed in association with different types of appliances. For example, a self diagnostic dishwasher, washing machine, dryer, television set, stereo or other appliance can be employed to similar advantage. Likewise, various optional features may be provided by diode connections in the manner explained in connection with the illustrated embodiment. Accordingly, the scope of the invention should not be construed as limited to the specific embodiment described and illustrated herein, but rather is defined by the scope of the claims appended hereto.

APPENDIX A

```
                *
                *
                *
                *
                *           DEFROST REGISTER
                *
0000    DEFD    EQU     #00         MSD
0001    DEFC    EQU     #01         LSD+2
0002    DEFB    EQU     #02         LSD+1
0003    DEFA    EQU     #03         LSD
                *
                *
                *           DELAY START REGISTER
                *
0010    DTHR    EQU     #10         TENS HOURS
0011    DUHR    EQU     #11         UNITS HOURS
0012    DTMN    EQU     #12         TENS MINUTES
0013    DUMN    EQU     #13         UNITS MINUTES
                *
                *
                *           CLOCK REGISTER
                *
0020    CTHR    EQU     #20         TENS HOURS
0021    CUHR    EQU     #21         UNITS HOURS
0022    CTMN    EQU     #22         TENS MINUTES
0023    CUMN    EQU     #23         UNITS MINUTES
0024    CTSC    EQU     #24         TENS SECONDS
0025    CUSC    EQU     #25         UNITS SECONDS
0026    CTFR.   EQU     #26         TENS FRACTIONS
0027    CUFR    EQU     #27         UNITS FRACTIONS
                *
                *
                *           DISPLAY REGISTER
                *
0030    DISD    EQU     #30         MSD
0031    DISC    EQU     #31         LSD+2
0032    DISB    EQU     #32         LSD+1
0033    DISA    EQU     #33         LSD
                *
                *
                *           COOK 1 (SET TEMP) REGISTER
                *
0040    CK1D    EQU     #40         MSD
0041    CK1C    EQU     #41         LSD+2
0042    CK1B    EQU     #42         LSD+1
0043    CK1A    EQU     #43         LSD
                *
                *
                *           COOK 2 (ACTUAL TEMP) REGISTER
                *
0050    CK2D    EQU     #50         MSD
0051    CK2C    EQU     #51         LSD+2
0052    CK2B    EQU     #52         LSD+1
0053    CK2A    EQU     #53         LSD
                *
                *
                *           COOK 3 (DEGREE) REGISTER
                *
0060    CK3D    EQU     #60         MSD
0061    CK3C    EQU     #61         LSD+2
0062    CK3B    EQU     #62         LSD+1
0063    CK3A    EQU     #63         LSD
                *
                *
```

```
                *               COOK 4 (BROWN) (OUTPUT COUNTER) REGISTER
                *
0070    CK4D    EQU     #70     MSD
0071    CK4C    EQU     #71     LSD+2
0072    CK4B    EQU     #72     LSD+1
0073    CK4A    EQU     #73     LSD
                *
                *
                *               POWER LEVEL REGISTERS
                *
0004    PLC     EQU     #04     POWER LEVEL COUNTER
0014    PLSL    EQU     #14     POWER LEVEL SELECTED
0034    APL     EQU     #34     ACTIVE POWER LEVEL
0044    PL1     EQU     #44     COOK 1 (PROBE) POWER LEVEL
0054    PL2     EQU     #54     COOK 2 POWER LEVEL
0064    PL3     EQU     #64     COOK 3 POWER LEVEL
0074    PL4     EQU     #74     COOK 4 POWER LEVEL
0045    PL1X    EQU     #45     COOK 1 AUX. POWER LEVEL
                *
                *
                *               MODULO COUNTERS
                *
0007    MD10    EQU     #07     MOD 10
0006    MD56    EQU     #06     MOD 5 / MOD 6
0005    MD4     EQU     #05     MOD 4
                *
                *
                *               OVEN STATUS REGISTERS
                *
0008    ST1     EQU     #08     ACTIVE STATUS (1)
0001    CK1     EQU     1       COOK 1 BIT
0002    CK2     EQU     2       COOK 2 BIT
0003    CK3     EQU     3       COOK 3 BIT
0004    CK4     EQU     4       COOK 4 BIT
                *
0009    ST2     EQU     #09     ACTIVE STATUS (2)
0001    PRB     EQU     1       PROBE BIT
                *
0018    ST1R    EQU     #18     RECALL STATUS (1)
0001    CK1R    EQU     1       COOK 1 BIT (RECALL)
0002    CK2R    EQU     2       COOK 2 BIT (RECALL)
0003    CK3R    EQU     3       COOK 3 BIT (RECALL)
0004    CK4R    EQU     4       COOK 4 BIT (RECALL)
                *
0019    ST2R    EQU     #19     RECALL STATUS (2)
0001    PRBR    EQU     1       PROBE BIT (RECALL)
                *
                *
                *               FLAG REGISTERS
                *
000B    FLG1    EQU     #0B     FLAG REGISTER 1
0001    KD      EQU     1       KEY DOWN BIT
0002    KBC     EQU     2       KEY BOARD CLEAR BIT
                *
000C    FLG2    EQU     #0C     FLAG REGISTER 2
0001    STRT    EQU     1       START BIT
0002    HOLD    EQU     2       PROBE HOLD BIT
0003    KYLK    EQU     3       # KEY LOCK BIT
0004    PIO     EQU     4       PROBE IN / OUT BIT
                *
000D    FLG3    EQU     #0D     FLAG REGISTER 3
0001    EROR    EQU     1       ENTRY ERROR BIT
0002    BKDS    EQU     2       BLANK DISPLAY BIT
0003    DYST    EQU     3       DELAY START BIT
0004    CLNO    EQU     4       COLON OFF BIT
                *
002F    FLG4    EQU     #2F     FLAG REGISTER 4
0001    CKEN    EQU     1       CLOCK ENABLE BIT
0002    TERR    EQU     2       TEST ERROR BIT
                *
                *
```

```
              *                SEGMENT OUTPUT REGISTERS
              *
    000E    SEG1    EQU    #0E        SEGMENT DATA (RIO1 THRU RIO4)
    000F    SEG2    EQU    #0F        SEGMENT DATA (RIO5 THRU RIO8)
              *
              *
              *                MAGNETRON PHASING
              *
    001E    LPKC    EQU    #1E        PEAK VOLTAGE COUNTER (LSD)
    001F    MPKC    EQU    #1F        PEAK VOLTAGE COUNTER (MSD)
              *
    003E    LPKV    EQU    #3E        PEAK VOLTAGE VALUE REGISTER (LSD)
    003F    MPKV    EQU    #3F        PEAK VOLTAGE VALUE REGISTER (MSD)
              *
              *
              *                12 HOUR PROBE COUNTER
              *
    004C    12HA    EQU    #4C        LSD
    004D    12HB    EQU    #4D        LSD+1
    004E    12HC    EQU    #4E        LSD+2
    004F    12HD    EQU    #4F        MSD
              *
              *
              *                JUMPER INPUT STORAGE REGISTERS
              *
    001D    JMP1    EQU    #1D        JUMPER ROW 1 STORAGE
    0001    TB01    EQU    1          1 SECOND DUTY CYCLE BIT
    0002    TB15    EQU    2          15 SECOND DUTY CYCLE BIT
    0003    DEGC    EQU    3          DEGREE C / DEGREE F
    0004    ANTB    EQU    4          ANTIBACTERIA / BACTERIA
              *
    001C    JMP2    EQU    #1C        JUMPER ROW 2 STORAGE
    0001    DRO+    EQU    1          DOOR OPEN: HIGH / LOW
    0002    DEFR    EQU    2          DEFROST / COOK 1
    0003    STSP    EQU    3          START-STOP / START
    0004    BEP     EQU    4          NO BEEP / BEEP
              *
    001B    JMP3    EQU    #1B        JUMPER ROW 3 STORAGE
    0001    PRI+    EQU    1          PROBE IN: HIGH / LOW
    0002    ZERO    EQU    2          POWER ON: STATIC / FLASH ZEROS
    0003    HOBY    EQU    3          BYPASS HOLD / HOLD
    0004    BRWN    EQU    4          BROWN / COOK 4
              *
              *
              *                MISC REGISTERS AND COUNTERS
              *
    000A    DPT     EQU    #0A        DISPLAY POINTER REGISTER
    0004    KPP     EQU    4          # KEY PREVIOUSLY PRESSED BIT
    0015    CH1     EQU    #15        CHANNEL 1 INPUT REGISTER
    0016    SWCR    EQU    #16        SLEW COUNTER
    0017    MAG3    EQU    #17        3 SECOND MAGNETRON DELAY REGISTER
    0037    KEY3    EQU    #37        3 SECOND DELAY RECALL REGISTER
    003D    SCRT    EQU    #3D        SCRATCH REGISTER
    004A    DUT1    EQU    #4A        20/40 COUNTER (DEFROST 1 SECOND DC) (LSD)
    004B    DUT2    EQU    #4B        20/40 COUNTER (DEFROST 1 SECOND DC) (MSD)
              *
              *
              *
              *
              *
              *                DIO LINES CONFIGURATION
              *
    0000    TMS     EQU    0          TENS MINUTES DIGIT
    0001    UMS     EQU    1          UNITS MINUTES DIGIT
    0002    TSS     EQU    2          TENS SECONDS DIGIT
    0003    USS     EQU    3          UNITS SECONDS DIGIT
    0004    ANNT    EQU    4          ANNICIATOR OUTPUT
    0005    BRN     EQU    5          BROWNER CONTROL
```

```
0006    MAG     EQU     6           MAGNETRON CONTROL
0007    FAN     EQU     7           FAN + STIRRER CONTROL
0008    ALRM    EQU     8           AUDIBLE ALARM OUTPUT
0009    TEST    EQU     9           DIAGNOSTIC TEST MODE INPUT
        *
        *
        *
        *
        *                   DIAGNOSTIC TEST MODE:
        *
        *       THIS MODE TESTS OUT THE RAM MEMORY AND INPUT-OUTPUT FUNC-
        *       TIONS OF THE MICROCOMPUTER. IT ALSO PERFORMS A TEST ON
        *       THE EXTERNAL HARDWARE OF THE CONTROL (MAGNETRON, FAN,
        *       BROWN AND PROBE CIRCUITRY.
        *       THERE IS ALSO A KEYBOARD AND DIODE OPTION MATRIX VERIFI-
        *       CATION CHECK.
        *       THE FOLLOWING IS A LIST OF ERROR CODES AND A BRIEF EX-
        *       PLANATION OF POSSIBLE CAUSES OF THE ERROR. THE ERROR CODE
        *       FLASHES IN THE DISPLAY AND REMAIN UNTIL A POWER ON IS
        *       ENCOUNTERED OR A KEYBOARD CHECK IS PERFORMED.
        *
        *
        *
        *
        *       ERROR CODE:             COMMENT:
        *
        *           100         INSTRUCTION OR RAM ERROR:
        *                           INDICATES THAT THE INSTRUCTIONS OR RAM
        *                           MEMORY OF THE MICRO HAS FAILED. NORMAL-
        *                           LY THIS WOULD INDICATE A DEFECTIVE MICRO,
        *                           BUT AN IMPROPER VOLTAGE (VDD) SUPPLIED
        *                           TO THE CHIP COULD ALSO CAUSE THE PROBLEM
        *
        *           2XY         RIO ERROR:
        *                           INDICATES THAT A RIO LINE EITHER FAILED
        *                           TO GO ON OR OFF. THE MICRO COULD BE AT
        *                           FAULT BUT ALSO EXTERNAL HARDWARE COULD
        *                           CAUSE THE ERROR.
        *                           IN THE TABLE LISTED BELOW ARE THE CORRECT
        *                           STATES OF THE RESPECTIVE OUTPUTS. ERROR
        *                           CODE OF XY INDICATES THAT STATES RECIEVED
        *                           DIFFERED FROM STATES LISTED.
        *                           "1" = LINE ON (VSS)
        *                           "0" = LINE OFF (-V)
        *
        *                                           RIO LINE #
        *                                   8   7   6   5   4   3   2   1
        *
        *                           CODE:
        *                           X Y
        *
        *                           0 1     0   0   0   0   0   0   0   1
        *                           0 2     0   0   0   0   0   0   1   0
        *                           0 4     0   0   0   0   0   1   0   0
        *                           0 8     0   0   0   0   1   0   0   0
        *                           1 0     0   0   0   1   0   0   0   0
        *                           2 0     0   0   1   0   0   0   0   0
        *                           4 0     0   1   0   0   0   0   0   0
        *                           8 0     1   0   0   0   0   0   0   0
        *
        *           300         INT0 (FREQUENCY INTERUPT) ERROR:
        *                           INDICATES THAT THE LINE INTERUPT IS MISS-
        *                           ING OR OCCURING AT TOO HIGH FREQUENCY.
        *                           POSSIBLE CAUSES ARE ABSENCE OF LINE
        *                           FREQUENCY INTERUPT INTO INT0 OR MICRO.
        *
        *           40X         DIO ERROR:
        *                           INDICATES THAT A DIO LINE FAILED TO GO ON
        *                           OR OFF. THE MICRO COULD BE THE FAULT BUT
```

```
                     ALSO EXTERNAL HARDWARE COULD CAUSE THE ERROR.
                     X = DIO LINE # THAT FAILED.

50X          FEEDBACK ERROR:
                     THE PULSE TRANSFORMER OUTPUT IS ROUTED BACK
                     TO THE DOOR INTERLOCK INPUT. THE BROWN RELAY
                     OUTPUT IS ROUTED BACK TO THE PROBE IN/OUT
                     INPUT AND THE FAN RELAY OUTPUT IS ROUTED BACK
                     TO THE 50/60 HZ INPUT. THIS ENABLES THE MICRO
                     TO EXERCISE THE EXTERNAL HARDWARE. POSSI-
                     BLE CAUSES OF ERROR COULD BE DIO LINES 5
                     THRU 7, PI LINES 6 THRU 8, ASSOCIATED CIR-
                     CUITRY OR MICRO.
                     IN THE TABLE LISTED BELOW ARE THE CORRECT
                     STATES OF THE RESPECTIVE OUTPUTS. ERROR CODE
                     OF X INDICATES THAT STATES RECIEVED DIFFERED
                     FROM STATES LISTED.

X       FAN OUTPUT     MAG OUTPUT    BROWN OUTPUT
                              (DIO 7)        (DIO 6)        (DIO 5)

7          ON             ON             ON
                     6          OFF            ON             ON
                     5          OFF            OFF            ON
                     4          OFF            OFF            OFF

601          PROBE OPEN ERROR:
                     THIS INDICATES THAT THE MICRO IS SENSING
                     A PROBE OPEN CONDITION (PROBE RESISTANCE
                     > 300K OHMS APPROX.) POSSIBLE CAUSES ARE
                     COMPARATOR, ASSOCIATED PROBE CIRCUITRY
                     OR MICRO.

608          PROBE HIGH TEMP. ERROR:
                     THIS INDICATES THAT THE MICRO IS SENSING
                     A PROBE RESISTANCE THAT IS LESS THAN 9385
                     OHMS APPROX. (PROPER TEST PROBE RESISTANCE
                     IS FROM 9385 TO 16652 OHMS APPROX.). POS-
                     SIBLE CAUSES ARE COMPARATOR, LADDER NET-
                     WORK, INVERTERS OR MICRO.

605          PROBE LOW TEMP. ERROR:
                     THIS INDICATES THAT THE MICRO IS SENSING
                     A PROBE RESISTANCE THAT IS GREATER THAN
                     16652 OHMS APPROX. (PROPER TEST PROBE RE-
                     SISTANCE IS FROM 9385 TO 16652 OHMS AP-
                     PROX.) POSSIBLE CAUSES ARE COMPARATOR,
                     LADDER NETWORK, INVERTERS OR MICRO.

THE FOLLOWING IS THE EXTERNAL WIRING AND COMPONENTS RE-
QUIRED TO PLACE THE CONTROL IN THE DIAGNOSTIC TEST MODE.

SIGNAL NAME:         PIN #:

MT2                  1         NOT CONNECTED

MT1                  2         ....................................

GATE                 3         .........*....C=6.8 MF 6V..........*
```

```
*       DOOR INTL      4      .........*....R=470 OHM .25W.......*
*                                                                 .
*                                                                 .
*                                                                 .
*       PROBE IN/OUT   5      .........*....R=470 OHM 2W.........*
*                                                                 .
*                                                                 .
*                                                                 .
*       TEMP. THER.    6      .............R=12.3K OHM 2%........*
*                                                                 .
*                                                                 .
*                                                                 .
*  .    BROWN RELAY    7      ..........                          .
*                                                                 .
*                                                                 .
*                                                                 .
*       FAN RELAY      8      .........*....R=470 OHM 2W.........*
*                                                                 .
*                                                                 .
*                                                                 .
*       (GUIDE)        9                  .                       .
*                                                                 .
*                                                                 .
*                                                                 .
*       GROUND         10     ........................................*
*                                                                 .
*                                                                 .
*                                                                 .
*       50/60 HZ       11     ..........                          .
*                                                                 .
*                                                                 .
*                                                                 .
*       TEST     .     12     ................................
*
*
*
*
*                  KEYBOARD VERIFICATION CHECK:
*
*       THE KEYBOARD CAN BE CHECKED TO SEE IF THE MICRO
*       IS DECODING THE PROPER KEY, BY MERELY PRESSING
*       THE KEY AND HOLDING IT IN. THE DISPLAY WILL READ
*       THE KEY CODE FOR THE RECIEVED KEY.
*       THE FOLLOWING IS A TABLE OF CODES DISPLAYED FOR
*       A GIVEN KEY PRESSED. (REFERENCE SCHEMATIC FOR X-Y)
*
*              Y1      Y2      Y3      Y4      Y5
*
*       X1     0000    0404    0808    1212    1616
*       X2     0101    0505    0909    1313    1717
*       X3     0202    0606    1010    1414    1818
*       X4     0303    0707    1111    1515    1919
*
*
*                DIODE OPTION MATRIX VERIFICATION CHECK:
*
*       THE DIODE OPTION MATRIX IS DISPLAYED AFTER
*       A KEY IS RELEASED. THIS READOUT INDICATES WHICH
*       OPTIONS ARE SELECTED ON THE CIRCUIT BOARD BY
*       DISPLAYING A CODE CORRESPONDING TO EACH DIODES PRE-
*       SENCE OR ABSENCE. THE EXPLAINATION OF THE CODE IS OB-
*       TAINED BY THE FOLLOWING TABLE: (D=DIODE OPTION #)
*
*       DISPLAY
*       POSITION:       BIT "8"    BIT "4"    BIT "2"    BIT "1"
*
*         MSD             -          -          -          -
*         LSD+2           D4         D1         D2         D3
*         LSD+1           D5         D8         D7         D6
*         LSD             D12        D9         D10        D11
```

```
*
*
*       BY USING THE BINARY CODE AND IF A DIODE
*       IS IN IS A "1" AND A DIODE OUT IS A "0", THE
*       FOLLOWING TABLE GIVES THE SYMBOL DISPLAYED
*       FOR A GIVEN CODE.
*
*       CODE:              DISPLAYED SYMBOL:
*
*       0000                       0
*       0001                       1
*       0010                       2
*       0011                       3
*       0100                       4
*       0101                       5
*       0110                       6
*       0111                       7
*       1000                       8
*       1001                       9
*       1010                       H
*       1011                       O
*       1100                       L
*       1101                       D
*       1110                       -
*       1111                       BLANK
*
*       THE DIODE OPTIONS DESIGNATED FROM D1 TO D12 ARE:
*
*       DIODE #            DIODE IN / DIODE OUT
*
*         D1               BYPASS PROBE HOLD / PROBE HOLD
*         D2               POWER ON: STATIC ZEROS / FLASH ZEROS
*         D3               PROBE IN POLARITY: HIGH / LOW
*         D4               BROWN / COOK 4
*         D5               NO BEEP / BEEP
*         D6               DOOR OPEN POLARITY: HIGH / LOW
*         D7               DEFROST / COOK 1
*         D8               START-STOP / START
*         D9               DEGREE C / DEGREE F
*         D10              15 SECOND DUTY / 30 SECOND DUTY (SEE NOTE)
*         D11              1 SECOND DUTY / 30 SECOND DUTY (SEE NOTE)
*         D12              ANTIBACTERIA / BACTERIA
*
*              NOTE: FOR 30 SECOND DUTY CYCLE BOTH DIODES
*                    (D10 AND D11) MUST BE REMOVED.
*
*
*
*
*
*
*
*
*              ORG      #000
*
0000 1B STA   LB       FLG1
0020 29       SKBF     KBC         KBC FLAG SET?
0010 20       SB       KD          YES, RESET KD FLAG
0008 21       SB       KBC         NO, SET KBC FLAG
0004 4F       LAI      15          TURN SEGMENTS OFF
0002 75       LXA
0021 73       OX
0030 7B       IOA
0018 1D       LB       FLG3
000C 2A       SKBF     DYST        DELAY START BIT SET?
0006 D0       T        CSB         YES
0023 1A       LB       DPT         NO
0011 2B       SKBF     KPP         CORRECT FOR KPP BIT, BIT SET?
0028 4B       LAI      11          YES
0014 43       LAI      3           NO
```

```
000A 2A          SKBF  3           ROW 4-7 SELECTED?
0025 E1          T     R4PR        YES
0032 7F          SKMEA             NO, ROW 3 SELECTED?
0039 F4          T     CO          NO
003C E8          T     CF          YES
001E 1C R4PR     LB    FLG2
002F 2B CSB      SKBF  PIO         PROBE IN/OUT (COLON OFF) BIT SET?
0017 47 CF       LAI   7           YES, COLON OFF BITS
000B 44 CO       LAI   4           NO, COLON ON BITS
0005 1F          LB    SEG2
0022 2B          SKBF  4           SAVE ANNICIATOR BIT
0031 68          AISK  8
0038 00          NOP
001C 5C          X     0
000E 14          LB    4           INITIALIZE STROBE
0027 70 KBD1     SOS               ACTIVATE STROBE
0013 7A          XAB
0009 74          XAS               SAVE STROBE IN S REG.
0024 1D          LB    FLG3
0012 29          SKBF  BKDS        BLANK DISPLAY BIT SET?
0029 D1          T     BYPS        YES, BYPASS SEGMENT OUTPUT
0034 1F          LB    SEG2        NO
001A 58          XDSK  0           GET SEG2 DATA
002D 75          LXA
0036 50          L     0           GET SEG1 DATA
003B 7B          IOA               OUTPUT SEGMENT 1 DATA
001D 73          OX                OUTPUT SEGMENT 2 DATA
002E 1A BYPS     LB    DPT
0037 50          L     0
001B 2B          SKBF  4           KPP BIT SET?
000D 43          LAI   3           YES
0026 30          TMLB  TAB1        NO, POINT TO ROW TO BE OUTPUT
0033 3F
0019 BF
002C D8          T     KBD1
0016 53 LDJP     L     3           XFER JUMPER ROW DATA TO CLOCK REG.
002B 7A          XAB
0015 66          DC
002A 7A          XAB
0035 00          NOP
003A 5B          XDSK  3
003D E0          T     *+3
003E 3B          TL    REP1
003F E6
001F 7A          XAB
000F 6A          AISK  10
0007 00          NOP
0003 7A          XAB
0001 E9          T     LDJP
         *
         *
         *
         *
00 AVAIL
                 ORG   #040
         *
0040 46 FCNM     LAI   6
0060 7D          ACSK              NUMBER KEY PRESSED?
0050 FD          T     NUM         YES
0048 3D          TL    FUNC        NO, FUNCTION KEY
0044 FF
0042 1C NUM      LB    FLG2
0061 2B          SKBF  PIO         PROBE IN / OUT BIT SET?
0070 48          LAI   8           YES
0058 40          LAI   0           NO
004C 7F          SKMEA             START, # KEY LOCK OR HOLD BIT SET?
0046 82          TM    START       YES
0063 1A          LB    DPT         NO
0051 2B          SKBF  KPP         # KEY PREVIOUSLY PRESSED BIT SET?
0068 E5          T     DISF        YES
```

```
0054 43            LAI    3              NO
004A 7F            SKMEA                 DISPLAY POINTER = 3?
0065 E6            T      DG=0           NO
0072 14            LBL    PLSL
0079 09
007C 51            L      1
005E 34            TML    TAB            POINT TO RESPECTIVE POWER LEVEL REG.
006F BF
0057 79            XAX                   AND STORE KEY PRESSED
004B 54            XNSK   0
0045 50            L      0
0062 5C            X      0
0071 50            L      0
0078 10            LBL    DISD
005C 0B
004E 54            XNSK   0              STORE # KEY PRESSED INTO MSD OF DISPLAY REG.
0067 40            LAI    0
0053 5C            X      0
0049 1C            LB     FLG2
0064 22            SB     KYLK           SET # KEY LOCK BIT
0052 1A  SKPP      LB     DPT
0069 23            SB     KPP            SET # KEY PREVIOUSLY PRESSED BIT
0074 C2            T      BPST           SOUND BEEP
005A 10  DISF      LBL    DISD
006D 0B
0076 4F            LAI    15
007B 7F            SKMEA                 MSD OF DISPLAY REG. = 15?
005D 82            TM     START          NO
006E 13            LBL    DISA           YES
0077 0B
005B 79            XAX                   SHIFT DISPLAY REG. LEFT
004D 58            XDSK   0              AND STORE KEY PRESSED INTO LSD
0066 F2            T      *-1
0073 ED            T      SKPP
0059 79  DG=0      XAX
006C 75            LXA
0056 6F            AISK   15             DIGIT A ZERO?
0068 D5            T      *+2            NO
0055 82            TM     START          YES
006A 34            TML    FTD            LOAD "F"S INTO DISPLAY REG
0075 AE
007A E5            T      DISF
007D 4F  BPST      LAI    15
007E 4E  CKRS      LAI    14
007F 4D  BPCT      LAI    13
005F 4C  BPSS      LAI    12
004F 74            XAS
0047 88            TM     BEEP           SOUND BEEP
0043 AA  CPDY      TM     DEL3           COMPENSATE FOR PROBE DELAY
0041 2F            RT
            *
            *
            *
            *
00 AVAIL
                   ORG    #080
            *
0080 62  FUNC      AISK   2
00A0 00            NOP
0099 05  FUN1      RC
0088 75            LXA                   STORE FUNCTION KEY IN X
0084 1C            LB     FLG2
0082 67            AISK   7              "RESET" PRESSED?
00A1 3E            TL     CKRS           YES
00B0 C1
0098 61            AISK   1              NO, "START" PRESSED?
008C 06            SC                    YES
0036 64            AISK   4              NO, ANY "COOK 1 THRU COOK 4" KEY PRESSED?
00A3 DA            T      FUN2           YES
```

```
0091 61          AISK    1           NO, "PROBE" PRESSED?
00A3 2B          SKBF    PIO         YES, PROBE IN / OUT BIT SET?
0094 C6          T       FUN2+2      NO, YES
008A 82          TM      START       NO
00A5 2B  FUN2    SKBF    PIO         PROBE IN / OUT BIT SET?
00B2 82          TM      START       YES
00B9 1A          LB      DPT         NO
00BC 3C          TML     FUN3
009E BF
00AF 1C          LB      FLG2
0097 28          SKBF    STRT        START BIT SET?
008B DD          T       *+2         YES
0085 25          RB      HOLD        NO, RESET HOLD BIT
00A2 79          XAX
00B1 75          LXA
00B8 6F          AISK    15          POWER LEVEL PRESSED?
009C 3A          TL      RGX0        NO
008E FF
00A7 14          LBL     PLSL        YES
0093 09
0089 4C          LAI     12
00A4 7D          ACSK                POWER LEVEL SELECTED REG. >= 4?
0092 82          TM      START       NO
00A9 47          LAI     7           YES
00B4 7F          SKMEA               POWER LEVEL SELECTED REG. = 7?
009A D1          T       DP3         NO
00AD 1B          LBL     JNP3        YES
00B6 09
00BB 2B          SKBF    BRWN        BROWN BIT SET?
009D 82          TM      START       YES
00AE 1A  DP3     LB      DPT         NO
00B7 43          LAI     3           LOAD 3 INTO DISPLAY POINTER REG.
009B 5C          X       0
008D 34          TML     FTD         LOAD "F"S INTO DISPLAY REG.
00A6 AE
00B3 14          LBL     PLSL
0099 09
00AC 51          L       1           GET POWER LEVEL REQUESTED
0096 75          LXA
00AB 34          TML     TAB         POINT TO CORRECT ROW FOR POWER LEVEL
0095 BF
00AA 50          L       0           GET POWER LEVEL
00B5 10          LBL     DISD
00BA 0B
00BD 54          XNSK    0           LOAD POWER LEVEL INTO MSD OF DISPLAY REG.
00BE 50          L       0
00BF 30          SKAEI   10          POWER LEVEL = 10?
009F 65
008F 40          LAI     0           NO
0087 41          LAI     1           YES
0083 35          TL      XSB
0081 C2
        *
        *
        *
        *
   00 AVAIL
                 ORG     #0C0
        *
00C0 2B  FUN3    SKBF    KPP         # KEY PREVIOUSLY PRESSED BIT SET?
00E0 DE          T       FUN4        YES
00D0 02          SKNC                NO, "START" PRESSED?
00C8 39          TL      STPP        YES
00C4 FF
00C2 2F          RT                  NO
00E1 50  FUN4    L       0
00F0 65          AISK    5           "CLOCK" OR "DELAYED START" PREVIOUSLY SELECTED?
00D8 D8          T       PBPS        NO
00CC 12          LBL     DISB        YES
00C6 0B
```

```
00E3 50            L      0
00D1 58            XDSK   0
00E8 6A            AISK   10         LSD+1 OF DISPLAY REG. >= 6?
00D4 C0            T      ERR        YES
00CA 50            L      0          NO
00E5 58            XDSK   0
00F2 61            AISK   1          LSD+2 OF DISPLAY REG. = F?
00F9 C0            T      ERR        YES
00FC 50            L      0          NO
00DE 61            AISK   1          MSD OF DISPLAY REG. = F?
00EF F6            T      PASS       YES
00D7 41            LAI    1          NO
00CB 7F            SKMEA             MSD OF DISPLAY REG. = 1?
00C5 C0            T      ERR        NO
00E2 11            LBL    DISC       YES
00F1 0B
00F8 50            L      0
00DC 6D            AISK   13         LSD+2 OF DISPLAY REG. > 2?
00CE C0            T      ERR        YES
00E7 3B  PBPS      TML    PBPX       NO, "PROBE" PREVIOUSLY SELECTED?
00D3 A5
00C9 3B  PASS      TL     DSSR       NO
00E4 FF
00D2 10            LBL    DISD       YES
00E9 0B
00F4 4F            LAI    15
00DA 7F            SKMEA             MSD OF DISPLAY REG. = 15?
00ED C0            T      ERR        NO
00F6 1D            LBL    JMP1       YES
00FB 09
00DD 2A            SKBF   DEGC       DEGREE C SELECTED?
00EE 4F            LAI    15         YES
00F7 41            LAI    1          NO
00DB 11            LBL    DISC
00CD 0B
00E6 7F            SKMEA             LSD+2 OF DISPLAY REG. = 1 (F) OR 15 (C)?
00F3 C0            T      ERR        NO
00D9 61            AISK   1          YES, DEGREE C SELECTED?
00EC D4            T      *+2        YES
00D6 F6            T      PASS       NO
00EB 12            LBL    DISB
00D5 0B
00EA 50            L      0
00F5 67            AISK   7
00FA 00            NOP
00FD 65            AISK   5          LSD+1 OF DISPLAY REG. >3 OR <9?
00FE F6            T      PASS       YES
00FF 1D  ERR       LB     FLG3       NO
00DF 20            SB     EROR       SET ENTRY ERROR BIT
00CF 1C            LB     FLG2
00C7 22            SB     KYLK       SET # KEY LOCK BIT
00C3 82            TM     START
         *
         *
         *
         *
01 AVAIL
                   ORG    #100
         *
0100 1A  DSSR      LB     DPT
0120 50            L      0
0110 74            XAS
0108 50            L      0          GET DISPLAY POINTER
0104 68            AISK   8          CORRECT FOR KPP BIT
0102 34  RPTD      TML    TAB        POINT TO CORRECT ROW TO LOAD
0121 BF
0130 43            LAI    3
0118 76            LBA
010C 07            SAG               XFER DISPLAY REG. TO PREVIOUSLY SELECTED REG.
0106 50            L      0
```

```
0123 58           XDSK    0
0111 F3           T       *-3
0128 40           LAI     0
0114 74           XAS
010A 30           SKAEI   12      "COOK 1" PREVIOUSLY SELECTED?
0125 63
0132 CE           T       CKSL    NO
0139 15           LBL     PL1X    YES, XFER AUX. COOK 1 TO COOK 1
013C 0C
011E 50           L       0       POWER LEVEL REG.
012F 14           LBL     PL1
0117 0C
010B 5C           X       0
0105 1A           LB      DPT
0122 CF           T       RPTD+2  XFER DISPLAY REG. TO DEFROST REG.
0131 30  CKSL     SKAEI   10      "CLOCK" PREVIOUSLY SELECTED?
0138 65
011C 3C           TL      FUN3+2  NO
010E EF
0127 14           LBL     CTSC    YES
0113 0A
0109 9A           TM      CLRG    CLEAR CLOCK FRACTIONS AND SECONDS
0124 1F           LBL     FLG4
0112 0A
0129 20           SB      CKEN    SET CLOCK ENABLE BIT
0134 E3           T       CKSL+2
011A 1A  PBPX     LB      DPT
012D 4C           LAI     12
0136 7F           SKMEA           "PROBE" OR "COOK 1" PREVIOUSLY SELECTED?
013B 2F           RT              NO
011D 1C           LB      FLG2    YES
012E 2B           SKBF    PIO     PROBE IN OUT BIT SET?
0137 2E           RTSK            YES
011B 2F           RT              NO
010D 01  EDGX     SKISL           EDGE?
0126 EA           T       PRX     NO
0133 70           SOS             YES
0119 99  REP1     TM      INCL    INCREMENT CLOCK
012C 30           TLB     I5/6
0116 3C
012B FF
0115 1C  PRX      LB      FLG2
012A 2B           SKBF    PIO     PROBE IN/OUT BIT SET?
0135 C0           T       *+4     YES
013A 8F           TM      CKPR    NO, PROBE IN?
013D 82           TM      START   NO
013E A2           TM      RST     YES
013F 8F           TM      CKPR    PROBE IN?
011F A2           TM      RST     NO
010F 30           TMLB    PROB    YES, INTERGRATE PROBE
0107 38
0103 BF
0101 82           TM      START
           *
           *
           *
           *
00 AVAIL
                  ORG     #140
           *
0140 34  RGX0     TML     REG0    CHECK REG. FOR ZEROS
0160 A2
0150 1A           LB      DPT
0148 79           XAX
0144 75           LXA
0142 30           SKAEI   3       "PROBE" PRESSED?
0161 6C
0170 F3           T       *+2     NO
0158 44           LAI     4       YES, JAM COOK 1 CODE
```

```
014C 5C              X      0
0146 50              L      0
0163 14              LBL    PLSL
0151 09
0168 5C              X      0            LOAD VALUE INTO POWER LEVEL SELECTED REG.
0154 18   CL12       LBL    ST1R
014A 09
0165 40              LAI    0            CLEAR ST1R AND ST2R REGS.
0172 54              XNSK   0
0179 40              LAI    0
017C 5C              X      0
015E 1C              LB     FLG2
016F 05              RC
0157 28              SKBF   STRT         START BIT SET?
014B 06              SC                  YES
0145 79              XAX                 NO
0162 6D              AISK   13           "PROBE, COOK 1 THRU COOK 4" PRESSED?
0171 E3              T      *+2          YES
0178 E9              T      KY12         NO
015C 19              LBL    ST2R
014E 09
0167 77              COM
0153 61   SBNS       AISK   1            "PROBE" PRESSED?
0149 20              SB     PRB          SET PROBE BIT
0164 5C              DECB   0
0152 58
0169 61              AISK   1            "COOK 1" PRESSED?
0174 20              SB     CK1          YES, SET COOK 1 BIT
015A 61              AISK   1            NO, "COOK 2" PRESSED?
016D 21              SB     CK2          YES, SET COOK 2 BIT
0176 61              AISK   1            NO, "COOK 3" PRESSED?
017B 22              SB     CK3          YES, SET COOK 3 BIT
015D 61              AISK   1            NO, "COOK 4" PRESSED?
016E 23              SB     CK4          YES, SET COOK 4 BIT
0177 02              SKNC                NO, START BIT SET?
015B E9              T      KY12         YES
014D 19              LB     ST2          NO
0166 6B              AISK   11
0173 00              NOP
0159 06              SC
016C EC              T      SBNS
0156 17   KY12       LBL    KEY3
016B 0B
0155 4C              LAI    12           LOAD 12 INTO KEY3 REG.
016A 5C              X      0
0175 1C              LB     FLG2
017A 26              RB     KYLK         RESET # KEY LOCK BIT
017D 3E              TL     BPST         SOUND BEEP
017E C2
017F 1C   PSET       LB     FLG2
015F 2B              SKBF   PIO          PROBE IN/OUT BIT SET?
014F 38              TL     INIX         YES
0147 FF
0143 35              TL     ANYX         NO
0141 FF
              *
              *
              *
              *
00 AVAIL
                     ORG    #180
              *
0180 BD   STPP       TM     CKDR         DOOR OPEN?
01A0 82              TM     START        YES
0190 18              LB     ST1          NO
0188 50              L      0
0184 75              LXA                 SAVE COOK STATUS IN X
0182 34              TML    REG0         CHECK REG. FOR ZEROS
01A1 A2
```

```
01B0 50            L      0
0198 19            LB     ST2
018C 7E            A
0186 6F            AISK   15        COOK1-4 OR PROBE BIT SET?
01A3 DA            T      *+5       YES
0191 18            LB     ST1       NO
01A8 79            XAX              RECOVER COOK STATUS
0194 5C            X      0
018A 82            TM     START
01A5 1C            LB     FLG2
01B2 28            SKBF   STRT      START BIT SET?
01B9 31            TL     CKSS      YES
01BC D6
019E 20            SB     STRT      NO, SET START BIT
01AF 3E            TL     BPCT      SOUND BEEP
0197 C0
018B 13   STCT     LBL    DUMN
0185 09
01A2 34            TML    RG=0      DELAYED START REG. = 0?
01B1 AC
01B8 DB            T      PK15      YES
019C 1D            LB     FLG3      NO
018E 22            SB     DYST      SET DELAY START BIT
01A7 93            TM     RES1      RESTORE DISPLAY POINTER AND
0193 A9            TM     RES2      POWER LEVEL SELECTED REG.
0189 82            TM     START
01A4 1E   PK15     LBL    LPKV
0192 0B
01A9 4F            LAI    15        LOAD 15 INTO PEAK VOLTAGE VALUE REG.
01B4 54            XNSK   0
019A D6            T      *-2
01AD B9            TM     DIN0      WAIT FOR EDGE
01B6 1E   PEAK     LBL    LPKV
01BB 0B
019D 06            SC
01AE 40            LAI    0
01B7 7C            AC               COMPUTE PEAK VOLTAGE COUNT
019B 54            XNSK   0
018D D1            T      *-3
01A6 4E            LAI    14
01B3 6F            AISK   15
0199 CC            T      *-1
01AC 1B            LB     11
0196 00            NOP
01AB 01            SKISL            EDGE?
0195 C9            T      PEAK      NO
01AA 70            SOS              YES
01B5 99            TM     INCL      INCREMENT CLOCK
01BA 99            TM     INCL      INCREMENT CLOCK
01BD 17            LBL    MAG3
01BE 09
01BF 4C            LAI    12
019F 5C            X      0         LOAD 12 INTO MAG3 REG.
018F 3A            TL     PSET
0187 C0
          *
          *
          *
          *
02 AVAIL
                   ORG    #1C0
          *
01C0 30   INIX     TMLB   P>=S      CHECK FOR PROBE TEMP. >= SET TEMP.
01E0 37
01D0 B1
01C8 93   INIT     TM     RES1      RESTORE DISPLAY POINTER AND
01C4 A9            TM     RES2      POWER LEVEL SELECTED REG.
01C2 17            LB     MD10
01E1 40            LAI    0         CLEAR MOD 10, MOD 5/6, POWER LEVEL COUNTER
```

```
01F0 58        XDSK   0
01D8 4F        LAI    15
01CC 30        SKBEI  3
01C6 43
01E3 DE        T      *-5
01D1 15        LB     MD4
01E8 5C        X      0                LOAD 15 INTO MOD 4 COUNTER
01D4 1A        LBL    DUT1
01CA 0C
01E5 9A        TM     CLRG             CLEAR 12 HOUR AND 20/40 COUNTERS
01F2 1C        LB     FLG2
01F9 29        SKBF   HOLD             HOLD BIT SET?
01FC E3        T      APL0             YES
01DE 14        LBL    PLSL             NO
01EF 09
01D7 51        L      1
01CB 34        TML    TAB
01C3 6F
01E2 50        L      0                XFER RESPECTIVE POWER LEVEL REG.
01F1 07        SAG                     TO ACTUAL POWER LEVEL REG.
01F8 5C        X      0
01DC 14 APL0   LBL    APL
01CE 0B
01E7 50        L      0
01D3 6F        AISK   15               ACTUAL POWER LEVEL REG. = 0?
....  ..       T      ...              NO
01E4 8E        TM     MGOF             YES, TURN MAGGIE OFF
01D2 B6        TM     FNON             TURN FAN ON
01E9 B9        TM     DIN0             WAIT FOR EDGE
01F4 99        TM     INCL             INCREMENT CLOCK IF REQUIRED
01DA 1C        LB     FLG2
01ED 2B        SKBF   PIO              PROBE IN/OUT BIT SET?
01F6 37        TL     I12H             YES
01FB DA
01DD 1B        LBL    JMP3             NO
01EE 09
01F7 2B        SKBF   BRWN             BROWN BIT SET?
01DB D9        T      BRST             YES
01CD 82        TM     START            NO
01E6 18 BRST   LB     ST1
01F3 48        LAI    8
01D9 7F        SKMEA                   COOK 4 BIT SET ONLY?
01EC 82        TM     START            NO
01D6 8E CK4S   TM     MGOF             YES, TURN MAGGIE OFF
01EB B9        TM     DIN0             WAIT FOR EDGE
01D5 99        TM     INCL             INCREMENT CLOCK
01EA 98        TM     BNON             TURN BROWNER ON
01F5 B9        TM     DIN0             WAIT FOR EDGE
01FA 99        TM     INCL             INCREMENT CLOCK
01FD 99        TM     INCL             INCREMENT CLOCK
01FE B9        TM     DIN0             WAIT FOR EDGE
01FF 99        TM     INCL             INCREMENT CLOCK IF REQUIRED
01DF B9        TM     DIN0             WAIT FOR EDGE
01CF AC        TM     MGON             TURN MAGGIE ON
01C7 82        TM     START
          *
          *
          *
          *
02 AVAIL
               ORG    #200
          *
0200 0A KY15   EOB    2                POINT TO KEY3 REG.
0220 50        L      0
0210 61        AISK   1                INCREMENT KEY3 REG., REG. =15?
0208 E7        T      DYS              YES
0204 5C        X      0                NO
0202 50        L      0
0221 61        AISK   1                KEY3 REG. = 15?
```

```
0230 C5            T     RCST    YES, RESTORE DPT AND PLSL REGS.
0218 1D  DYS   LB        FLG3    NO
020C 2A        SKBF      DYST    DELAY START BIT SET?
0206 82        TM        START   YES
0223 1C        LB        FLG2    NO
0211 2B        SKBF      PIO     PROBE IN/OUT BIT SET?
0228 DA        T         I12H    YES
0214 36        TL        CONV    NO
020A FF
0225 1C  I12H  LBL       12HA
0232 0C
0239 06        SC
023C 40        LAI       0
021E 7C        AC                INCREMENT 12 HOUR COUNTER
022F 75        LXA
0217 54        XNSK      0
020B C3        T         *-4
0205 79        XAX
0222 65        AISK      5       12 HOUR COUNTER OVERFLOW?
0231 31        TML       BY12    YES
0238 8E
021C 17        LBL       KEY3    NO
020E 08
0227 4F        LAI       15
0213 7F        SKMEA             KEY3 REG. = 15?
0209 82        TM        START   NO
0224 1C  HB?   LB        FLG2    YES
0212 22        SB        KYLK    SET # KEY LOCK BIT
0229 29        SKBF      HOLD    HOLD BIT SET?
0234 E4        T         HBS     YES
021A 13        LBL       CK2A    NO
022D 0D
0236 50        L         0
023B 07        SAG               XFER ACTUAL TEMP REG.
021D 58        XDSK      0       TO DISPLAY REG.
022E C9        T         *-3
0237 82        TM        START
021B 13  HBS   LBL       DISA    XFER "HOLD" TO DISPLAY REG.
020D 0B
0226 4D        LAI       13      "D"
0233 58        XDSK      0
0219 4C        LAI       12      "L"
022C 58        XDSK      0
0216 4B        LAI       11      "O"
022B 58        XDSK      0
0215 4A        LAI       10      "H"
022A 5C        X         0
0235 82        TM        START
023A 93  RCST  TM        RES1
023D A9        TM        RES2
023E E7        T         DYS
023F 75  INPJ  LXA
021F 73        OX                OUTPUT ROW CODE
020F 94        TM        DEL2    STABILIZATION DELAY
0207 A1        TM        INP     INPUT JUMPER DATA
0203 58        XDSK      0
0201 2F        RT
           *
           *
           *
           *
00 AVAIL
               ORG       #240
           *
0240 93  CONV  TM        RES1
0260 75        LXA
0250 10        LB        0
0248 34        TML       TAB
0244 BF
```

```
0242 34          TML    FTZ      CONVERT RESPECTIVE REG. "F"S TO ZEROS
0261 83
0270 05          RC
0258 96 DDR      TM     M10D     DECREMENT RESPECTIVE COOK REG.
024C 58          XDSK   0
0246 92          TM     M06D
0263 58          XDSK   0
0251 E7          T      DDR
0268 43          LAI    3
0254 76          LBA
024A 34          TML    RG=0     DECREMENTED REG. = 0?
0265 AC
0272 DD          T      CKBT     YES
0279 79          XAX             NO
027C 10          LB     0
025E 34          TML    TAB
026F BF
0257 34          TML    ZTF      CONVERT LEAD "0"S TO "F"S
024B 86
0245 82          TM     START
0262 28 CKBT     SKBF   CK1      COOK 1 BIT SET?
0271 C4          T      CKDF     YES
0278 29          SKBF   CK2      NO, COOK 2 BIT SET?
025C CB          T      RCK2     YES
024E 2A          SKBF   CK3      NO, COOK 3 BIT SET?
0267 D2          T      RCK3     YES
0253 27          RB     CK4      NO, RESET COOK 4 BIT
0249 FC          T      ANYS
0264 18 RCK1     LB     ST1
0252 24          RB     CK1      RESET COOK 1 BIT
0269 FC          T      ANYS
0274 25 RCK2     RB     CK2      RESET COOK 2 BIT
025A FC          T      ANYS
026D 26 RCK3     RB     CK3      RESET COOK 3 BIT
0276 FC          T      ANYS
027B 1C CKDF     LBL    JMP2
025D 09
026E 29          SKBF   DEFR     DEFROST BIT SET?
0277 33          TML    D1S      YES, ONE SECOND DUTY CYCLE SELECTED?
025B 85
024D DB          T      RCK1     NO, YES
0266 13          LB     DEFA     NO
0273 4F          LAI    15
0259 7F          SKMEA           DEFROST REG. LSD = 15?
026C EA          T      *+3      NO
0256 DB          T      RCK1     YES
026B 0C          EOB    4
0255 5C          X      0
026A 0C          EOB    4
0275 58          XDSK   0
027A D4          T      *-4
027D 14          LBL    PL1
027E 0C
027F 40          LAI    0        LOAD 0 INTO COOK 1 POWER LEVEL REG.
025F 54          XNSK   0
024F 00          NOP
0247 5C          X      0        SAVE COOK 1 POWER LEVEL IN AUX. PLR
0243 35 ANYS     TL     ANYX
0241 FF
          *
          *
          *
          *
   00 AVAIL
                 ORG    #280
          *
0280 18 ANYX     LB     ST1
02A0 40          LAI    0
0290 7F          SKMEA           ANY COOK BITS SET?
0288 38          TL     INIT     YES
```

```
0284 F7
0282 99        TM    INCL    NO, INCREMENT CLOCK
02A1 05        RC            NO
02B0 F9        T     *+3
0298 99 DROP   TM    INCL    INCREMENT CLOCK
028C 06        SC
0286 8E        TM    MGOF    TURN MAGGIE OFF
02A3 B9        TM    DIN0    WAIT FOR EDGE
0291 9D        TM    BNOF    TURN BROWNER OFF
02A8 87        TM    FNOF    TURN FAN OFF
0294 93        TM    RES1    RESTORE DISPLAY POINTER AND
028A A9        TM    RES2    POWER LEVEL SELECTED REGS.
02A5 1C        LB    FLG2
02B2 24        RB    STRT    RESET START BIT
02B9 1D        LB    FLG3
02BC 26        RB    DYST    RESET DELAY START BIT
029E 02        SKNC          CARRY SET?
02AF 37        TL    HB?     YES
0297 DB
028B 30 PBAL  TMLB   ALARM   NO, SOUND ALARM FOR 3 SECONDS
0285 39
02A2 90
02B1 1F        LBL   FLG4
02B8 0A
029C 28        SKBF  CKEN    CLOCK ENABLE BIT SET?
028E C4        T     ADD3    YES
02A7 1C ADON   LB    FLG2    NO
0293 2B        SKBF  PIO     PROBE IN/OUT BIT SET/
0289 ED        T     *+2     YES
02A4 A2        TM    RST     NO
0292 1B        LBL   JMP3
02A9 09
02B4 2A        SKBF  HOBY    HOLD BYPASS BIT SET?
029A A2        TM    RST     YES, RESET SYSTEM
02AD 38        TL    INIT    NO
02B6 F7
02BB 30 ADD3  TMLB   ISEC    ADD 3 SECONDS TO CLOCK FOR ALARM COMPENSATIO
029D 35
02AE 90
02B7 30        TMLB  ISEC
029B 35
028D 90
02A6 30        TMLB  ISEC
02B3 35
0299 90
02AC 78        I2C
0296 68        AISK  8       60 HZ SELECTED?
02AB D5        T     *+2     NO
0295 D8        T     ADON    YES
02AA B9        TM    DIN0    WAIT FOR EDGE
02B5 B9        TM    DIN0    WAIT FOR EDGE
02BA D8        T     ADON
02BD 5C XSB    X     0
02BE 43        LAI   3
02BF 1C        LB    FLG2
029F 2B        SKBF  PIO     PROBE IN/OUT BIT SET?
028F 75        LXA           YES
0287 3A        TL    CL12    NO
0283 EB
               *
               *
               *
               *
01 AVAIL
               ORG   #2C0
               *
02C0 2C TAB    TAB           POINT TO B UPPER ACCORDING TO ACC VALUE
02E0 00        NOP
02D0 00        NOP
02C8 08        EOB   0
```

```
02C4 09           EOB    1
02C2 0A           EOB    2
02E1 0B           EOB    3
02F0 0C           EOB    4
02D8 0D           EOB    5
02CC 0E           EOB    6
02C6 0F           EOB    7
02E3 2F           RT
02D1 13  FTD      LBL    DISA
02E8 0B
02D4 4F           LAI    15           LOAD "F"S INTO DISPLAY REG.
02CA 58           XDSK   0
02E5 EB           T      *-2
02F2 2F           RT
02F9 40  ZTF      LAI    0            CONVERT "0"S TO "F"S
02FC 4F  FTZ      LAI    15           CONVERT "F"S TO "0"S
02DE 7F  TX       SKMEA
02EF E3           T      TX+8
02D7 77           COM
02CB 54           XNSK   0
02C5 00           NOP
02E2 30           SKBEI  4
02F1 44
02F8 E1           T      TX
02DC 43           LAI    3
02CE 76           LBA
02E7 2F           RT
02D3 40  RG=0     LAI    0            REG. = 0?
02C9 7F           SKMEA
02E4 C9           T      RTK
02D2 5C           DECB   0
02E9 58
02F4 EC           T      RG=0
02DA 18           LB     ST1
02ED 2F           RT                  REG. = 0
02F6 18  RTK      LB     ST1
02FB 2E           RTSK                REG. NOT = 0
02DD 13  REG0     LBL    CK1A
02EE 0C
02F7 34           TML    RG=0         COOK 1 REG. = 0?
02DB AC
02CD 24           RB     CK1          YES, RESET COOK 1 BIT
02E6 13           LBL    CK2A         NO
02F3 0D
02D9 34           TML    RG=0         COOK 2 REG. = 0?
02EC AC
02D6 25           RB     CK2          YES, RESET COOK 2 BIT
02EB 13           LBL    CK3A         NO
02D5 0E
02EA 34           TML    RG=0         COOK 3 REG. = 0?
02F5 AC
02FA 26           RB     CK3          YES, RESET COOK 3 BIT
02FD 13           LBL    CK4A         NO
02FE 0F
02FF 34           TML    RG=0         COOK 4 REG. = 0?
02DF AC
02CF 27           RB     CK4          YES, RESET COOK 4 BIT
02C7 2F           RT                  NO
                *
                *
                *
02 AVAIL
                  ORG    #300
                *
0300 11  GERX     LBL    CUHR
0320 0A
0310 74           XAS                 STORE ERROR CODE IN CLOCK REG.
0308 58           XDSK   0
0304 4F           LAI    15
0302 5C           X      0
```

```
0321 1F        LBL    FLG4
0330 0A
0318 21        SB     TERR         SET TEST ERROR BIT
030C A2        TM     RST
0306 05 RAMX   RC
0323 7A        XAB
0311 76        LBA
0328 02        SKNC
0314 77        COM
030A 54        XNSK   0
0325 DC        T      RAMX+1
0332 7A        XAB
0329 76        LBA
033C 02        SKNC
031E 77        COM
032F 7F        SKMEA
0317 FF        T      GERX
030B 54        XNSK   0
0305 CD        T      *-7
0322 02        SKNC
0331 2F        RT
0338 06        SC
031C DC        T      RAMX+1
030E 40 FD1    LAI    0
0327 48 FD2    LAI    8
0313 4C FD3    LAI    12
0309 4E FD4    LAI    14
0324 79        XAX
0312 7A        XAB
0329 B9        TM     DIN0
0334 B9        TM     DIN0
031A B9        TM     DIN0
032D 7A        XAB
0336 78        I2C
033B 5C        X      0
031D 24        RB     1
032E 79        XAX
0337 7F        SKMEA
031B 30        TLB    DIOC+2
030D 32
0326 D7
0333 71        ROS
0319 58        XDSK   0
032C 2F        RT
0316 19 TSSX   LB     9
032B 71        ROS
0315 01        SKISL               TEST MODE SELECTED?
032A 2F        RT                  YES
0335 2E        RTSK                NO
033A 1D D1S   LBL    JMP1
033D 09
033E 28        SKBF   TB01         ONE SECOND DUTY CYCLE SELECTED?
033F 2F        RT                  YES
031F 2E        RTSK                NO
         *
         *
         *
         *
   04 AVAIL
               ORG    #340
         *
0340 13 NOER   LBL    CUMN         LOAD F'S INTO CLOCK REG.
0360 0A
0350 34        TML    FTD+2
0343 AB
0344 1F        LBL    FLG4
0342 0A
0361 24        RB     CKEN         RESET CLOCK ENABLE BIT
0370 A2        TM     RST
```

```
0358 BC  KTM   TM    TSSL      TEST MODE SELECTED?
034C CD        T     KYTS      YES
0346 15        LBL   CH1       NO
0363 09
0351 02        SKNC            STROBING LINE 4?
0368 3D        TL    FUN1      YES
0354 EF
034A 3E        TL    FCNM      NO
0365 FF
0372 1F  KYTS  LBL   FLG4
0379 0A
037C 21        SB    TERR      SET TEST ERROR BIT
035E 02        SKNC            STROBING LINE 4?
036F CC        T     STL4      YES
0357 15        LBL   CH1       NO
034B 09
0345 46        LAI   6
0362 7D        ACSK
0371 6A        AISK  10
0378 74        XAS
035C 02        SKNC
034E 41        LAI   1
0367 40        LAI   0
0353 10  LDCK  LBL   CTHR
0349 0A
0364 54        XNSK  0
0352 50        L     0
0369 74        XAS
0374 54        XNSK  0
035A 50        L     0
036D 74        XAS
0376 54        XNSK  0
037B 74        XAS
035D 54        XNSK  0
036E 1D        LB    FLG3
0377 24        RB    EROR      RESET ENTRY ERROR BIT
035B 25        RB    BKDS      RESET BLANK DISPLAY BIT
034D 3E        TL    BPST      SOUND BEEP
0366 C2
0373 68  STL4  AISK  8
0359 66        DC
036C C7        T     LDCK-4
0356 BC  TMSX  TM    TSSL      TEST MODE SELECTED?
036B D5        T     *+2       YES
0355 2F        RT              NO
036A 1F        LBL   FLG4
0375 0A
037A 29        SKBF  TERR      TEST ERROR BIT SET?
037D C0        T     *+2       YES
037E F0        T     *+3       NO
037F 1D        LB    FLG3
035F 20        SB    EROR      SET ENTRY ERROR BIT
034F 1B        LB    FLG1
0347 21        SB    KBC       SET KBC FLAG
0343 82        TM    START
              *
              *
              *
              *
              *
01 AVAIL
               ORG   #380
0380 40  SPDF  LAI   0
03A0 5C        X     0         CLEAR MOD 4 COUNTER
0390 18        LB    ST1
0383 28        SKBF  CK1       COOK 1 BIT SET?
0384 F9        T     SPDX      YES
0382 14  SPDY  LBL   APL       NO
03A1 0A
```

```
0380 30              TLB   M400+1
0398 3A
038C DF
0386 1C  SPDX   LBL   JMP2
03A3 09
0391 29         SKBF  DEFR        DEFROST BIT SET?
03A8 F5         T     *+2         YES
0394 FD         T     SPDY        NO
038A 1A  LBL    DUT1
03A5 0C
03B2 06         SC                INCREMENT 20/40 COUNTER
03B9 8B         TM    M10I
03BC 54         XNSK  0
039E 89         TM    M06I
03AF 5C         X     0
0397 50         L     0
038B 6E         AISK  14          20/40 COUNTER >= 20?
0385 DB         T     MGOX        YES
03A2 FD         T     SPDY        NO
03B1 33  BY12   TML   D1S         ONE SECOND DUTY CYCLE SELECTED?
03B8 85
039C D8         T     *+2         YES
038E A2         TM    RST         NO
03A7 29         SKBF  TB15        15 SECOND DUTY CYCLE SELECTED?
0393 2F         RT                YES, BYPASS 12 HOUR COUNTER RESET
0389 A2         TM    RST         NO
03A4 8E  MGOX   TM    MGOF        TURN MAGGIE OFF
0392 82         TM    START
03A9 1C  CKSS   LBL   JMP2
03B4 09
039A 2A         SKBF  STSP        START-STOP BIT SET?
03AD 3E         TL    BPSS        YES, SOUND BEEP
03B6 E0
03BB 82         TM    START       NO
                *
                *
                *
                *
         23 AVAIL
                ORG   #3C0
                *
03C0 00  PWRON  NOP
03E0 00         NOP
03D0 10         LBL   CTHR        CLEAR CLOCK REG.
03C8 0A
03C4 9A         TM    CLRG
03C2 05         RC
03E1 E7         T     *+2
03F0 06  RESET  SC
03D8 19         LB    TEST        RESET ALL DIO LINES
03CC 71         ROS
03D6 5C         DECB  0
03E3 58
03D1 F3         T     *-3
03E8 8F         TM    OTAB        TURN SEGMENTS OFF
03D4 10         LB    DEFD
03CA 9A         TM    CLRG        CLEAR ROW 0 RAM
03E5 09         EOB   1
03F2 9A         TM    CLRG        CLEAR ROW 1 RAM
03F9 0A         EOB   2
03FC 9A         TM    CLRG        CLEAR ROW 3 RAM
03DE 0F         EOB   7
03EF 9A         TM    CLRG        CLEAR ROW 4 RAM
03D7 09         EOB   1
03CB 9A         TM    CLRG        CLEAR ROW 5 RAM
03C5 0B         EOB   3
03E2 9A         TM    CLRG        CLEAR ROW 6 RAM
03F1 09         EOB   1
03F8 9A         TM    CLRG        CLEAR ROW 7 RAM
```

```
03DC 1D        LBL   JMP1
03CE 09
03E7 4D        LAI   13
03D3 37        TML   INPJ      INPUT AND STORE JUMPER ROW 1
03C9 80
03E4 4B        LAI   11
03D2 37        TML   INPJ      INPUT AND STORE JUMPER ROW 2
03E9 80
03F4 47        LAI   7
03DA 37        TML   INPJ      INPUT AND STORE JUMPER ROW 3
03ED 80
03F6 1A        LB    DPT
03FB 21        SB    2         ENABLE CLOCK REG. TO DISPLAY
03DD 1C        LB    FLG2
03EE 22        SB    KYLK      SET # KEY LOCK BIT
03F7 32        TML   TMSX
03DB A9
03CD 1B        LBL   JMP3
03E6 09
03F3 02        SKNC            CARRY SET?
03D9 C5        T     SCLK      YES
03EC 29        SKBF  ZERO      NO, STATIC ZERO BIT SET?
03D6 C5        T     SCLK      YES
03EB 1D        LB    FLG3      NO
03D5 20        SB    EROR      SET ENTRY ERROR BIT
03EA 1A        LB    DPT
03F5 23        SB    KPP       SET # KEY PREVIOUSLY PRESSED BIT
03FA 14 SCLK   LBL   PL2
03FD 0D
03FE 4A        LAI   10
03FF 5F        X     3         LOAD COOK 2 POWER LEVEL REG. WITH 10
03DF 4A        LAI   10
03CF 5D        X     1         LOAD COOK 3 POWER LEVEL REG. WITH 10
03C7 30        TLB   CONR
03C3 36
03C1 FF
               *
               *
               *
               *
     00 AVAIL
               ORG   #400
               *
0400 34 TAB1   TML   TAB
0420 BF
0410 74        XAS             GET CURRENT STROBE
0408 76        LBA
0404 74        XAS
0402 5C        DECB  0         DECREMENT CURRENT STROBE
0421 58
0430 00        NOP
0418 50        L     0         GET BCD OF DIGIT TO BE OUTPUT
040C 75        LXA
0406 2C        TAB             MAKE FIRST PART OF SEGMENT (RIO1-RIO4)
0423 05        RC
0411 00        NOP
0428 40        LAI   0         "0"
0414 49        LAI   9         "1"
040A 44        LAI   4         "2"
0425 40        LAI   0         "3"
0432 49        LAI   9         "4"
0439 42        LAI   2         "5"
043C 42        LAI   2         "6"
041E 48        LAI   8         "7"
042F 40        LAI   0         "8"
0417 40        LAI   0         "9"
040B 49        LAI   9         "H"
0405 43        LAI   3         "O"
0422 47        LAI   7         "L"
```

```
0431 41         LAI    1               "D"
0438 4F         LAI    15              "-"
041C 4F         LAI    15              "BLANK"
040E 1E         LB     SEG1
0427 54         XNSK   0                STORE FIRST PART INTO SEG1
0413 79         XAX
0409 2C         TAB                     MAKE SECOND PART OF SEGMENT (RI05-RI08)
0424 00         NOP
0412 00         NOP
0429 4C         LAI    12              "0"
0434 4F         LAI    15              "1"
041A 4A         LAI    10              "2"
042D 4B         LAI    11              "3"
0436 49         LAI    9               "4"
043B 49         LAI    9               "5"
041D 48         LAI    8               "6"
042E 4F         LAI    15              "7"
0437 48         LAI    8               "8"
041B 49         LAI    9               "9"
040D 48         LAI    8               "H"
0426 4A         LAI    10              "O"
0433 4C         LAI    12              "L"
0419 4A         LAI    10              "D"
042C 4B         LAI    11              "-"
0416 4F         LAI    15              "BLANK"
042B 5C         X      0                STORE SECOND PART INTO SEG2
0415 17         LBL    KEY3
042A 0B
0435 50         L      0
043A 1C         LB     FLG2
043D 28         SKBF   STRT             START BIT SET?
043E 61         AISK   1                YES, KEY3 REG. =15?
043F 18         LB     ST1              NO, YES, POINT TO ST1
041F 18         LBL    ST1R             NO, POINT TO ST1R
040F 09
0407 30         TLB    CPST             COMPUTE STATUS BITS
0403 3E
0401 FF
         *
         *
         *
         *
00 AVAIL
                ORG    #440
         *
0440 74 CPST    XAS
0460 75         LXA
0450 6C         AISK   12               CURRENT STROBE -1 = 3?
0448 C3         T      CPRB             YES, COMPUTE PROBE LIGHT
0444 61         AISK   1                NO, CURRENT STROBE -1 = 2?
0442 DA         T      CCK4             YES, COMPUTE COOK 4 LIGHT
0461 61         AISK   1                NO, CURRENT STROBE -1 = 1?
0470 D7         T      CCK2             YES, COMPUTE COOK 2 LIGHT
0458 61         AISK   1                NO, CURRENT STROBE -1 = 0?
044C D0         T      CCK1             YES, COMPUTE COOK 1 LIGHT
0446 2A CCK3    SKBF   3                NO, COMPUTE COOK 3 LIGHT, COOK 3 BIT SET?
0463 06         SC                      YES, ENABLE COOK 3 LIGHT
0451 F4         T      SGOF             NO
0468 29 CCK2    SKBF   2                COOK 2 BIT SET?
0454 06         SC                      YES, ENABLE COOK 2 LIGHT
044A F4         T      SGOF             NO
0465 2B CCK4    SKBF   4                COOK 4 BIT SET?
0472 06         SC                      YES, ENABLE COOK 4 LIGHT
0479 F4         T      SGOF             NO
047C 49 CPRB    LAI    9
045E 76         LBA                     POINT TO PROBE STATUS REG.
046F 28 CCK1    SKBF   1                COOK 1 BIT SET?
0457 06         SC                      YES, ENABLE COOK 1 LIGHT
044B 1F SGOF    LB     SEG2             NO
```

```
0445 02        SKNC           FLAG SET?
0462 27        RB    4        YES, ENABLE STATUS TO LIGHT
0471 4F  TSG0  LAI   15
0478 79        XAX             GET CURRENT STROBE
045C 7A        XAB             LOAD STROBE INTO B
044E 7B        IOA             TURN SEGMENTS OFF
0467 73        OX
0453 71        ROS             DEACTIVATE STROBE
0449 5C        DECB  0         DECREMENT STROBE, LAST?
0464 58
0452 2F        RT              NO, RETURN TO ACTIVATE NEXT STROBE
0469 4E        LAI   14        YES, ENABLE ALL MATRIX SWITCHES
0474 75        LXA
045A 73        OX
046D 40        LAI   0
0476 7B        IOA
047B B5        TM    RT
045D 41        LAI   1
046E 60        I1SK            KEY PRESSED?
0477 CA        T     W1        NO
045B 1B        LB    FLG1      YES
044D 25        RB    KBC       RESET KBC FLAG
0466 28        SKBF  KD        KD FLAG SET?
0473 30        TLB   KYDN      NO
0459 3D
046C FF
0456 BC        TM    TSSL      YES, TEST MODE SELECTED?
046B 3B        TL    REP1      YES
0455 E6
046A C2        T     *+3       NO
0475 BC  W1    TM    TSSL      TEST MODE SELECTED?
047A E0        T     W2        YES
047D 1B        LB    11        NO
047E 3B        TL    EDGX
047F F2
045F 1D  W2    LB    FLG3
044F 28        SKBF  EROR      ENTRY ERROR BIT SET?
0447 D4        T     W1-3      YES
0443 09        EOB   1         NO
0441 2E        RTSK
               *
               *
               *
               *
00 AVAIL
               ORG   #480
               *
0480 24  KYDN  RB    KD        SET KD FLAG
04A0 B9        TM    DIN0      DEBOUNCE DELAY
 ... ..        ...   INCL      INCREMENT CLOCK
0488 99        TM    INCL      INCREMENT CLOCK
0484 BF        TM    OTAB      TURN SEGMENTS OFF
0482 06        SC
04A1 41        LAI   1
04B0 B9        TM    DIN0      DEBOUNCE DELAY
0498 15        LBL   CH1
048C 09
0486 5C  KBD2  X     0
04A3 50        L     0         GET NEXT STROBE
0491 77        COM
04A8 02        SKNC            STROBING LINE 4?
0494 DB        T     KBD4      YES
048A 7B        IOA             NO
04A5 94  KBD3  TM    DEL2      DELAY
04B2 A1        TM    INP       INPUT MATRIX SWITCHES
04B9 68        AISK  8         X4 LINE TRUE?
04BC CB        T     BK4       YES
049E 64        AISK  4         NO, X3 LINE TRUE?
04AF E5        T     BK3       YES
```

```
0497 62        AISK   2            NO, X2 LINE TRUE?
048B D2        T      BK2          YES
0485 61        AISK   1            NO, X1 LINE TRUE?
04A2 C9        T      BK1          YES
04B1 50        L      0            NO
04B8 02        SKNC                STROBING LINE 4?
049C 40        LAI    0            YES, FORCE TO REPEAT
048E 05        RC                  NO
04A7 7D        ACSK                KEY PRESSED?
0493 F9        T      KBD2         YES
0489 82        TM     START        NO
04A4 75 KBD4   LXA
0492 73        OX                  ENABLE LINE 4
04A9 DA        T      KBD3
04B4 43 BK4    LAI    3            CONSTRUCT BINARY CODE FOR KEY PRESSED
049A 42 BK3    LAI    2
04AD 41 BK2    LAI    1
04B6 40 BK1    LAI    0
04BB 74        XAS
049D 4C        LAI    12
04AE 2A        SKBF   3
04B7 48        LAI    8
049B 29        SKBF   2
048D 44        LAI    4
04A6 28        SKBF   1
04B3 40        LAI    0
0499 5C        X      0
04AC 74        XAS
0496 02        SKNC                STROBING LINE 4?
04AB C1        T      KBD5         YES
0495 7E        A                   NO
04AA 75        LXA                 STORE NUMBER INTO X REG.
04B5 5C        X      0
04BA 32        TL     KTM
04BD E7
04BE 6E KBD5   AISK   14           APPLY OFFSET TO LINE 4 KEYS
04BF F0        T      *+2
049F 6A        AISK   10
048F 32        TL     KTM
0487 E7
               *
               *
               *
               *
       02 AVAIL
               ORG    #4C0
               *
04C0 16 I5/6   LB     MD56
04E0 06        SC
04D0 78        I2C                 INPUT CHANNEL 2
04C8 68        AISK   8            60 HZ SELECT?
04C4 D0        T      MD5I         NO, INCREMENT MOD 5
04C2 89        TM     M06I         YES, INCREMENT MOD 6
04E1 50 ISLW   X      1
04F0 4B        LAI    11
04D8 7D        ACSK
04CC 65        AISK   5
04C6 5C        X      0
04E3 02        SKNC                SLEW COUNTER OVERFLOW?
04D1 DD        T      EEBS         YES
04E8 BC GODR   TM     TSSL         NO, TEST MODE SELECTED?
04D4 30        TLB    STTX         YES
04CA 3A
04E5 F2
04F2 1C        LB     FLG2         NO
04F9 28        SKBF   STRT         START BIT SET?
04FC C8        T      GO           YES
04DE 82        TM     START        NO
04EF 4B MD5I   LAI    11
```

```
04D7 7D           ACSK
04CB 65           AISK    5          INCREMENT MOD 5
04C5 DE           T       ISLW
04E2 1D  EEBS     LB      FLG3
04F1 28           SKBF    EROR       ENRTY ERROR BIT SET?
04F8 EC           T       COMB       YES
04DC 2A           SKBF    DYST       NO, DELAY START BIT SET?
04CE E5           T       COMC       YES
04E7 D7           T       GODR       NO
04D3 29  COMB     SKBF    BKDS       BLANK DISPLAY BIT SET?
04C9 D6           T       *+3        YES
04E4 21           SB      BKDS       NO, SET BLANK DISPLAY BIT
04D2 D7           T       GODR
04E9 25           RB      BKDS       RESET BLANK DISPLAY BIT
04F4 D7           T       GODR
04DA 2B  COMC     SKBF    CLNO       COLON ON BIT SET?
04ED E2           T       *+3        YES
04F6 23           SB      CLNO       NO, SET COLON ON BIT
04FB D7           T       GODR
04DD 27           RB      CLNO       RESET COLON ON BIT
04EE D7           T       GODR
04F7 BD  GO       TM      CKDR       DOOR OPEN?
04DB 35           TL      DROP       YES
04CD E7
04E6 16           LB      MD56       NO
04F3 40           LAI     0
04D9 7F           SKMEA              MOD 5/6 COUNTER = 0?
04EC 30           TLB     M561       NO
04D6 3B
04EB FF
04D5 17           LB      MD10       YES
04EA 06           SC
04F5 8B           TM      M10I       INCREMENT MOD 10 COUNTER
04FA 5D           X       1          POINT TO MAG3 REG.
04FD 02           SKNC               MOD 10 COUNTER = 0?
04FE E0           T       *+2        YES
04FF 82           TM      START      NO
04DF 40           LAI     0
04CF 7D           ACSK               INCREMENT MAG3 REG. REG. = 15?
04C7 5C           X       0          NO
04C3 37           TL      KY15       YES
04C1 FF
          *
          *
          *
          *
00 AVAIL
                  ORG     #500
          *
0500 41  M561     LAI     1
0520 7F           SKMEA              MOD 5/6 COUNTER = 1?
0510 82           TM      START      NO
0508 1D           LBL     JMP1       YES
0504 09
0502 06           SC
0521 28           SKBF    TB01       ONE SECOND DUTY CYCLE SELECTED?
0530 F6           T       MG15       YES
0518 05           RC                 NO
050C 17           LB      MD10
0506 40           LAI     0
0523 7F           SKMEA              MOD 10 COUNTER = 0?
0511 D2           T       M105       NO
0528 15  M415     LB      MD4        YES
0514 50           L       0
050A 61           AISK    1          INCREMENT MOD 4 COUNTER, = 15?
0525 30           TLB     M400       YES
0532 3A
0539 FF
053C 58           XDSK    0          NO
```

```
051E  49            LAI    9
052F  7F            SKMEA              POWER LEVEL COUNTER = 9?
0517  D9            T      CK1S        NO
050B  40            LAI    0           YES
0505  5C            X      0
0522  15            LB     MD4
0531  4F            LAI    15          LOAD MOD 4 COUNTER WITH 15
0538  5C            X      0
051C  02            SKNC               ONE SECOND DUTY CYCLE SELECTED?
050E  31            TL     SPDF        YES
0527  FF
0513  82            TM     START       NO
0509  17  MG15      LBL    MAG3
0524  09
0512  4F            LAI    15
0529  7F            SKMEA              MAG3 REG. = 15?
0534  82            TM     START       NO
051A  D7            T      M415        YES
052D  45  M105      LAI    5
0536  7F            SKMEA              MOD 10 COUNTER = 5?
053B  82            TM     START       NO
051D  1D            LBL    JMP1        YES
052E  09
0537  29            SKBF   TB15        15 SECOND DUTY CYCLE SELECTED?
051B  D7            T      M415        YES
050D  82            TM     START       NO
0526  02  CK1S      SKNC               ONE SECOND DUTY CYCLE SELECTED?
0533  EA            T      M401        YES
0519  15            LB     MD4         NO
052C  44            LAI    4
0516  7F            SKMEA              MOD 4 COUNTER = 4?
052B  82            TM     START       NO
0515  15  M401      LB     MD4         YES
052A  41            LAI    1           LOAD 1 INTO MOD 4 COUNTER
0535  58            XDSK   0           POINT TO POWER LEVEL COUNTER
053A  41            LAI    1
053D  7E            A                  INCREMENT POWER LEVEL COUNTER
053E  5C            X      0
053F  07            SAG
051F  50            L      0           GET ACTUAL POWER LEVEL
050F  7F            SKMEA              POWER LEVEL COUNTER = ACTUAL POWER LEVEL?
0507  82            TM     START       NO
0503  8E            TM     MGOF        YES, TURN MAGGIE OFF
0501  82            TM     START
              *
              *
              *
              *
00 AVAIL
                    ORG    #540
              *
0540  5B  M400      XDSK   3           CLEAR MOD 4 COUNTER
0560  40            LAI    0
0550  7F            SKMEA              ACTUAL POWER LEVEL REG. = 0?
0548  FD            T      *+2         NO
0544  82            TM     START       YES
0542  1D            LB     FLG3
0561  2A            SKBF   DYST        DELAY START BIT SET?
0570  82            TM     START       YES
0558  1E            LBL    LPKV        NO, XFER PEAK VOLTAGE VALUE INTO
054C  0B
0546  52            L      2           PEAK VOLTAGE COUNTER
0563  56            XNSK   2
0551  F9            T      *-2
0568  B9            TM     DIN0        WAIT FOR EDGE
0554  1E  PVD       LBL    LPKC
054A  09
0565  05            RC
0572  4F            LAI    15
```

```
0579 7C            AC
057C 54            XNSK   0
055E CD            T      *-3
056F 02            SKNC                    DELAY COMPLETE?
0557 EB            T      PVD              NO
054B AC            TM     MGON             YES, TURN MAGGIE ON
0545 B6            TM     FNON             TURN FAN ON
0562 3B            TL     REP1
0571 E6
0578 1D  CKAT     LBL    JMP1
055C 09
054E 2B            SKBF   ANTB             ANTIBACTERIA BIT SET?
0567 CB            T      ANTI             YES
0553 14            LBL    APL              NO
0549 0B
0564 4A            LAI    10
0552 5C            X      0                LOAD 10 INTO ACTIVE POWER LEVEL REG.
0569 2F            RT
0574 2A  ANTI     SKBF   DEGC             DEGREE C SELECTED?
055A 4A            LAI    10               YES
056D 4C            LAI    12               NO
0576 12            LBL    CK1B
057B 0C
055D 05            RC
056E 7D            ACSK                    SET TEMP. < 140 F (60 C)?
0577 2F            RT                      YES
055B EC            T      CKAT+4           NO
054D 1F  STTX     LBL    FLG4
0566 0A
0573 29            SKBF   TERR             TEST ERROR BIT SET?
0559 82            TM     START            YES
056C 30            TLB    STTS
0556 34
056B FF
          *
          *
          *
          *
12 AVAIL
                   ORG    #580
          *
0580 1C  BEPY     LBL    JMP2
05A0 09
0590 2B            SKBF   BEP              BEEP BIT SET?
0588 DC            T      *+8              YES
0584 30            TMLB   BEPX             NO, SOUND BEEP
0582 39
05A1 9D
05B0 99            TM     INCL
0598 99            TM     INCL             INCREMENT CLOCK 4 TIMES
058C 99            TM     INCL
0586 99            TM     INCL
05A3 74            XAS                     GET RETURN CODE
0591 61            AISK   1                S=15?
05A8 82            TM     START            YES
0594 61            AISK   1                NO, S=14?
058A A2            TM     RST              YES
05A5 61            AISK   1                NO, S=13?
05B2 39            TL     STCT             YES
05B9 F4
05BC 35            TL     DROP             NO, S=12
059E E7
05AF 78  ALARM   I2C
0597 68            AISK   8                60 HZ SELECT?
058B 46            LAI    6                NO, SET 50 HZ DURATION
0585 44            LAI    4                YES, SET 60 HZ DURATION
05A2 4F  BEPX     LAI    15               SET BEEP DURATION
05B1 4D  BEPT     LAI    13               SET TEST BEEP DURATION
05B8 1F            LBL    MPKC
059C 09
```

```
058E 58           XDSK   0
05A7 4D           LAI    13
0593 5C           X      0
0589 B9           TM     DIN0        WAIT FOR EDGE
05A4 18  BEAL     LB     ALRM
0592 00           NOP
05A9 70           SOS
05B4 43           LAI    3
059A 6F           AISK   15
05AD E5           T      *-1
05B6 71           ROS
05BB 1B           LB     11
059D 00           NOP
05AE 01           SKISL              EDGE?
05B7 C2           T      BELX        NO
059B 70           SOS                YES, INCREMENT DURATION COUNTER
058D 1E           LBL    LPKC
05A6 09
05B3 06           SC
0599 40           LAI    0
05AC 7C           AC
0596 54           XNSK   0
05AB E6           T      *-3
0595 02           SKNC               DURATION COMPLETE?
05AA 2F           RT                 YES
05B5 00           NOP                NO
05BA DB           T      BEAL
05BD 44  BELX     LAI    4
05BE 6F           AISK   15
05BF C1           T      *-1
059F DB           T      BEAL        REPEAT ALARM
         *
         *
         *
         *
04 AVAIL
                  ORG    #5C0
         *
05C0 13  PROB     LBL    CK4A
05E0 0F
05D0 40           LAI    0
05C8 7F           SKMEA              INCREMENT LSD OUTPUT COUNTER
05C4 40           LAI    0
05C2 41           LAI    1
05E1 58           XDSK   0
05F0 28           SKBF   1           LSD OUTPUT COUNTER = 0?
05D8 40           LAI    0           NO
05CC 41           LAI    1           YES
05C6 7E           A
05E3 54           XNSK   0
05D1 50           L      0
05E8 75           LXA
05D4 7B           IOA                OUTPUT MSD OUTPUT COUNTER
05CA 50           L      0
05E5 79           XAX
05F2 73           OX                 OUTPUT LSD OUTPUT COUNTER
05F9 75           LXA
05FC 61           AISK   1           MSD OUTPUT COUNTER = 15?
05DE C7           T      PBOP        YES
05EF 1D           LBL    SCRT        NO
05D7 0B
05CB 78           I2C                INPUT STATUS
05C5 5C           X      0
05E2 28           SKBF   1           PROBE OPEN?
05F1 D8           T      *+4         NO
05F8 30  PBOP     TLB    POPN        YES
05DC 37
05CE F3
05E7 0A           EOB    2           POINT TO JUMPER 1 REG.
```

```
05D3 06            SC
05C9 2A            SKBF    DEGC      DEGREE C SELECTED?
05E4 E6            T       CSEL      YES
05D2 05            RC                NO
05E9 11            LBL     CK3C
05F4 0E
05DA 41            LAI     1
05ED 58            XDSK    0         LOAD 1 INTO LSD+2 OF DEGREE REG.
05F6 79            XAX
05FB 6D    CKDC    AISK    13        MSD OUTPUT COUNTER >=3(F), 2(C)?
05DD C2            T       CKNG      YES
05EE 4E            LAI     14        NO, SET NEGATIVE BIT
05F7 4F    RNB     LAI     15        RESET NEGATIVE BIT
05DB 5C            X       0
05CD 30            TLB     NOI
05E6 36
05F3 C2
05D9 10    CSEL    LBL     CK3D
05EC 0E
05D6 4F            LAI     15
05EB 54            XNSK    0         LOAD 15 INTO MSD OF DEGREE REG.
05D5 79            XAX
05EA 61            AISK    1         OFFSET DEGREE C STARTING POINT
05F5 4F            LAI     15
05FA C4            T       CKDC
05FD 28    CKNG    SKBF    1         NEGATIVE BIT SET?
05FE 30            TLB     ID        NO
05FF 36
05DF D5
05CF C8            T       RNB       YES
           *
           *
           *
           *
03 AVAIL
                   ORG     #600
           *
0600 58    IDEG    XDSK    0
0620 8B            TM      M10I
0610 5C            X       0
0608 02            SKNC              DEGREE COUNTER OVERFLOW?
0604 F3            T       POPN      YES
0602 04    PCMP    INT1L             NO, PROBE COMPARE?
0621 3E            TL      CPDY      NO
0630 FC
0618 D7            T       POPN+4    YES
060C 13    POPN    LBL     CK3A
0606 0E
0623 34            TML     FTD+2     LOAD 15 INTO DEGREE REG.
0611 AB
0628 13            LBL     CK4A
0614 0F
060A 40            LAI     0
0625 5D            X       1         XFER DEGREE REG. TO ACTUAL TEMP REG.
0632 40            LAI     0         CLEAR DEGREE REG. AND
0639 5F            X       3         CLEAR OUTPUT COUNTERS
063C 5A            XDSK    2
061E F5            T       *-5
062F 1D            LBL     JMP1
0617 09
060B 2A            SKBF    DEGC      DEGREE C SELECTED?
0605 44            LAI     4         YES, LOAD 4 INTO LSD+1 OF DEGREE REG.
0622 40            LAI     0         NO, LOAD 0 INTO LSD+1 OF DEGREE REG.
0631 12            LBL     CK3B
0638 0E
061C 5C            X       0
060E 05    P>=S    RC
0627 13            LBL     CK2A
0613 0D
0609 51            L       1
```

```
0624 77           COM
0612 7C           AC
0629 5C           DECB    1
0634 59
061A F6           T       *-5
062D 1C           LB      FLG2
0636 28           SKBF    STRT         START BIT SET?
063B D1           T       *+2          YES
061D 2F           RT                   NO
062E 1D           LB      FLG3
0637 2A           SKBF    DYST         DELAY START BIT SET?
061B 2F           RT                   YES
060D 02           SKNC                 NO, PROBE TEMP. >= SET TEMP. ?
0626 C0           T       CKHB         NO
0633 8E           TM      MGOF         YES, TURN MAGGIE OFF
0619 14           LBL     APL
062C 0B
0616 40           LAI     0
062B 5C           X       0            LOAD 0 INTO ACTUAL TEMP. REG.
0615 1C           LB      FLG2
062A 29           SKBF    HOLD         HOLD BIT SET?
0635 2F           RT                   YES
063A 21           SB      HOLD         NO, SET HOLD BIT?
063D 35           TL      PBAL         SOUND ALARM
063E F4
063F 1C  CKHB     LB      FLG2
061F 29           SKBF    HOLD         HOLD BIT SET?
060F 30           TLB     CKAT         YES
0607 3A
0603 C7
0601 2F           RT                   NO
         *
         *
         *
         *
00 AVAIL
                  ORG     #640
         *
0640 4A  CONR     LAI     10
0660 5C           X       0            LOAD COOK 4 POWER LEVEL REG. WITH 10
0650 8F           TM      CKPR         PROBE IN?
0648 D0           T       PBOT         NO
0644 1C           LB      FLG2         YES
0642 23           SB      PIO          SET PROBE IN/OUT BIT
0661 1D           LBL     JMP1
0670 09
0658 2A           SKBF    DEGC         DEGREE C SELECTED?
064C 44           LAI     4            YES
0646 41           LAI     1            NO
0663 75           LXA
0651 11           LB      DEFC         LOAD 100 INTO SET TEMP. REG.
0668 6E           AISK    14           DEGREE C SELECTED?
0654 12           LB      DEFB         YES, LOAD 40 INTO SET TEMP. REG.
064A 0C           EOB     4            NO
0665 4F           LAI     15
0672 79           XAX
0679 58           XDSK    0
067C DA           T       *-3
065E CE           T       LDF
066F 1C  PBOT     LBL     JMP2
0657 09
064B 29           SKBF    DEFR         DEFROST BIT SET?
0645 33           TML     D1S          YES, ONE SECOND DUTY CYCLE SELECTED?
0662 85
0671 4A  LDF      LAI     10           NO, YES, LOAD 10 INTO PL1 AND PL1X REGS.
0678 45           LAI     5            NO, LOAD 5 INTO PL1 AND PL1X REGS.
065C 14           LBL     PL1
064E 0C
0667 54           XNSK    0
```

```
0653 50              L      0
0649 5C              X      0
0664 1F    LDBL      LB     SEG2
0652 4F              LAI    15
0669 5C              X      0         LOAD BLANKS INTO SEG2 REG
0674 82              TM     START
065A 13    DS=C      LBL    CUMN
066D 0A
0676 53              L      3
067B 7F              SKMEA             DELAY START REG. = CLOCK REG. ?
065D 2F              RT                NO
066E 5B              XDSK   3
0677 C9              T      *-4
065B 13              LBL    DUMN      YES, CLEAR DELAY START REG.
064D 09
0666 40              LAI    0
0673 58              XDSK   0
0659 D9              T      *-2
066C 1D              LB     FLG3
0656 26              RB     DYST      RESET DELAY START BIT
066B 39              TL     PK15      START SYSTEM
0655 DB
066A 02    ID        SKNC              DEGREE C SELECTED?
0675 48              LAI    8         YES, DEGREE C INCREMENT (2)
067A 4B              LAI    11        NO, DEGREE F INCREMENT (5)
067D 46    NOI       LAI    6         NO INCREMENT
067E 05              RC
067F 13              LBL    CK3A
065F 0E
064F A5              TM     M10I+1    INCREMENT DEGREE REG. ACCORDINGLY
0647 30              TLB    IDEG
0643 37
0641 FF
                *
                *
                *
                *
00 AVAIL
                     ORG    #680
                *
0680 1F    CLOCK     LBL    FLG4
06A0 0A
0690 28              SKBF   CKEN      CLOCK ENABLE BIT SET?
0688 FD              T      *+2       YES
0684 2F              RT                NO
0682 17              LBL    CUFR
06A1 0A
06B0 06              SC
0698 78              I2C
068C 68              AISK   8         60 HZ SELECTED?
0686 DD              T      MOD5      NO, INCREMENT MOD 5
06A3 89    CLK1      TM     M06I      YES, INCREMENT MOD 6
0691 58              XDSK   0
06A8 8B              TM     M10I
0694 58              XDSK   0
068A 30              SKBEI  3
06A5 43
06B2 DC              T      CLK1
06B9 02              SKNC              SECONDS OVERFLOW?
06BC F1              T      INMH      YES
069E 2F              RT                NO
06AF 15    ISEC      LBL    CUSC      INCREMENT SECONDS CLOCK
0697 0A
068B 06              SC
0685 DC              T      CLK1
06A2 4B    MOD5      LAI    11        INCREMENT MOD 5
06B1 7D              ACSK
06B8 65              AISK   5
069C EE              T      CLK1+1
068E 10    INMH      LBL    CTHR
```

```
06A7 0A
0693 50            L      0
0689 61            AISK   1           TENS HOURS = 15?
06A4 5C            X      0           YES, CORRECT TO ZERO
0692 13            LBL    CUMN        NO
06A9 0A
06B4 8B            TM     M10I
069A 58            XDSK   0
06AD 89            TM     M06I
06B6 58            XDSK   0
06BB CB            T      *-4
069D 10            LBL    CTHR
06AE 0A
06B7 50            L      0
069B 6F            AISK   15          TENS HOURS = 0?
068D D5            T      CKUH        NO
06A6 5C            X      0
06B3 1D  DELS      LB     FLG3
0699 2A            SKBF   DYST        DELAY START BIT SET?
06AC 3A            TLB    DSTL        YES
0696 36
06AB E5
0695 2F            RT                 NO
06AA 11  CKUH      LBL    CUHR
06B5 0A
06BA 50            L      0
06BD 6D            AISK   13          UNITS HOURS > 2?
06BE 61            AISK   1           YES
06BF CC            T      DELS        NO
069F 58            XDSK   0
068F 4F            LAI    15
0687 D9            T      DELS-1
                   *
                   *
                   *
                   *
02 AVAIL
                   ORG    #6C0
                   *
06C0 06  STTS      SC                 BEGIN INSTRUCTION TEST
06E0 02            SKNC
06D0 FB            T      *+2
06C8 D4            T      ZE1
06C4 05            RC
06C2 02            SKNC
06E1 D4            T      ZE1
06F0 45            LAI    5
06D8 4A  Z10       LAI    10
06CC 75            LXA
06C6 79            XAX
06E3 74            XAS
06D1 74            XAS
06E8 76            LBA
06D4 7A            XAB
06CA 02            SKNC
06E5 DD            T      SK10
06F2 30            SKAEI  5           A = 5?
06F9 6A
06FC D4            T      ZE1         NO, ERROR
06DE 30            SKBEI  5           YES, B = 5?
06EF 45
06D7 D4            T      ZE1         NO, ERROR
06CB 06            SC                 YES
06C5 E7            T      Z10
06E2 30  SK10      SKAEI  10          A = 10?
06F1 65
06F8 D4            T      ZE1         NO, ERROR
06DC 30            SKBEI  10          YES, B = 10?
06CE 4A
```

```
06E7 D4           T       ZE1       NO, ERROR
06D3 45           LAI     5         YES
06C9 5C           X       0
06E4 49           LAI     9
06D2 7F           SKMEA
06E9 E5           T       *+2
06F4 D4           T       ZE1
06DA 77           COM
06ED 6F           AISK    15
06F6 7F           SKMEA
06FB D4           T       ZE1
06DD 7C           AC
06EE 30           SKAEI   11
06F7 64
06DB D4           T       ZE1
06CD 27           RB      4
06E6 2B           SKBF    4
06F3 D4           T       ZE1
06D9 23           SB      4
06EC 2B           SKBF    4
06D6 CA           T       RAM
06EB 41  ZE1      LAI     1         GENERATE INSTRUCTION TEST ERROR
06D5 74           XAS
06EA 80           TM      CER
06F5 41  RAM      LAI     1         BEGIN RAM TEST
06FA 74           XAS
06FD 10           LB      0
06FE B0           TM      RAM0      TEST ROW 0 RAM
06FF 09           EOB     1
06DF B0           TM      RAM0      TEST ROW 1 RAM
06CF 0B           EOB     3
06C7 30           TLB     RAMC
06C3 33
06C1 FF
           *
           *
           *
           *
00 AVAIL
                  ORG     #700
           *
0700 B0  RAMC     TM      RAM0      TEST ROW 2 RAM
0720 09           EOB     1
0710 B0           TM      RAM0      TEST ROW 3 RAM
0708 0F           EOB     7
0704 B0           TM      RAM0      TEST ROW 4 RAM
0702 09           EOB     1
0721 B0           TM      RAM0      TEST ROW 5 RAM
0730 0B           EOB     3
0718 B0           TM      RAM0      TEST ROW 6 RAM
070C 09           EOB     1
0706 B0           TM      RAM0      TEST ROW 7 RAM
0723 42           LAI     2         BEGIN RIO LINE TEST
0711 74           XAS
0728 18           LB      8         SETALL DIO LINES TO VSS
0714 70           SOS
070A 5C           DECB    0
0725 58
0732 EB           T       *-3
0739 12           LBL     CTMN
073C 0A
071E 40           LAI     0         PRESET COUNTER TO 1
072F 54           XNSK    0
0717 41           LAI     1
070B 5C           X       0
0705 50  RIOC     L       0
0722 77           COM
0731 7B           IOA
0738 12           LBL     CTMN
```

```
071C 0A
070E 50        L     0
0727 77        COM
0713 79        XAX
0709 73        OX
0724 94        TM    DEL2
0712 72        IX
0729 79        XAX
0734 77        COM
071A 7F        SKMEA           RIO LINE ERROR?
072D 80        TM    GER       YES, ERROR
0736 54        XNSK  0         NO
073B 7B        IOA
071D 77        COM
072E 7F        SKMEA           RIO LINE ERROR?
0737 80        TM    GER       YES, ERROR
071B 05        RC              NO
070D 50        L     0
0726 7C        AC
0733 58        XDSK  0
0719 00        NOP
072C 50        L     0
0716 7C        AC
072B 54        XNSK  0
0715 02        SKNC
072A C5        T     TSEG
0735 FA        T     RIOC
073A 1B TSEG   LB    11        BEGIN 50/60 HZ TEST
073D 43        LAI   3
073E 74        XAS
073F 01        SKISL           EDGE?
071F 80        TM    GER       NO
070F 70        SOS             YES
0707 30        TLB   TSEC
0703 32
0701 FF
       *
       *
       *
       *
00 AVAIL
               ORG   #740
       *
0740 01 TSEC   SKISL           EDGE?
0760 CF        T     DIO       NO
0750 70        SOS             YES
0748 00        NOP
0744 01        SKISL           EDGE?
0742 CF        T     DIO       NO
0761 80        TM    GER       YES
0770 BF DIO    TM    OTAB      TURN SEGMENTS OFF, BEGIN DIO TEST
0758 18        LB    8         INITIALIZE DIO LINE
074C 44        LAI   4
0746 74        XAS
0763 01 DIOC   SKISL           DIO LINE = VSS?
0751 E1        T     DIOR      YES
0768 7A        XAB             NO, ERROR
0754 13        LBL   CUMN
074A 0A
0765 58        XDSK  0
0772 40        LAI   0
0779 5C        X     0
077C 80        TM    GER
075E 71 DIOR   ROS             RESET DIO LINE
076F 94        TM    DEL2
0757 01        SKISL           DIO LINE = VSS?
074B D7        T     DIOC+2    YES, ERROR
0745 5C        DECB  0         NO, LAST DIO LINE?
0762 58
```

```
0771 DC          T      DIOC         NO
0778 45          LAI    5            YES, BEGIN FEEDBACK DIO-PI TEST
075C 74          XAS
074E 98          TM     BNON         TURN DIO5 ON
0767 AC          TM     MGON         TURN DIO6 ON
0753 B6          TM     FNON         TURN DIO7 ON
0749 33          TML    FD1          CHECK FEEDBACK WITH ALL DIO SET
0764 B1
0752 33          TML    FD2          CHECK FEEDBACK WITH DIO7 RESET
0769 98
0774 33          TML    FD3          CHECK FEEDBACK WITH DIO6-7 RESET
075A AC
076D 33          TML    FD4          CHECK FEEDBACK WITH ALL DIO RESET
0776 B6
077B 46          LAI    6            BEGIN PROBE TEST
075D 74          XAS
076E 11          LB     1
0777 78          I2C
075B 5C          X      0
074D 28          SKBF   1            PROBE OPEN?
0766 E6          T      *+2          NO
0773 D7          T      DIOC+2       YES, ERROR
0759 18          LB     8
076C 48          LAI    8
0756 75          LXA
076B 73          OX
0755 7B          IOA
076A AA          TM     DEL3
0775 04          INT1L               PROBE COMPARE?
077A D7          T      DIOC+2       NO, ERROR
077D 15          LB     5            YES
077E 45          LAI    5
077F 7B          IOA
075F AA          TM     DEL3
074F 04          INT1L               PROBE COMPARE?
0747 32          TL     NOER         NO
0743 FF
0741 D7          T      DIOC+2       YES, ERROR
         *
         *
         *
         *
00 AVAIL
                 ORG    #780
         *
0780 7D  M10X    ACSK                MOD 10
07A0 6A          AISK   10
0790 2F          RT
0788 7D  M06X    ACSK                MOD 6
0784 66          DC
0782 2F          RT
07A1 1D  REX1    LB     FLG3         RESTORE DPT AND PLSL REGS. (1 OF 2)
07B0 2A          SKBF   DYST         DELAY START BIT SET?
0798 D0          T      PT2          YES
078C 19          LB     ST2          NO
0786 28          SKBF   PRB          PROBE BIT SET?
07A3 E8          T      PT3          YES
0791 18          LB     ST1          NO
07A8 28          SKBF   CK1          COOK 1 BIT SET?
0794 F4          T      PT4          YES
078A 29          SKBF   CK2          NO, COOK 2 BIT SET?
07A5 FA          T      PT5          YES
07B2 2A          SKBF   CK3          NO, COOK 3 BIT SET?
07B9 DD          T      PT6          YES
07BC 2B          SKBF   CK4          NO, COOK 4 BIT SET?
079E CE          T      PT7          YES
07AF 42  PT2     LAI    2            NO, POINT TO CLOCK REG.
0797 43  PT3     LAI    3            POINT TO PROBE TEMP. REG.
078B 44  PT4     LAI    4            POINT TO COOK 1 REG.
```

```
0785 45 PT5      LAI    5              POINT TO COOK 2 REG.
07A2 46 PT6      LAI    6              POINT TO COOK 3 REG.
07B1 47 PT7      LAI    7              POINT TO COOK 4 REG.
07B8 2F          RT
079C 1A REX2     LB     DPT            RESTORE DPT AND PLSL REGS. (2 OF 2)
078E 5C          X      0
07A7 50          L      0
0793 14          LBL    PLSL
0789 09
07A4 5C          X      0              STORE INTO POWER LEVEL SELECTED REG.
0792 43          LAI    3
07A9 7F          SKMEA                 PROBE TEMP. REG. SELECTED?
07B4 C9          T      *+3            NO
079A 44          LAI    4              YES, JAM TO POINT TO COOK 1 REG.
07AD 5C          X      0
07B6 17          LBL    KEY3
07BB 0B
079D 4F          LAI    15             LOAD 15 INTO KEY3 REG.
07AE 5C          X      0
07B7 2F          RT
079B 78 CKX      I2C
078D 28          SKBF   1              JUMPER BIT SET?
07A6 77          COM                   YES
07B3 0A          EOB    2              NO
0799 5C          X      0
07AC 30          SKBEI  12             CHECK DOOR?
0796 4C
07AB C5          T      *+4            NO
0795 2A          SKBF   3              YES, DOOR OPEN?
07AA 2E          RTSK                  NO
07B5 2F          RT                    YES
07BA 29          SKBF   2              PROBE IN?
07BD 2F          RT                    NO
07BE 2E          RTSK                  YES
                 *
                 *
                 *
                 *
06 AVAIL
                 ORG    #7C0
                 *
07C0 4F OTAB     LAI    15             TURN SEGMENTS OFF
07E0 75          LXA
07D0 73          OX
07C8 7B          IOA
07C4 2F          RT
07C2 1C CKDR     LBL    JMP2           CHECK DOOR STATUS
07E1 09
07F0 1B CKPR     LBL    JMP3           CHECK PROBE STATUS
07D8 09
07CC E4          T      CKX
07C6 1B DIN0     LB     11
07E3 00          NOP
07D1 01          SKISL                 EDGE?
07E8 AE          T      *-1            NO
07D4 70          SOS                   YES
07CA 2F RT       RT
07E5 40 CLRG     LAI    0              CLEAR REG.
07F2 54          XNSK   0
07F9 9A          T      *-2
07FC 2F          RT
07DE 40 INP      LAI    0
07EF 60          I1SK                  INPUT MATRIX SWITCHES OR JUMPERS
07D7 00          NOP
07CB 77          COM
07C5 2F          RT
07E2 15 BNOF     LB     BRN            TURN BROWNER OFF
07F1 16 MGOF     LB     MAG            TURN MAGGIE OFF
07F8 17 FNOF     LB     FAN            TURN FAN OFF
07DC 71          ROS
```

```
07CE 2F           RT
07E7 15  BNON  LB    BRN       TURN BROWNER ON
07D3 16  MGON  LB    MAG       TURN MAGGIE ON
07C9 17  FNON  LB    FAN       TURN FAN ON
07C4 70        SOS
07D2 2F        RT
07E9 4F  M10D  LAI   15        DECREMENT MOD 10
07F4 46  M10I  LAI   6         INCREMENT MOD 10
07DA FF        T     M10X
07ED 4F  M06D  LAI   15        DECREMENT MOD 6
07F6 4A  M06I  LAI   10        INCREMENT MOD 6
07FB F7        T     M06X
07DD 30  RST   TL    RESET     RESET SYSTEM
07EE CF
07F7 30  BEEP  TLB   BEPY      CHECK TO BEEP
07DB 39
07CD FF
07E6 30  INCL  TLB   CLOCK     CHECK TO INCREMENT CLOCK
07F3 35
07D9 FF
07EC DE  RES1  T     REX1
07D6 E3  RES2  T'    REX2
07E8 42  DEL2  LAI   2         DELAY 2
07D5 4E  DEL3  LAI   14        DELAY 3
07EA 6F        AISK  15
07F5 95        T     *-1
07FA 2F        RT
07FD 3F  START TL    STA
07FE FF
07FF 33  GER   TL    GERX      GENERATE ERROR
07DF FF
07CF 33  RAM0  TL    RAMX
07C7 F9
07C3 33  TSSL  TL    TSSX
07C1 E9
           *
           *
           *
           *
00 AVAIL
        END
```

I claim:

1. An electronic controller having a plurality of appliance function controllers, a digital display, a microprocessor controler comprising at least one internal random access memory and a plurality of internal registers, and further including, external to said microprocessor controller, electrical input and output conductors for said plurality of appliance function controllers, a diagnostic test signal conductor connected to said microprocessor controller, a single plug connector to which said input and output conductors and said diagnostic test signal conductor are connected in circuit, said plug connector and having releasable connections for each of said conductors, a corresponding mating connector releasably engageable with said single plug connector and having releasable connections that match the releasable connections of said single plug connector, said mating plug connector including extension conductors from said input and output conductors to the respective appliance function controllers associated with each input and output conductor, a dummy plug connector releasably engageable with said single plug connector in place of said mating plug connector, said dummy plug connector containing leads which cross connect said input and output conductors and which place a signal on said diagnostic test signal conductor to thereby alter the electrical interconnection of said conductors in said single plug connector, and means in said microprocessor controller interconnecting said random access memory, said internal registers, and connected to said digital display, and responsive to signals on said diagnostic test signal conductor to internally check electrical conductivity integrity of said input and output conductors and of said internal microprocessor random access memory and of said internal microprocessor registers and operative to generate a unique digital code in said digital display indicative of an unsatisfactory check of electrical integrity and the location among said input and output conductors and said microprocessor random access memory and registers at which said unsatisfactory check occurred.

2. Apparatus according to claim 1 further characterized in that said random access memory includes a plurality of discrete addressable storage locations, and said internal microprocessor controller registers include accumulator, and said microprocessor controller includes means for reproducing information from said accumulator register into at least some of said addressable storage locations of said random access memory, and said means in said microprocessor controller to check electrical conductivity integrity reproduces information from said accumulator in at least some of said addressable storage locations of said random access memory and thereafter serially compares the contents of said discrete addressable storage locations in said random access memory with the contents of said accumulator, and provides indications of any inexact comparison to said digital display.

3. Apparatus according to claim 1 further comprising data access lines connected to said microprocessor controller, an input means in said microprocessor controller connectable to said data access lines to provide predetermined data signals and further characterized in that said means in said microprocessor controller responsive to signals on said diagnostic test signal conductor generates control signals which are sent on said data access lines and returned through said input means as said data signals and further comprising means in said microprocessor controller for comparing said generated control signals with said data signals, and means responsive to said comparison to actuate said digital display when said comparison reflects inequality between said control signals and said data signals.

4. Apparatus according to claim 1 further comprising an a.c. conductor connected to an a.c. input external of said microprocessor controller and to an a.c. line signal detection means in said microprocessor controller which is pulsed to one binary bit condition by an incoming a.c. line signal on said a.c. conductor, means in said microprocessor controller for forcing said a.c. line signal detection means to the opposite bit condition, and sampling means in said microprocessor controller for testing the bit condition of said a.c. line signal detection means to provide an indication to said digital display of an unsatisfactory check upon subsequently detecting said opposite binary bit condition while sampling said a.c. line signal detection means.

5. Apparatus according to claim 1 further comprising manual input data lines to said microprocessor controller and manual input means connectable to said manual input data lines for generating distinct input signals to said microprocessor controller on said data input lines, buffer memory means in said microprocessor controller for temporarily storing said input signals as they are generated in association with each of said manual input means, recording means external to said microprocessor controller for storing a visible record of correct correspondence of said input signals and the manual input means associated therewith, and said digital display is connected to said buffer memory means for generating a visual image of said input signals for manual comparison with said corresponding record in said recording means to ascertain whether or not electrical integrity exists in the generation and display of said input signals from said manual input means.

6. Apparatus according to claim 1 further comprising a temperature probe having a thermistor connected in series to a voltage source external to said microprocessor controller and a temperature sampling circuit is coupled to a first probe input to said microprocessor controller from said temperature probe and a probe status circuit external to said microprocessor controller is coupled to a second probe input to said microprocessor controller from said temperature probe, and said microprocessor controller stores a signal in a probe status location in said random access memory to indicate the presence or absence of said probe, and said dummy plug connector leads cross connect said temperature sampling circuit to said probe status circuit and said means in said microprocessor controller responsive to signals on said diagnostic test signal conductor is coupled to receive an electrical signal from said probe status circuit to said second probe input and is coupled to said probe status location in said random access memory to compare said electrical signal on said second probe input with the contents of said probe status location in said random access memory to generate a unique digital code indicative of relative concordance thereof to said digital display.

7. Apparatus according to claim 6 wherein said means in said microprocessor controller responsive to signals on said diagnostic test signal conductor generates maximum and minimum probe test limit signals and compares signals on said first probe input with said maximum and minimum probe test limit signals to check the electrical integrity of said probe.

8. Apparatus according to claim 7 further characterized in that said means responsive to signals on said diagnostic test signal conductor actuates said digital display when the voltage of the signal received on said first probe input does not fall between said maximum and minimum probe test limit signals.

9. Apparatus according to claim 1 further characterized in that at least some of said leads in said dummy plug serve as connection altering means to disconnect first ones of said output conductors from associated function controllers external to said microprocessor controller, and to connect said first output conductors to others of said output conductors which are connected to said microprocessor controller to temporarily use said other output conductors as input lines, and said means responsive to signals on said diagnostic test signal conductor includes means for directing control signals to said first output conductors, means for sampling said other output conductors serving as input lines, and means for actuating said digital display upon failure of said control signals to appear on said input lines.

10. Apparatus according to claim 1 wherein said means responsive to signals in said diagnostic test signal conductor is connected to place a binary code in at least one of said plurality of internal registers, to replicate said binary code in at least one other internal register, and to compare the binary codes in said one and said other registers and to transmit an error code to said digital display upon detecting an inexact comparison of binary codes in said one and said other registers.

11. In an electronic controller which employs a microprocessor, data input lines connected to said microprocessor and data output lines connected from said microprocessor, the improvement comprising a matrix of a plurality of function alteration circuits coupled to said data input and output lines, said circuits including separate strapping means selectively completing each function alteration circuit for alternative connection and disconnection in said matrix to operate said microprocessor in alternative selected functional modes of operation.

12. Apparatus according to claim 11 further characterized in that said electronic controller includes a keyboard connected to said microprocessor for entering a preset temperature into said microprocessor, and said electronic controller is connected in a microwave oven having a temperature probe, and said microprocessor is conditioned by manual actuation of said keyboard to operate said microwave oven until said probe reaches a preset temperature, and one of said data output lines serves as a probe temperature control line, and connection and disconnection of one of said strapping means associated with said probe temperature control line selectively completes a function alteration circuit associated therewith to hold said probe at said present temperature and alternatively to cease heating once said probe reaches said preset temperature.

13. Apparatus according to claim 11 further comprising an illuminable display, and one of said data output lines serves as a display gating line connected between said microprocessor and said illuminable display to enable said display under the control of said microprocessor, and a power lead is connected to said microprocessor, and one said strapping means is associated with said display gating line to selectively complete a function alteration circuit associated therewith to alternatively periodically activate and deactivate said display gating line and alternatively to continually activate said display gating line upon the occurrence of an initial supply of power on said power lead.

14. Apparatus according to claim 11 further characterized in that said electronic controller is connected in a microwave oven having a probe detection switch and a probe detection input line leading from said probe detection switch to said microprocessor, and one of said data input lines serves as a probe interlock convention input line leading to said microprocessor for carrying a bit convention signal thereto, and one of said strapping means is associated with said probe interlock convention input line and selectively completes one of said function alteration circuits to establish one of two alternative bit conventions indicative of connection of a probe to said microwave oven.

15. Apparatus according to claim 11 further characterized in that electronic controller is connected in a microwave oven having a magnetron relay, a browner relay, and a cooking cycle control line associated with a final one of several sequential cooking cycles, and one of said strapping means selectively completes a function alteration circuit to said cooking cycle control line to an alternative one of said magnetron relay and said browner relay.

16. Apparatus according to claim 11 further characterized in that said electronic controller is connected in a microwave oven having a keyboard with a plurality of keys thereon, an audible horn, and a horn output line connected between said horn and said microprocessor, and one said data input lines is a line coupled to said microprocessor which serves a manual keyboard input activation signal line, and one of said strapping means selectively complete a function alteration circuit for alternative coupling and decoupling of said keyboard activation signal line to said horn output line.

17. Apparatus according to claim 11 further characterized in that said electronic controller is connected in a microwave oven having an oven door, and an oven door switch operably connected to open and close upon opening and closing of said oven door, a door interlock signal line connected between said oven door switch and said microprocessor to signal when said oven door switch is open and closed, and said matrix includes as one of said function alteration circuits an interlock connection input circuit leading to said microprocessor for supplying a bit convention signal thereto, and one of said strapping means selectively completes a function alteration circuit to establish a binary bit convention to said microprocessor indicative of the status of said oven door.

18. Apparatus according to claim 11 further characterized in that said electronic controller is connected in a microwave oven having a magnetron, and further comprising a magnetron duty cycle interval controller coupled to operate said oven magnetron in a repetitive duty cycle, and a magnetron power level control line is connected between said microporcessor and said magnetron duty cycle interval controller, and one of said strapping means selectively completes a function alteration circuit to activate said magnetron power level control line to alternatively adjust said magnetron duty cycle interval controller between a full and partial duty cycle of operation.

19. Apparatus according to claim 11 further characterized in that said electronic controller is connected in a microwave oven having a manually actuable start switch, a cooking start input circuit in said microprocessor coupled to said start switch by one of said data input lines, a cooking stop input circuit coupled to said start switch by one of said data input lines, means in said microprocessor for alternatively actuating said cooking start input circuit and said cooking stop input circuit upon actuation of said start switch, and one of said strapping means selectively completes a function alteration circuit to enable said cooking stop input circuit and alternatively to disable said cooking stop intput circuit and to force said means for alternatingly actuating said cooking start input circuit and said cooking stop input circuit to instead actuate said cooking start input circuit with every actuation of said start switch.

20. Apparatus according to claim 11 further characterized in said electronic controller is connected in a microwave oven having a temperature probe, and further comprising an analog temperature indication line leading from said probe to said microprocessor, means for generating digital numbers in said microprocessor on a Centigrade scale in response to analog input on said analog temperature indication line, means for generating digital numbers in said microprocessor on a Fahrenheit scale in response to an analog input on said analog temperature indication line, and one of said strapping means selectively completes a function alteration circuit for alternatively coupling said analog temperature indication line to said means for generating digital numbers on a Centigrade scale and to register said numbers in said microprocessor and to said means for generating digital numbers on a Fahrenheit scale and to register said digital numbers in said microprocessor.

21. Apparatus according to claim 11 further characterized in that said electronic controller is connected in a microwave oven and further comprising a magnetron relay means, a duty cycle interval controller connected to said microprocessor and connected to activate said magnetron relay means for a prescribed duty cycle interval, recycling means in said microprocessor for periodically reactivating said duty cycle interval controller, and at least one of said strapping means selectively completes a function alteration circuit to alternatively recycle said duty cycle interval controller at one of a plurality different frequencies.

22. Apparatus according to claim 21 further characterized in that recycling means operates said duty cycle interval controller at a 15 second duty cycle.

23. Apparatus according to claim 21 further characterized in that said recycling means operates said duty cycle interval controller at a duty cycle of 30 seconds.

24. Apparatus according to claim 21 further characterized in that said recycling means operates said duty cycle interval controller at a one second duty cycle.

25. Apparatus according to claim 11 in that said electronic controller is connected in a microwave oven having a magnetron for heating said oven to a predetermined temperature, and further comprising a magnetron controller coupled to operate said magnetron, a temperature output control line connected from said microprocessor to said magnetron controller for regulating oven temperature at said predetermined temperature when said predetermined temperature is reached, minimum temperature memory means in said microprocessor for storing said predetermined temperature, disabling circuit means in said microprocessor connected between said minimum temperature memory means and said temperature output control line for deactivating said temperature output control line once oven temperature reaches and thereafter falls below said predetermined temperature, and one of said strapping means selectively completes a function alteration circuit for alternatively engaging said disabling circuit means and by-passing said disabling circuit means to connect said minimum temperature memory means to said temperature output control line.

26. Apparatus according to claim 11 further comprising a visual display connected to said microprocessor and in which images of numbers appear side-by-side, luminescent ennunciators located above and below said images of said numbers in said visual display, an upper ennuciator activation circuit connected between said microprocessor and said visual display for enabling said luminescent ennunciator above said numbers, a lower ennunciator activation circuit connected between said microprocessor and said visual display for enabling said luminescient ennuciator below said numbers, and one of said strapping means selectively completes a function alteration circuit for alternatively conditioning said microprocessor to enable said upper ennunciator activation circuit and to alternatively enable said lower ennuciator activation circuit.

27. Apparatus according to claim 11 further comprising a clock circuit and a manually operable keyboard means for designating a preselected time, and further characterized in that said microprocessor has a current time memory storage means connected to said clock circuit for storing an electronic indication of current time and a preselected time memory storage means connected to said manually operable keyboard for storing an electronic indication of a preselected time provided form said manually operated keyboard means, comparator means connected to said current time memory storage means and said preselected time memory storage means for comparing said preselected time with current time and for providing enabling signal when current time reaches said preselected time, and further characterized in that external to said microprocessor one of said data input lines serves as a delayed start control line coupled to said microprocessor for enabling said comparator means, and one of said strapping means selectively completes a function alteration circuit to establish an enabling connection from one of said keys of said manually operated keyboard to said delayed start control line input means.

* * * * *